US012621705B2

(12) United States Patent
Wang et al.

(10) Patent No.: US 12,621,705 B2
(45) Date of Patent: May 5, 2026

(54) NETWORK ACCELERATION METHOD, ELECTRONIC DEVICE, AND STORAGE MEDIUM

(71) Applicant: Honor Device Co., Ltd., Shenzhen (CN)

(72) Inventors: Jinxiang Wang, Shenzhen (CN); Jinbo Li, Shenzhen (CN); Shuo Chen, Shenzhen (CN); Henghui Liang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 327 days.

(21) Appl. No.: 18/569,936

(22) PCT Filed: Sep. 5, 2022

(86) PCT No.: PCT/CN2022/117088
§ 371 (c)(1),
(2) Date: Dec. 13, 2023

(87) PCT Pub. No.: WO2023/087852
PCT Pub. Date: May 25, 2023

(65) Prior Publication Data
US 2024/0284242 A1 Aug. 22, 2024

(30) Foreign Application Priority Data
Nov. 18, 2021 (CN) .......................... 202111383410.5

(51) Int. Cl.
H04W 28/02 (2009.01)
H04W 24/08 (2009.01)
H04W 28/08 (2023.01)

(52) U.S. Cl.
CPC ....... *H04W 28/0268* (2013.01); *H04W 24/08* (2013.01); *H04W 28/0875* (2020.05)

(58) Field of Classification Search
None
See application file for complete search history.

(56) References Cited

U.S. PATENT DOCUMENTS

| | | | |
|---|---|---|---|
| 10,581,581 B2 * | 3/2020 | Horn | H04L 5/0058 |
| 2015/0016265 A1 * | 1/2015 | Ahmadi | H04W 28/0247 370/235 |

(Continued)

FOREIGN PATENT DOCUMENTS

| | | |
|---|---|---|
| CN | 102904959 A | 1/2013 |
| CN | 104243447 A | 12/2014 |

(Continued)

OTHER PUBLICATIONS

Wang Cangling et al., "A Dynamic Adaptive Bit-rate Switching Algorithm for HTTP Streaming", Jisuanji Yu Xiandaihua, Apr. 15, 2017, 6 pages, with English abstract.

*Primary Examiner* — Brian S Roberts
(74) *Attorney, Agent, or Firm* — Conley Rose, P.C.

(57) ABSTRACT

A network acceleration method, an electronic device, and a storage medium, which relate to the field of network communication technologies, so as to reduce freezing phenomena during video playback. The method includes: when an electronic device runs an application that does not include a peer-to-peer (P2P) flow, a data flow that requires high network quality may be switched to another network with better quality when quality of a currently used network is poor. When the electronic device runs an application that includes a P2P flow, and when a currently used network is poor, because it is difficult to switch the P2P flow to another network with better quality, all data flows of the electronic device may be switched to the another network, thereby reducing video freezing phenomena caused by a difficulty of switching the P2P flow to the another network with better quality.

20 Claims, 44 Drawing Sheets

(56)  References Cited

U.S. PATENT DOCUMENTS

| | | | |
|---|---|---|---|
| 2018/0376400 A1 | 12/2018 | Chaki et al. | |
| 2020/0245406 A1* | 7/2020 | Zhu | H04W 76/16 |
| 2022/0191682 A1* | 6/2022 | Li | H04W 8/205 |
| 2022/0329535 A1* | 10/2022 | Li | H04L 47/2441 |

FOREIGN PATENT DOCUMENTS

| | | | |
|---|---|---|---|
| CN | 105792289 A | 7/2016 |
| CN | 108271032 A | 7/2018 |
| CN | 108307432 A | 7/2018 |
| CN | 109168011 A | 1/2019 |
| CN | 110072263 A | 7/2019 |
| CN | 112996042 A | 6/2021 |
| WO | 2017006361 A1 | 1/2017 |
| WO | 2018072402 A1 | 4/2018 |
| WO | 2021129861 A1 | 7/2021 |

* cited by examiner

FIG. 12BFIG. 12BFIG. 12B FIG. 12B FIG. 12B FIG. 12B FIG. 12BFIG. 12BFIG. 12B

NETWORK ACCELERATION METHOD, ELECTRONIC DEVICE, AND STORAGE MEDIUM

CROSS-REFERENCE TO RELATED APPLICATIONS

This is a national stage of International Application No. PCT/CN2022/117088, filed on Sep. 5, 2022, which claims priority to Chinese Patent Application No. 202111383410.5, filed with the China National Intellectual Property Administration on Nov. 18, 2021, both of which are incorporated herein by reference in their entireties.

TECHNICAL FIELD

This application relates to the network communication field, and in particular, to a network acceleration method, an electronic device, a chip system, and a storage medium.

BACKGROUND

With an increasing level of intelligence in electronic devices, more application software is installed and run in the electronic devices. In a running process, many application software needs to communicate with corresponding servers by using networks, to implement various functions provided by the application software.

In a process of using application software by a user, if transmission quality of a specific data flow is poor, the data flow with a specific feature may be switched, based on the feature of the data flow; to another network for transmission. However, in a video flow application scenario, a video freezing phenomenon still often occurs after flow switching is performed.

SUMMARY

This application provides a network acceleration method, an electronic device, a chip system, and a storage medium, to reduce video freezing phenomena.

To achieve the foregoing objective, the following technical solutions are used in this application.

According to a first aspect, this application provides a network acceleration method. The method includes:

An electronic device runs a first application, and the electronic device transmits a first data flow and a second data flow of the first application by using a first network interface card, where the first network interface card is a wireless local area network interface card, the first network interface card is configured to connect to a wireless router, a signal received by the first network interface card from the wireless router has first strength, and neither the first data flow nor the second data flow is a P2P flow:

when the signal received by the first network interface card from the wireless router has second strength, the electronic device transmits the first data flow by using a second network interface card, and the electronic device transmits the second data flow by using the first network interface card, where the second strength is less than the first strength, and network quality of the second network interface card is better than network quality of the first network interface card;

the electronic device runs a second application, and the electronic device transmits a third data flow and a fourth data flow of the second application by using the first network interface card, where a signal received by the first network interface card from the wireless router has the first strength, the third data flow is not a P2P flow; and the fourth data flow is a P2P flow; and when the signal received by the first network interface card from the wireless router has the second strength, the electronic device transmits the third data flow and the fourth data flow by using the second network interface card.

In this application, when the electronic device runs an application that does not include a P2P flow; and when quality of a currently used network is poor, a data flow that requires high network quality may be switched to another network, and another data flow is transmitted by using an original network interface card. When the electronic device runs an application that includes a P2P flow; and when a currently used network is poor, because the P2P flow cannot be switched to another network, all data flows of the electronic device may be switched to the another network. This reduces video freezing phenomena caused because the P2P flow cannot be switched to the another network and the P2P flow is retained on an original network.

In an implementation of the first aspect, the first data flow is a data flow that includes data packets and that has a first feature, the second data flow is a data flow that includes data packets and that has a second feature, and the first feature and the second feature differ from each other in at least one of the following parameters: a transmission protocol, a transmission port, and a header feature of the data packets.

In this application, different data flows may be distinguished based on related information (the transmission protocol, the transmission port, and the header feature) carried in the data packets, so that flow-level identification, flow-level quality evaluation, and flow-level network switching can be implemented.

In an implementation of the first aspect, in a process in which the electronic device transmits the first data flow and the second data flow of the first application by using the first network interface card, the method includes:

The electronic device obtains a first condition corresponding to the first feature and a second condition corresponding to the second feature, where the first condition is a condition for transmitting the first data flow on the second network interface card, and the second condition is a condition for transmitting the second data flow on the second network interface card; and the electronic device determines whether a flow quality parameter of the first data flow meets the first condition, and determines whether a flow quality parameter of the second data flow meets the second condition, where the flow quality parameter includes at least one of the following parameters: a latency; a rate, a packet loss rate, a retransmission rate, and whether a packet response times out.

In this application, different conditions may be preset for different features. The first data flow having the first feature is used as an example. When it is determined that a feature of a data flow of the first application meets the first feature, the first condition may be obtained, and then it is determined whether a flow quality parameter of the data flow that meets the first feature meets the first condition.

In an implementation of the first aspect, when the signal received by the first network interface card from the wireless router has the first strength, the flow quality parameter of the first data flow does not meet the first condition, and the flow quality parameter of the second data flow does not meet the second condition; and when the signal received by the first network interface card from the wireless router has the second strength, the flow quality parameter of the first data flow meets the first condition, and the flow quality parameter of the second data flow does not meet the second condition.

In an implementation of the first aspect, the third data flow is a data flow having a third feature, and the fourth data flow is a data flow having a fourth feature; and the third feature and the fourth feature differ from each other in at least one of the following parameters: a transmission protocol, a transmission port, and a header feature of the data packets.

In an implementation of the first aspect, in a process in which the electronic device transmits the third data flow and the fourth data flow of the second application by using the first network interface card, the method includes:

The electronic device obtains a third condition corresponding to the third feature and a fourth condition corresponding to the fourth feature, where the third condition is a condition for transmitting the third data flow on the second network interface card or a condition for transmitting the third data flow and the fourth data flow on the second network interface card, and the fourth condition is a condition for transmitting the third data flow and the fourth data flow on the second network interface card; and the electronic device determines whether a flow quality parameter of the third data flow meets the third condition, and determines whether a flow quality parameter of the fourth data flow meets the fourth condition, where the flow quality parameter includes at least one of the following parameters: a latency; a rate, a packet loss rate, a retransmission rate, and whether a packet response times out.

In an implementation of the first aspect, when the signal received by the first network interface card from the wireless router has the first strength, the flow quality parameter of the third data flow does not meet the third condition, and the flow quality parameter of the fourth data flow does not meet the fourth condition; and if the third condition is the condition for transmitting the third data flow on the second network interface card, when the signal received by the first network interface card from the wireless router has the second strength, the flow quality parameter of the fourth data flow meets the fourth condition: or if the third condition is the condition for transmitting the third data flow and the fourth data flow on the second network interface card, when the signal received by the first network interface card from the wireless router has the second strength, the flow quality parameter of the third data flow meets the third condition or the flow quality parameter of the fourth data flow meets the fourth condition.

In an implementation of the first aspect, that the electronic device transmits the third data flow and the fourth data flow by using the second network interface card includes:

The electronic device checks whether the electronic device stores an alternate network; and when the electronic device stores the alternate network, the electronic device transmits the third data flow and the fourth data flow by using the alternate network, where the alternate network includes a second network corresponding to the second network interface card.

In this application, to switch a data flow that meets a corresponding flow quality evaluation condition to another network in time, the alternate network may be obtained and stored in advance, so that the data flow that meets the corresponding evaluation condition is switched to the alternate network in time when a flow quality parameter of the data flow meets the corresponding condition.

In an implementation of the first aspect, the method further includes:

When the electronic device does not store the alternate network, the electronic device obtains network quality parameters of networks corresponding to third network interface cards of the electronic device, where the third network interface cards are network interface cards other than the first network interface card in the electronic device, and the network quality parameter includes at least one of a bandwidth, a latency, and an air interface rate; and when the second network interface card is a network interface card with optimal network quality in the third network interface cards, the electronic device stores the second network corresponding to the second network interface card as the alternate network, where the network quality is determined based on the network quality parameter.

In this application, the alternate network may alternatively be obtained first when the alternate network is not stored, and then when it is determined next time that the flow quality parameter of the data flow meets the corresponding evaluation condition, the data flow is switched to the alternate network for transmission.

In an implementation of the first aspect, before the electronic device stores the second network corresponding to the second network interface card as the alternate network, the method further includes:

The electronic device wakes up the second network corresponding to the second network interface card.

In an implementation of the first aspect, before the electronic device stores the second network corresponding to the second network interface card as the alternate network, the method further includes:

The electronic device obtains a network quality parameter of a first network corresponding to the first network interface card.

Correspondingly; that the electronic device stores the second network corresponding to the second network interface card as the alternate network includes:

When network quality of the second network corresponding to the second network interface card is better than network quality of the first network corresponding to the first network interface card, the electronic device stores the second network corresponding to the second network interface card as the alternate network.

In this application, it is further necessary to determine whether network quality of a network with optimal quality in networks other than a primary network is better than network quality of the primary network. It can be used as the alternate network when the network quality of the network is better than the network quality of the primary network, thereby preventing a data flow from being switched from the primary network whose network quality is not in line with a requirement of the current data flow to a network with poorer network quality: In an implementation of the first aspect, that the electronic device runs a second application includes:

The electronic device runs the second application in a foreground.

Correspondingly, the method further includes:

After the electronic device detects that the first application runs in the foreground, the electronic device sequentially performs primary network determining steps in a priority order of network interface cards of the electronic device, until a primary network of the electronic device is obtained.

The primary network determining steps include:

The electronic device obtains a network state of a network corresponding to a fourth network interface card, where the fourth network interface card is a network interface card of the electronic device:

when the network state of the fourth network interface card is available, the electronic device obtains a network quality parameter of the fourth network interface card, or when the network state of the fourth network interface card is unavailable, this round of primary network determining steps is terminated; and when the network quality parameter of the fourth network interface card is within a preset range, the fourth network interface card is stored as the primary network of the electronic device, or when the network quality parameter of the fourth network interface card is not within the preset range, this round of primary network determining steps is terminated.

In this application, when priorities are set for the network interface cards in the electronic device, an available network interface card whose network quality meets a preset requirement (for example, whose network quality parameter is within the preset range) is selected as a primary network interface card in the priority order of the network interface cards, for data flow transmission of the application running in the foreground of the electronic device. Therefore, the primary network interface card of the electronic device can be obtained according to same logic after the application is switched to the foreground, and the primary network interface card is a network interface card for transmitting a data flow of the first application.

In an implementation of the first aspect, that the electronic device obtains a network quality parameter of a first network corresponding to the first network interface card includes:

After the primary network of the electronic device is obtained, the electronic device monitors a network quality parameter of the primary network in a first period.

In this application, to facilitate comparison with the network quality of the obtained alternate network at any time, the network quality parameter of the primary network needs to be periodically monitored.

In an implementation of the first aspect, the electronic device obtains a network for transmitting the third data flow and the fourth data flow; where the network for transmitting the third data flow and the fourth data flow is the first network corresponding to the first network interface card; and the electronic device monitors the network quality parameter of the first network in a first period.

In this application, the primary network may alternatively be determined based on a network that transmits a data flow of a current application in the foreground. Therefore, the network quality parameter of the primary network is obtained in diversified manners, so that network quality is compared when the alternate network is determined.

According to a second aspect, an electronic device is provided, including a processor, where the processor is configured to run a computer program stored in a memory; to implement the method according to any item of the first aspect of this application.

According to a third aspect, a chip system is provided, including a processor, where the processor is coupled to a memory; and the processor executes a computer program stored in the memory, to implement the method according to any item of the first aspect of this application.

According to a fourth aspect, a computer-readable storage medium is provided. The computer-readable storage medium stores a computer program, and when the computer program is executed by one or more processors, the method according to any item of the first aspect of this application is implemented.

According to a fifth aspect, this application provides a computer program product. When the computer program product runs on a device, the device is enabled to perform the method according to any item of the first aspect of this application.

It may be understood that, for beneficial effects of the second aspect to the fifth aspect, refer to the related descriptions in the first aspect. Details are not described herein again.

DESCRIPTION OF EMBODIMENTS

In the following descriptions, for the purpose of description instead of limitation, specific details such as a specific system structure and a technology are proposed, to provide a thorough understanding of embodiments of this application. However, persons skilled in the art should understand that this application may also be implemented in another embodiment without these specific details.

It should be understood that when being used in this specification and the appended claims of this application, the term "include" indicates presence of a described feature, entirety; step, operation, element, and/or component, but does not rule out presence or addition of one or more other features, entireties, steps, operations, elements, components, and/or sets thereof.

It should be further understood that in embodiments of this application, "one or more" means one, two, or more than two, and "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between associated objects.

In addition, in the descriptions of this specification and the appended claims of this application, the terms such as "first", "second", "third", and "fourth" are used only to distinguish descriptions, and should not be understood as indicating or implying relative importance.

Referring to "one embodiment", "some embodiments", or the like that is described in this specification of this application means that specific features, structures, or characteristics described with reference to one or more embodiments are included in the one or more embodiments of this application. Therefore, statements such as "in one embodiment". "in some embodiments", "in some other embodiments" that appear in different parts of this application do not necessarily refer to same embodiments, but mean "one or more but not all embodiments" unless otherwise specifically emphasized. The terms "include", "comprise", "have", and variants thereof all mean "include but are not limited to", unless otherwise specifically emphasized in another manner.

Embodiments of this application provide a network acceleration method. The network acceleration method is applicable to an electronic device. The electronic device may be a tablet computer, a mobile phone, a wearable device, a notebook computer, an ultra-mobile personal computer (UMPC), a netbook, a personal digital assistant (PDA), or another electronic device. A specific type of the electronic device is not limited in embodiments of this application.

Figure 1:
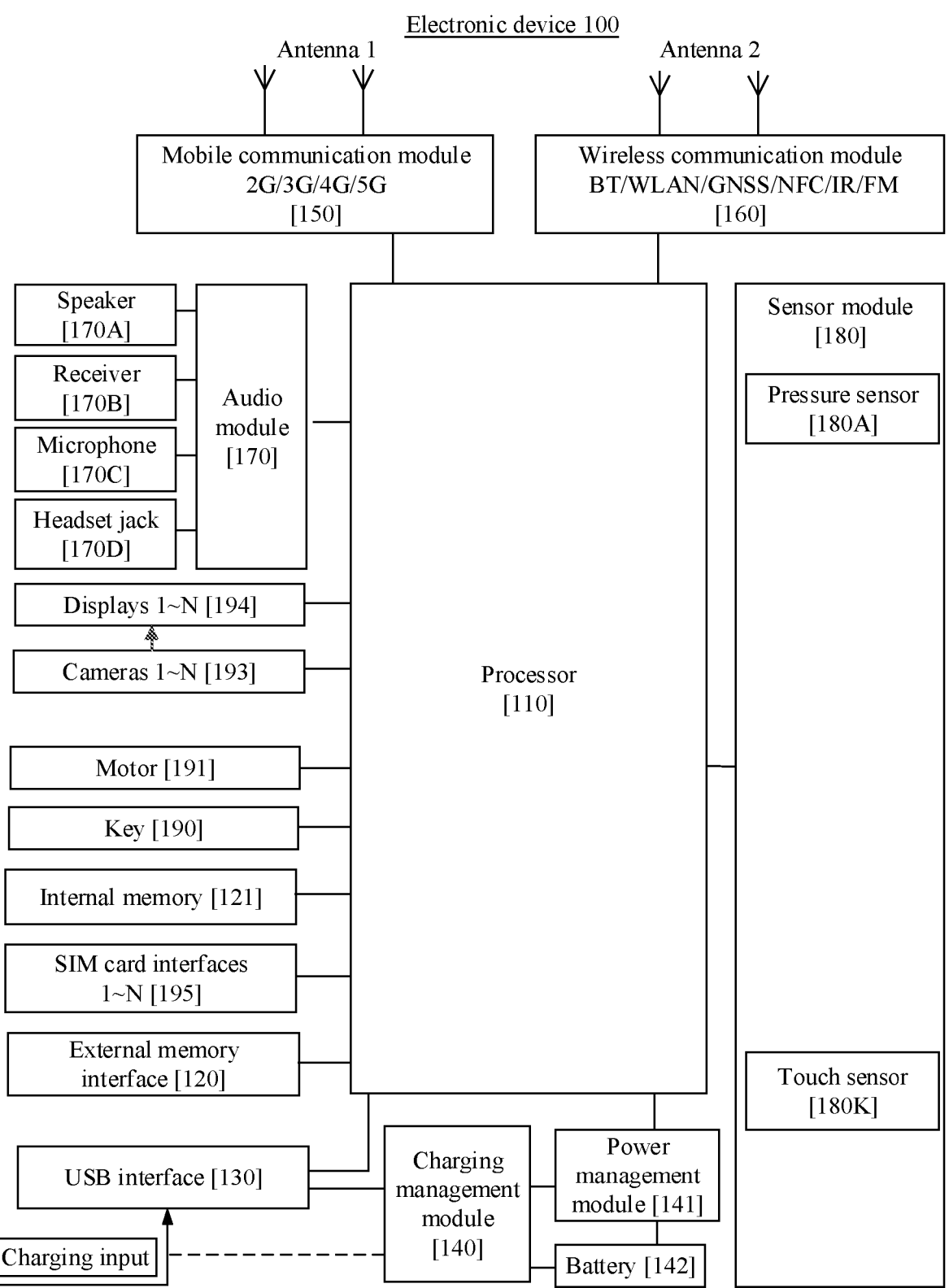
FIG. 1 is a schematic diagram of a hardware structure of an electronic device according to an embodiment of this application.

FIG. 1 is a schematic diagram of a structure of an electronic device. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, a camera 193, a display 194, a subscriber identification module (SIM) card interface 195, and the like. The sensor module 180) may include a pressure sensor 180A, a touch sensor 180K, and the like.

It may be understood that the structure illustrated in this embodiment of this application constitutes no specific limitation on the electronic device 100. In some other embodiments of this application, the electronic device 100 may include more or fewer components than those shown in the figure, some components may be combined, some components may be split, or components may be arranged in different manners. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory; a video codec, a digital signal processor (DSP), a baseband processor, a neural-network processing unit (NPU), and/or the like. Different processing units may be independent devices, or may be integrated into one or more processors. For example, the processor 110 is configured to perform the network acceleration method in embodiments of this application.

The controller may be a nerve center and a command center of the electronic device 100. The controller may generate an operation control signal according to instruction operation code and a timing signal, to complete control of instruction fetching and instruction execution.

A memory may be further disposed in the processor 110, and is configured to store instructions and data. In some embodiments, the memory in the processor 110 is a cache memory; The memory may store instructions or data recently used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

The USB interface 130 is an interface that complies with USB standard specifications, and may be specifically a Mini USB interface, a Micro USB interface, a USB Type C interface, or the like. The USB interface 130 may be configured to connect to a charger to charge the electronic device 100, or may be configured to transmit data between the electronic device 100 and a peripheral device.

The external memory interface 120 may be configured to connect to an external memory card, for example, a Micro SD card, to expand a storage capability of the electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system and an application required by at least one function (for example, a sound playback function and an image playback function).

In addition, the internal memory 121 may include a high-speed random access memory, and may further include a non-volatile memory, for example, at least one magnetic disk storage device, a flash memory device, or a universal flash storage (UFS).

The charging management module 140 is configured to receive a charging input from a charger. The charger may be a wireless charger or a wired charger. In some embodiments of wired charging, the charging management module 140 may receive a charging input from a wired charger through the USB interface 130.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory; the display 194, the camera 193, the wireless communication module 160, and the like.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna for a wireless local area network. In some other embodiments, the antenna may be used in combination with a tuning switch.

The mobile communication module 150 may provide a solution applied to the electronic device 100 for wireless communication including 2G/3G/4G/5G and the like. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert, by using the antenna 1, an amplified signal into an electromagnetic wave for radiation.

The wireless communication module 160 may provide a solution applied to the electronic device 100 for wireless communication including a wireless local area network (WLAN) (for example, a wireless fidelity (Wi-Fi) network), Bluetooth (BT), a global navigation satellite system (GNSS), frequency modulation (FM), near field communication (NFC), infrared (IR), and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, by using the antenna 2, the to-be-sent signal into an electromagnetic wave for radiation.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology:

The electronic device 100 may implement an audio function by using the audio module 170, the speaker 170A, the receiver 170B, the microphone 170C, the headset jack 170D, the application processor, and the like, for example, implement music playback and audio recording.

The audio module 170 is configured to convert a digital audio signal into an analog audio signal for output, and is also configured to convert an analog audio input into a digital audio signal. The audio module 170 may be further configured to encode and decode an audio signal. In some embodiments, the audio module 170 may be disposed in the processor 110 or some functional modules of the audio module 170 may be disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The receiver 170B, also referred to as an "earpiece", is configured to convert an audio electrical signal into a sound signal. When a call is answered or a voice message is listened to by using the electronic device 100, the receiver 170B may be put close to a human ear to listen to a voice.

The microphone 170C, also referred to as a "mic" or "mike", is configured to convert a sound signal into an electrical signal. When making a call or sending a voice message, the user may make a sound by approaching the mouth to the microphone 170C, to input a sound signal to the microphone 170C. At least one microphone 170C may be disposed in the electronic device 100. In some other embodiments, two microphones 170C may be disposed in the electronic device 100, to implement a noise reduction function in addition to listening to a voice message. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied onto the pressure sensor 180A, a capacitance between electrodes changes. The electronic device 100 determines intensity of a pressure based on a change of the capacitance. When a touch operation is performed on the display 194, the electronic device 100 detects strength of the touch operation by using the pressure sensor 180A. The electronic device 100 may also calculate a touch position based on a detected signal of the pressure sensor 180A.

The touch sensor 180K is also referred to as a "touch panel". The touch sensor 180K may be disposed in the display 194. The touch sensor 180K and the display 194 form a touchscreen, also referred to as a "touch control screen". The touch sensor 180K is configured to detect a touch operation acting on or near the display 194. The touch sensor may transmit a detected touch operation to the application processor to determine a type of a touch event. A visual output related to the touch operation may be provided by using the display 194. In some other embodiments, the touch sensor 180K may alternatively be disposed on a surface of the electronic device 100, at a position different from that of the display 194.

The key 190 includes a power-on key, a volume key, or the like. The key 190 may be a mechanical key, or may be a touch key: The electronic device 100 may receive a key input and generate a key signal input related to user settings and function control of the electronic device 100.

The motor 191 may generate a vibration prompt. The motor 191 may be configured to provide a vibration prompt for an incoming call, and may be further configured to provide vibration feedback for a touch.

The electronic device 100 implements a display function by using the GPU, the display 194, the application processor, and the like. The GPU is a microprocessor for image processing and is connected to the display 194 and the application processor. The GPU is configured to perform mathematical and geometric computing for graphics rendering. The processor 110 may include one or more GPUs, and the one or more GPUs execute program instructions to generate or change displayed information.

The display 194 is configured to display an image, a video, and the like. In some embodiments, the electronic device 100 may include one or N displays 194, where N is a positive integer greater than 1.

The camera 193 is configured to capture a still image or a video. In some embodiments, the electronic device 100 may include one or N cameras 193, where N is a positive integer greater than 1.

The SIM card interface 195 is configured to connect to a SIM card. The SIM card may be inserted into the SIM card interface 195 or removed from the SIM card interface 195 to implement contact with and separation from the electronic device 100. The electronic device 100 may support one or N SIM card interfaces, where N is a positive integer greater than 1.

A specific structure of an execution body of a network acceleration method is not particularly limited in embodiments of this application, provided that code recoding the network acceleration method in embodiments of this application can be run to perform processing according to the network acceleration method provided in embodiments of this application. For example, the execution body of the network acceleration method provided in embodiments of this application may be a functional module that is in an electronic device and that can invoke a program and execute the program or a processing apparatus applied to an electronic device, for example, a chip.

A plurality of applications such as a social and communication application, a game application, an audio/video application, and a news application may be installed and run in the electronic device shown in FIG. 1. A network connection may be established between these applications and another electronic device (for example, a server corresponding to the applications) by using the electronic device in which these applications are located.

For example, a network connection may be established between an application A and a server corresponding to the application A by using a wireless network interface card (which may also be referred to as a Wi-Fi network interface card) in an electronic device in which the application A is located: or the network connection may be established between the application A and the server corresponding to the application A by using a data service network interface card in the electronic device in which the application A is located. The wireless network interface card is an apparatus that supports network access by using a wireless local area network (WLAN); and the data service network interface card is an apparatus that supports network access by using a mobile communication technology; for example, a general packet radio service (GPRS), an enhanced data rate for GSM evolution (EDGE), time division-synchronous code division multiple access (TD-SCDMA), high speed downlink packet access (HSDPA), wideband code division multiple access (WCDMA), long term evolution (LTE), or a 5th generation mobile communication technology (5G).

For ease of description, a network channel established between an electronic device and another electronic device by using a wireless network interface card may be denoted as a Wi-Fi network; and a network channel established between an electronic device and another electronic device by using a data service network interface card is denoted as a cellular network.

In actual application, different applications (or different types of applications) have different requirements for quality of a used network channel.

Figure 2:
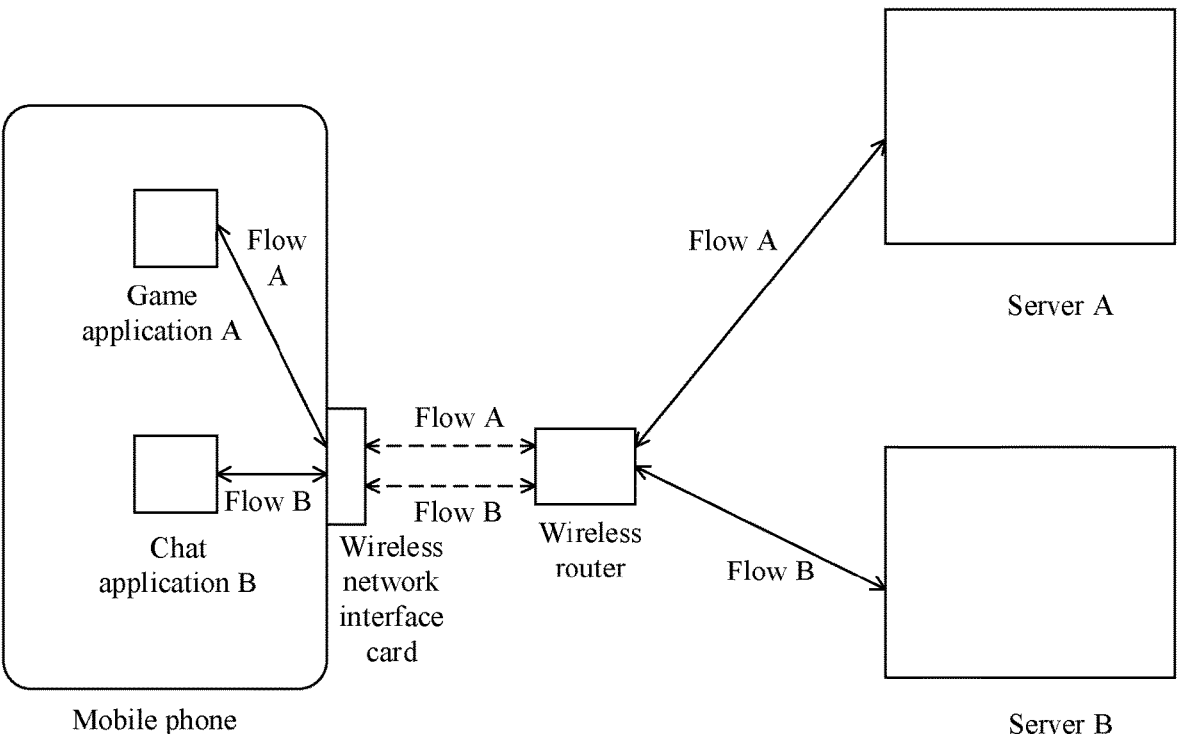
FIG. 2 is a schematic diagram of an application scenario according to an embodiment of this application.

Refer to FIG. 2. A user plays a game by using an application A (a game application) in a mobile phone, where a network connection is established between the application A in the mobile phone and a server A of the application A by using a wireless network interface card in the mobile phone, and a data flow A (for example, a data flow generated during fighting in the game) generated between the application A and the server A is transmitted by using a Wi-Fi network between the wireless network interface card of the mobile phone and a wireless router. The user uses an application B (a chat application) in the mobile phone to chat, a network connection is established between the application B in the mobile phone and a server B of the application B by using the wireless network interface card of the mobile phone, and a data flow B (for example, a data flow generated during chatting) generated between the application B and the server B is transmitted by using the Wi-Fi network between the wireless network interface card of the mobile phone and the wireless router.

In this embodiment of this application, a data sequence transmitted between two electronic devices is denoted as a data flow. In actual application, based on an application scenario of the data flow; the data flow may be a video flow, an audio flow; a download flow, a session flow, and the like.

If the user uses the application A in the mobile phone and the application B in the mobile phone at a same position (a same distance between the wireless network interface card and the wireless router) and within a same time range (for example, within half an hour), there is no significant difference in quality of the Wi-Fi network in theory. However, because the data flow A generates a larger amount of data per unit time compared with the data flow B, the data flow A has a higher requirement for the quality of the Wi-Fi network compared with the data flow B. In this case, the user uses the application B smoothly; but a freezing phenomenon may occur when the user uses the application A, resulting in poor user experience.

Figure 3:
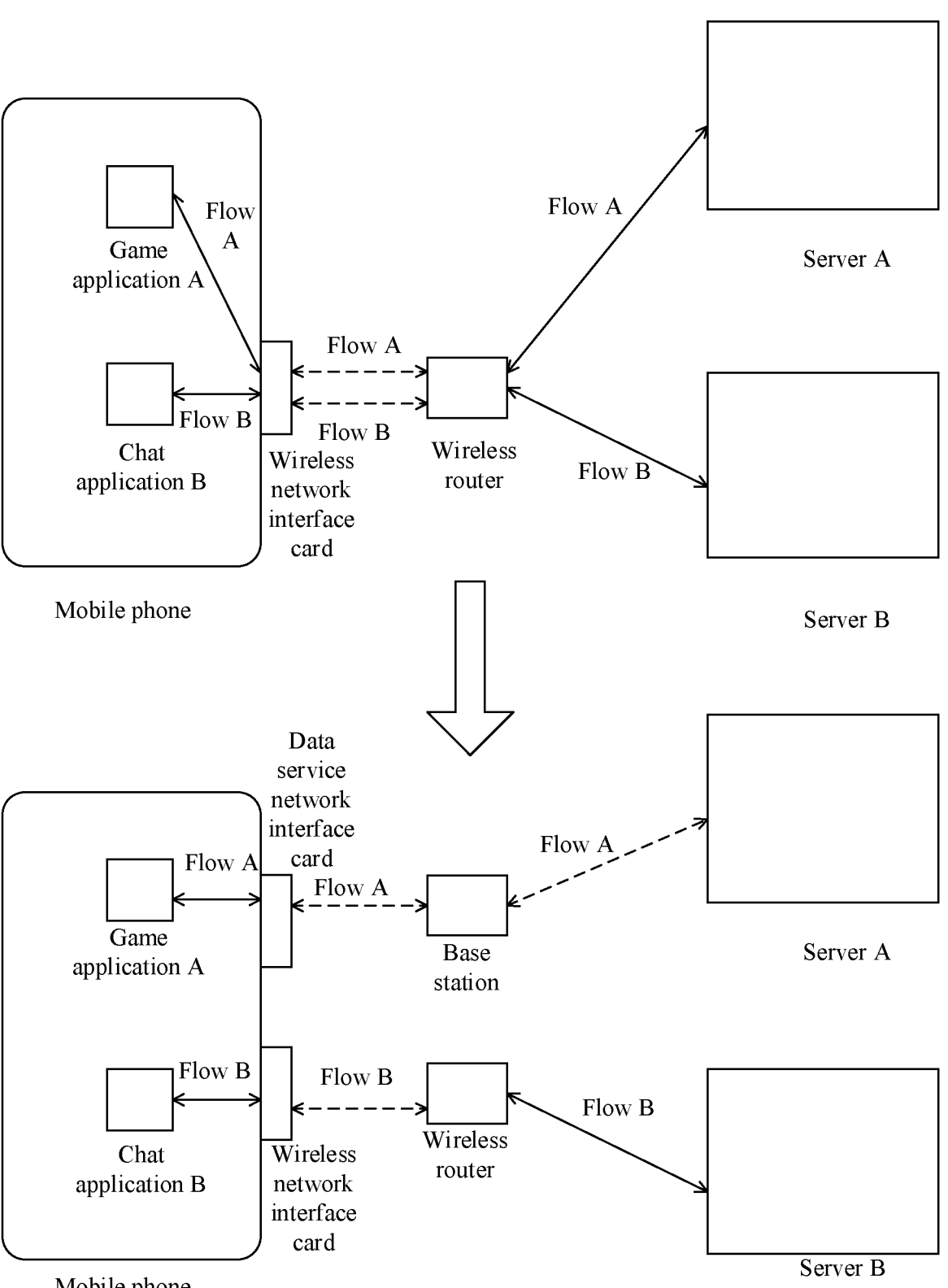
FIG. 3 is a schematic diagram of a network acceleration method according to an embodiment of this application.

Therefore, different applications (or different types of applications) have different requirements for quality of a network channel. In this embodiment of this application, different network quality evaluation algorithms may be set for different applications (or different types of applications). When it is evaluated that a network channel currently used by a specific application is insufficient to carry a data flow generated by the application (for example, the user carrying the mobile phone is away from the wireless router), a transmission quality improvement policy is set to accelerate transmission of the data flow:

Refer to FIG. 3. When it is evaluated based on the network quality evaluation algorithm that transmission quality of the data flow A of the application A is poor, the data flow A may be switched from the current Wi-Fi network to another network channel. As shown in FIG. 3, the mobile phone may switch the data flow A to a cellular network between the data service network interface card of the mobile phone and a base station, to transmit the data flow A to the server A by using the cellular network.

In addition, even when the user processes different services by using a same application, requirements for quality of a network channel used by the application may be different.

Figure 4:
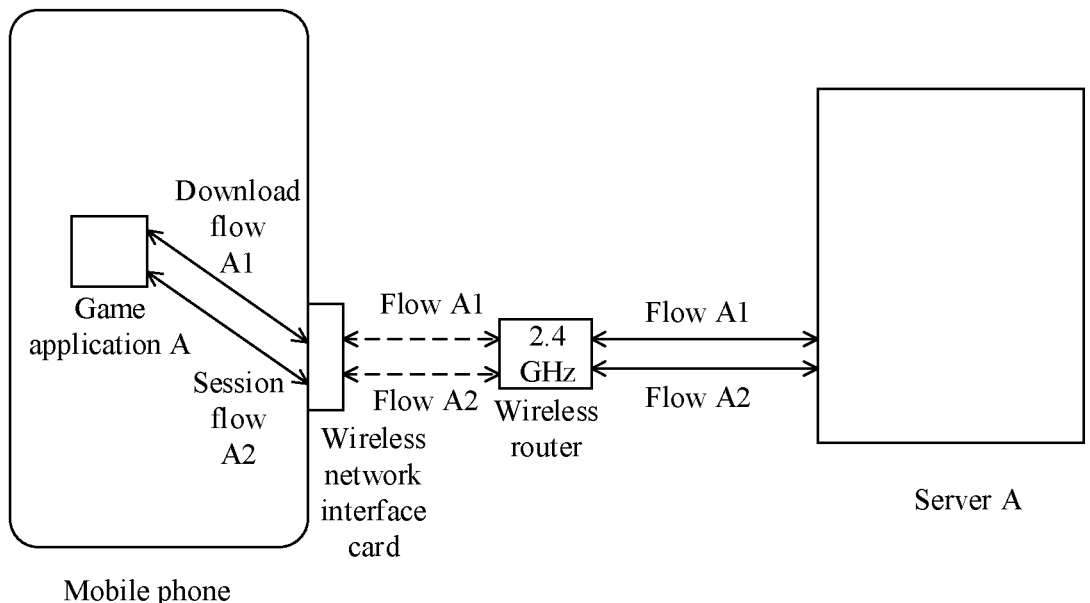
FIG. 4 is a schematic diagram of another application scenario according to an embodiment of this application.

Refer to FIG. 4. When a user uses an application A for download, a download flow A1 is generated. When the user uses the application A for performing session, a session flow A2 is generated. Both the download flow A1 and the session flow A2 may be transmitted by using a Wi-Fi network between a wireless network interface card and a 2.4 GHz wireless router.

If the user uses the application A in a mobile phone to separately perform download and session at a same position (a same distance between the wireless network interface card and the wireless router) and within a same time range (for example, within half an hour), there is no significant difference in quality of a network channel in theory. However, because the data flow A1 generates a larger amount of data per unit time compared with the data flow A2, the data flow A1 has a higher requirement for the quality of the network channel compared with the data flow B. The user performs session smoothly when using the application A, but the user may feel that a download rate is excessively slow when using the application A for download, resulting in poor user experience.

Figure 5:
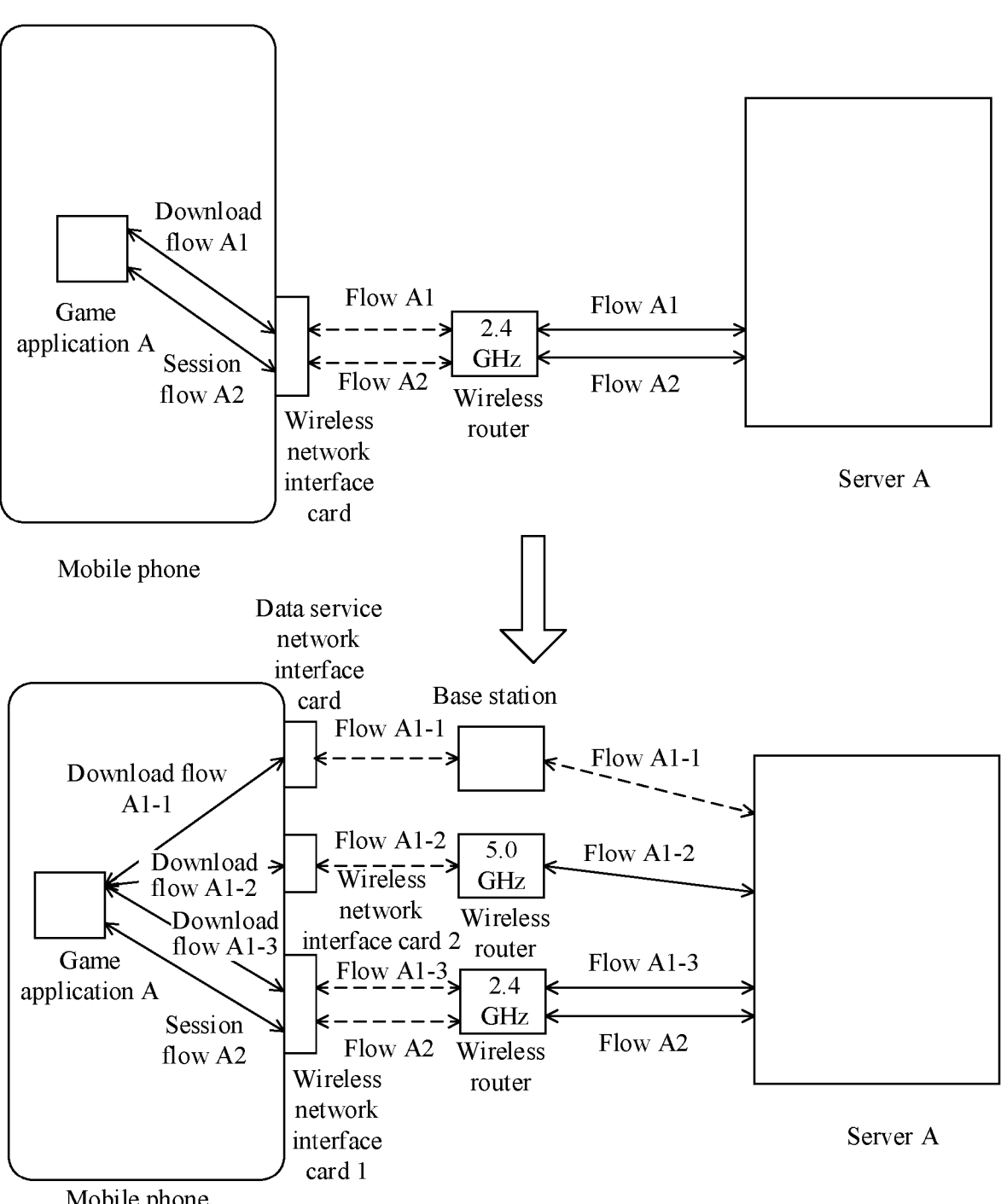
FIG. 5 is a schematic diagram of another network acceleration method according to an embodiment of this application.

Therefore, different service scenarios of a same application have different requirements for the quality of the network channel. In this embodiment of this application, different network quality evaluation algorithms may be set for different service scenarios of a same application. When it is evaluated that a network channel currently used by an application is insufficient to carry a specific data flow generated by the application, a transmission quality improvement policy is set to accelerate transmission of the data flow:

Refer to FIG. 5. When it is evaluated based on the network quality evaluation algorithm that transmission quality of the data flow A1 of the application A is poor, the data flow A1 may be allocated to a plurality of network channels for transmission. As shown in FIG. 3, a wireless network interface card 1 is disposed in the mobile phone, and supports reception and transmission at 2.4 GHz; a wireless network interface card 2 is further disposed, and supports reception and transmission at 5.0 GHz; and a data service network interface card is further disposed. The data flow A1 may include a plurality of data subflows, and the plurality of data subflows may be classified into three groups of data flows: a data flow A1-1, a data flow A1-2, and a data flow A1-3. The three data flows are respectively allocated to three network channels for transmission.

It should be noted that the wireless router in FIG. 5 may be a wireless router that supports reception and transmission at both 2.4 GHZ and 5.0 GHZ, or may be two routers that respectively support reception and transmission at 2.4 GHZ and reception and transmission at 5.0 GHZ.

It may be understood from FIG. 3 and FIG. 5 that different transmission quality improvement policies (for example, switching in FIG. 3 and concurrency in FIG. 5) may be further set to accelerate data flow transmission, thereby improving user experience.

In this embodiment of this application, network quality of a specific network channel or transmission quality of a specific data flow on a specific network channel may be evaluated based on some parameters. In a specific implementation, some conditions may be set. For example, when a condition 1 is met, it is considered that an evaluation result is "good" (excellent), and when the condition 1 is not met, it is considered that the evaluation result is "bad" (poor): or when a condition 2 is met, it is considered that an evaluation result is "bad" (poor), and when the condition 2 is not met, it is considered that the evaluation result is "good" (excellent). Network quality and transmission quality determining conditions are not limited in this embodiment of this application.

In view of the foregoing descriptions in FIG. 2 to FIG. 5, an embodiment of this application provides a network acceleration method. In the network acceleration method, a developer may preset different network quality evaluation algorithms and different transmission quality improvement policies for different applications (or different types of applications).

Certainly, in actual application, different network quality evaluation algorithms and a same transmission quality improvement policy may alternatively be set for different applications (or different types of applications): or a same network quality evaluation algorithm and different transmission quality improvement policies may be set for different applications (or different types of applications).

Further, different network quality evaluation algorithms and different transmission quality improvement policies may be set for different service scenarios of a same application.

Certainly, in actual application, different network quality evaluation algorithms and a same network quality improvement policy may alternatively be set for different service scenarios of a same application: or a same network quality evaluation algorithm and different transmission quality improvement policies may be set for different service scenarios of a same application.

In view of the foregoing descriptions, network acceleration methods shown in Table 1 may be obtained. In the network acceleration methods, network acceleration policies may be considered to be set for different application types and/or different service scenarios. When the network acceleration policies are set, different network quality evaluation algorithms and/or different transmission quality improvement policies may be used.

TABLE 1

| A plurality of network acceleration methods | | | | |
|---|---|---|---|---|
| Method | Application type | Service scenario | Evaluation algorithm | Improvement policy |
| 1 | Included for consideration | Excluded for consideration | Different | Same |

TABLE 1-continued

| | | A plurality of network acceleration methods | | |
|---|---|---|---|---|
| Method | Application type | Service scenario | Evaluation algorithm | Improvement policy |
| 2 | Included for consideration | Excluded for consideration | Same | Different |
| 3 | Included for consideration | Excluded for consideration | Different | Different |
| 4 | Excluded for consideration | Included for consideration | Different | Same |
| 5 | Excluded for consideration | Included for consideration | Same | Different |
| 6 | Excluded for consideration | Included for consideration | Different | Different |
| 7 | Included for consideration | Included for consideration | Different | Same |
| 8 | Included for consideration | Included for consideration | Same | Different |
| 9 | Included for consideration | Included for consideration | Different | Different |

A network acceleration method 9 in Table 1 is used as an example. Different network quality evaluation algorithms may be set for different types of applications in different service scenarios (for example, determined based on a feature of a data flow of an application). When it is evaluated based on the network quality evaluation algorithms that network quality is poor (or some parameters used for evaluating the network quality meet a specific condition), different network quality improvement policies are used to implement network acceleration. Other network acceleration methods are not illustrated one by one.

Figure 6:
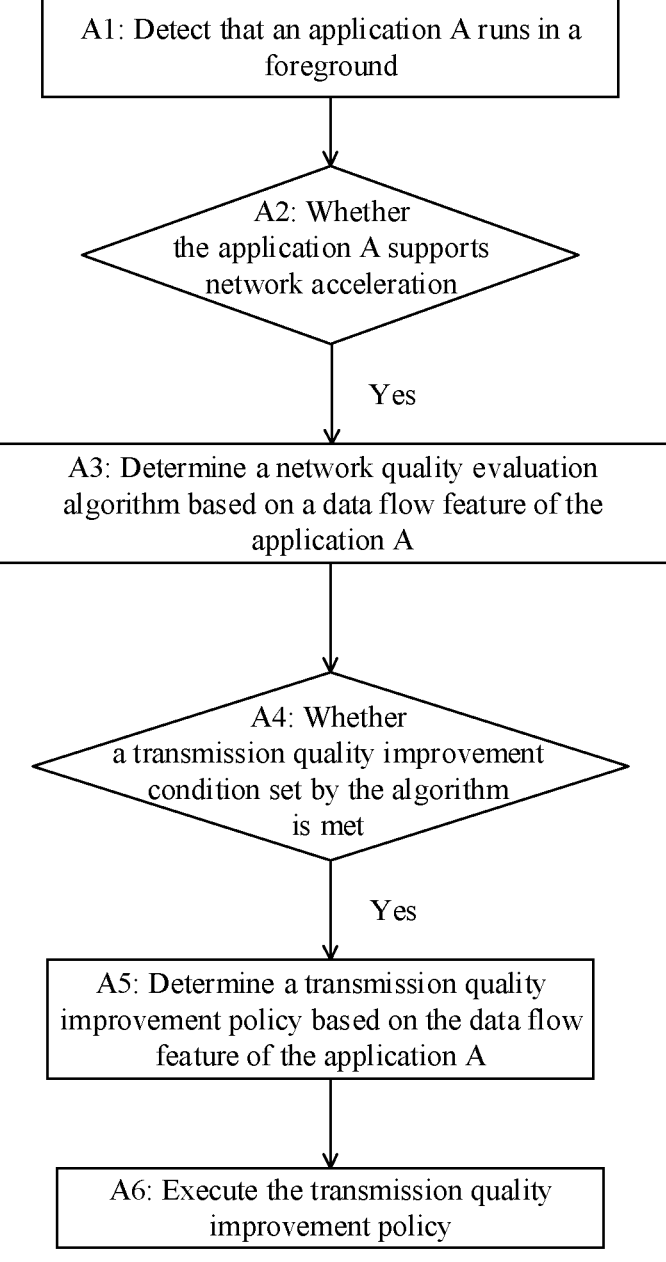
FIG. 6 is a schematic flowchart of a network acceleration method according to an embodiment of this application.

FIG. 6 is a schematic flowchart of a network acceleration method according to an embodiment of this application. This schematic flowchart corresponds to the network acceleration method 9 in the foregoing Table 1.

Step A1: An electronic device detects that an application A runs in a foreground.

In this embodiment of this application, the application A may be any application that can be networked and use a network in the electronic device. That an electronic device detects that an application A runs in a foreground may be that the electronic device detects that the application A runs in the foreground after being enabled, or may be that it is detected through monitoring that the application A is switched from a background to the foreground for running.

Step A2: The electronic device determines whether the application A supports network acceleration.

In this embodiment of this application, the electronic device stores an application configuration library: The application configuration library may be preset by a developer, or may be set or added by a user in a process of using the electronic device. The application configuration library stores an identifier of an application that supports network acceleration.

After detecting that the application A is switched to the foreground, the electronic device may obtain an application identifier of the application A, and query whether the application identifier of the application A exists in the application configuration library: If the application identifier of the application A exists, it represents that the application A supports network acceleration.

Certainly; the foregoing manner of determining whether the application A supports network acceleration is merely used as an example. In actual application, the application configuration library may further store a plurality of application identifiers, and a different character is used for each application identifier to represent whether an application represented by the application identifier supports network acceleration. For example, "1" may be used to represent that network acceleration is supported, and "0" is used to represent that network acceleration is not supported. Other manners of determining whether an application supports network acceleration are not illustrated one by one.

Step A3: When the application A supports network acceleration, the electronic device queries a feature of a data flow of the application A to obtain a network quality evaluation algorithm corresponding to the feature of the data flow of the application A.

In an implementation of this application, different service scenarios are set to facilitate understanding a function of setting different network quality evaluation algorithms. In addition, used network quality evaluation algorithms are determined based on the different service scenarios. However, in actual application, features of data flows generated in different service scenarios may be different. Therefore, it is not necessary to determine a current service scenario of the application A, and a network quality evaluation algorithm that should be used currently may be determined based on a feature of a current data flow of the application A. Various types of information about the data flow of the application A may be stored in a flow feature library of the application A.

In a specific implementation, a Netfilter component exists in a system of the electronic device, and a data flow of an application corresponding to a specific application identifier may be obtained by using the component.

For example, if a network channel that carries the data flow of the application A is a network channel 1, the Netfilter component may obtain packets of the data flow of the application A on the network channel 1. If network channels that carry the data flow of the application A are a network channel 1 and a network channel 2, the Netfilter component may obtain packets of the data flow of the application A on the network channel 1 and the network channel 2.

Certainly, in actual application, the packets of the data flow may alternatively be obtained in another manner. A set of the obtained packets of the data flow is a flow feature library.

When a network quality evaluation algorithm is determined based on a feature of a data flow of an application, a protocol, a port, and a packet feature of the data flow of the application may be used as the feature to determine the network quality evaluation algorithm. The protocol is a protocol type used when the data flow of the application is transmitted, the port is a port used when the data flow is transmitted, and the packet feature is a header feature of a data packet used when the data flow of the application is transmitted.

For example, when a specific social and communication application is used to make an audio/video call, a header feature of a data packet corresponding to a data flow begins with 97, that is, $data[0]=97$, a UDP protocol is used to transmit the data packet, and an 8080 port is used to transmit the data packet. In obtained data flows, if a specific data flow meets the foregoing feature, a network quality evaluation algorithm that matches the feature may be obtained as follows: Within three consecutive periods of five periods (for example, each period is 500 ms), if latencies of data exceed 300 ms or packet loss rates exceed 20%, an evaluation result is "freezing".

The foregoing example of determining the network quality evaluation algorithm is merely used for illustration. In actual application, the network quality evaluation algorithm may alternatively be determined based on a feature other than the protocol, the port, and the packet feature.

Certainly; when implementing a specific function, a specific application may generate a plurality of data flows. If network quality evaluation algorithms are respectively determined for features of the plurality of data flows, a corresponding network quality evaluation algorithm is used to evaluate transmission quality of a corresponding data flow.

For example, when implementing a specific function, a specific application may generate a data flow 1, a data flow 2, and a data flow 3.

A network quality evaluation algorithm 1 is determined based on a feature of the data flow 1, and whether the data flow 1 meets a transmission quality improvement condition set by the algorithm 1 is determined.

A network quality evaluation algorithm 2 is determined based on a feature of the data flow 2, and whether the data flow 2 meets a transmission quality improvement condition set by the algorithm 2 is determined.

If a feature of the data flow 3 does not meet any condition for determining a network quality evaluation algorithm, transmission quality of the data flow 3 does not need to be evaluated, and the transmission quality of the data flow 3 does not need to be improved.

Step A4: The electronic device determines whether a related parameter of the data flow of the application A meets a transmission quality improvement condition set by the algorithm.

It should be noted that, in actual application, a transmission quality evaluation result of the data flow of the application A may be obtained based on an algorithm model and the related parameter of the data flow of the application A (for example, a quality score or a quality level may be obtained), and whether transmission quality of the data flow needs to be improved is determined based on the transmission quality evaluation result. Certainly; in actual application, the transmission quality improvement condition for the data flow may be preset by the algorithm. When the condition is met, a transmission quality improvement policy is obtained and executed.

The network quality evaluation algorithm in step A3 is used as an example. A latency; a packet loss rate, and the like of each data flow of the application A need to be obtained.

As described above, the flow feature library of the application A stores the various types of information about the data flow of the application A, for example, a protocol feature of a protocol used when the application uses a current network, and a header feature of a data packet transmitted when the application uses the current network. Certainly; the information may further include a traffic feature existing when the application uses the current network.

The traffic feature of the application may include information such as an uplink rate, a downlink rate, a flow interval time, a packet interval time, a packet size, and traffic distribution. Certainly; the traffic feature of the application may alternatively include some information in the foregoing information or information other than the foregoing information.

A latency condition, a packet loss condition, the downlink rate, the uplink rate, and the like may be obtained based on the traffic feature. Therefore, the traffic feature may be used as an evaluation parameter of the network quality evaluation algorithm. Certainly, in actual application, parameters obtained from different network quality evaluation algorithms for evaluating network quality may be different. For example, the parameters may include one or more of the foregoing parameters, or may include a parameter other than the foregoing parameters. Therefore, a type of a parameter included in the traffic feature of the application may be determined based on the evaluation parameter of the network quality evaluation algorithm.

Step A5: When the related parameter of the data flow of the application A meets the condition set by the algorithm, determine a transmission quality improvement policy based on the feature of the data flow of the application A.

As described above, different transmission quality improvement policies may be preset for different service scenarios (determined by a feature of a data flow) of different applications, and the plurality of transmission quality improvement policies are stored in an improvement policy library: Certainly; in actual application, a correspondence between the feature of the data flow and the transmission quality improvement policy may alternatively be set. After the feature of the data flow is determined, the transmission quality improvement policy corresponding to the feature of the data flow may be obtained. The transmission quality improvement policy that matches the feature can be queried in the improvement policy library based on the feature of the data flow:

A6: Execute the transmission quality improvement policy.

In this embodiment of this application, one application may generate a plurality of data flows in a specific service scenario. In actual application, if features of some of the plurality of data flows meet a preset transmission quality improvement condition, the data flows that meet the preset transmission quality improvement condition may be switched to another network channel. Certainly; the data flows that meet the preset transmission quality improvement condition and data flows related to the data flows that meet the preset transmission quality improvement condition may alternatively be switched to another network channel. Relevance between the data flows may be preset, for example, a plurality of download flows that are in a download application and that have a same source address and a same destination address may be set as related data flows, or a video flow and an audio flow that are in a chat application and that have a same source address and a same destination address may be set as related data flows. Alternatively, all the data flows of the application may be switched to another network channel.

For another example, in actual application, if features of some of the plurality of data flows meet a preset transmission quality improvement condition, the data flows that meet the preset transmission quality improvement condition may alternatively be allocated to a plurality of network channels supported by the electronic device. Alternatively, the data flows that meet the preset transmission quality improvement condition and data flows related to the data flows that meet the preset transmission quality improvement condition may be allocated to a plurality of network channels. Certainly; all the data flows of the application may alternatively be allocated to a plurality of network channels supported by the electronic device.

For another example, in actual application, if features of some of the plurality of data flows meet a preset concurrency condition, the data flows that meet the concurrency condition may be first allocated to a plurality of network channels. When a feature of a specific data flow in the plurality of data flows on the plurality of network channels meets a preset transmission quality improvement condition, the data flow that meets the preset transmission quality improvement condition is switched to a network channel with better quality:

For another example, corresponding network quality evaluation algorithms and corresponding transmission quality improvement policies may be determined based on features of data flows in Table 2.

quality, the flow with poor quality is switched to another network. If three or more flows have poor quality, all flows (the 10 flows) of the application are switched to an alternate network.

In addition, in a specific implementation, different application identifiers may be set for different applications. The transmission quality improvement condition set by the net-

TABLE 2

Flow features, network quality evaluation algorithms, and transmission quality improvement policies of a plurality of applications in a plurality of service scenarios

| Application package name | Feature condition for a data flow (protocol + port + packet feature) | Transmission quality improvement condition set by a network quality evaluation algorithm (500 ms for each period) | Network quality improvement policy |
| --- | --- | --- | --- |
| com.tencent.mm | udp protocol + 8080/8000 port + 97 or 50 packet header | Within three consecutive periods of five periods, latencies exceed 300 ms or packet losses exceed 20% | Switching |
| com.tencent.tmgp.sgame | udp protocol + any port + 0x10 packet header | Latencies within three consecutive periods of five periods exceed 150 ms or packet losses within three consecutive periods of four periods exceed 20% | Switching |
| | TCP protocol + 443/80 port + GET prefix | A data flow is allocated to a plurality of network channels; and after the data flow is allocated to the plurality of network channels, rates within three consecutive periods of four periods are less than 5 kb | Concurrency |
| | TCP protocol + GET prefix | Latencies within four consecutive periods of five periods exceed 300 ms or there is no downlink packet response within three consecutive periods | Switching |

In Table 2, com.tencent.mm may be a packet name of WeChat, and com.tencent.tmgp.sgame may be a packet name of Arena of Valor. Features of the data flows each may be a protocol, a port, and a packet feature. An entry in Table 2 may be a feature condition for a data flow, a network quality evaluation algorithm, and a network quality improvement policy that are set for a service scenario of an application. In addition, Table 2 lists only protocols, ports, and packet features corresponding to some service scenarios of some applications, and is merely used as an example.

The network quality evaluation algorithms and the transmission quality improvement policies in Table 2 are merely examples. In actual application, other different manners of determining the network quality evaluation algorithms and different transmission quality improvement policies may alternatively be used. "Switching" in the transmission quality improvement policies may represent switching in any form in the foregoing embodiments. "Concurrency" may represent concurrency in any form in the foregoing embodiments.

For another example, in a service scenario in which a Taobao application in the mobile phone is used to browse text and an image of a product and watch a product video, only a flow with poor evaluated network quality can be switched to another network, or all flows of the application can be switched to another network when a quantity (or a proportion) of flows with poor quality is greater than a preset value (or a preset proportion).

For example, the application may generate 10 flows in a specific service scenario. If only one or two flows have poor work quality evaluation algorithm may be obtained when the feature of the data flow meets the feature condition. When the related parameter of the data flow meets the transmission quality improvement condition, the transmission quality improvement policy is obtained and executed.

In actual application, Table 2 lists only features of some data flows of some applications, and corresponding network quality evaluation algorithms and transmission quality improvement policies. In actual application, other network quality evaluation algorithms and transmission quality improvement policies may alternatively be used. For example, a network quality evaluation algorithm in Table 3 may alternatively be used.

TABLE 3

Network quality evaluation algorithm

| | |
| --- | --- |
| Transmission quality improvement condition | Within three consecutive periods of five periods, latencies exceed 300 ms or packet losses exceed 20% |
| set by the network quality evaluation | Downlink rates within four consecutive periods of five periods are less than 60 KB |
| algorithm (500 ms for each period) | Latencies within three consecutive periods of five periods exceed 150 ms or packet losses within three consecutive periods of four periods exceed 20% |
| | A data flow is allocated to a plurality of network channels; and after the data flow is allocated to the plurality of network channels, rates within three |

TABLE 3-continued

Network quality evaluation algorithm consecutive periods of four periods are
less than 5 kb
Latencies within four consecutive periods
of five periods exceed 300 ms or there
is no downlink packet response within
three consecutive periods
Latencies within four consecutive periods
of five periods exceed 400 ms or there
is no downlink packet response within
three consecutive periods
Downlink rates within three consecutive
periods of four periods are less than 10 kb
Latencies within four consecutive periods
of five periods exceed 350 ms or packet
loss rates within three consecutive periods
of six periods exceed 20%
Uplink retransmission rates within three
consecutive periods of six periods exceed
20% or downlink latencies within three
consecutive periods of four periods exceed
100 ms
A data flow is allocated to a plurality
of network channels; and after the data
flow is allocated to the plurality of
network channels, rates within two
consecutive periods of three periods
are less than 15 KB
Downlink rates within four consecutive
periods of five periods are less than 60 KB
Latencies within four consecutive periods
of five periods exceed 350 ms or uplink
retransmission rates within three consecutive
periods of six periods exceed 20%
Latencies within two consecutive periods
of four periods exceed 350 ms or downlink
rates within five consecutive periods of
seven periods are less than 51 kb Certainly, in actual application, the network quality transmission algorithm in Table 3 is merely used as an example. In actual application, an algorithm other than the network quality transmission algorithm shown in Table 3 may alternatively be used. This is not limited in this embodiment of this application.

After the network acceleration method provided in this embodiment of this application is described, the following describes technical implementation details for implementing the network acceleration method.

Figure 7:
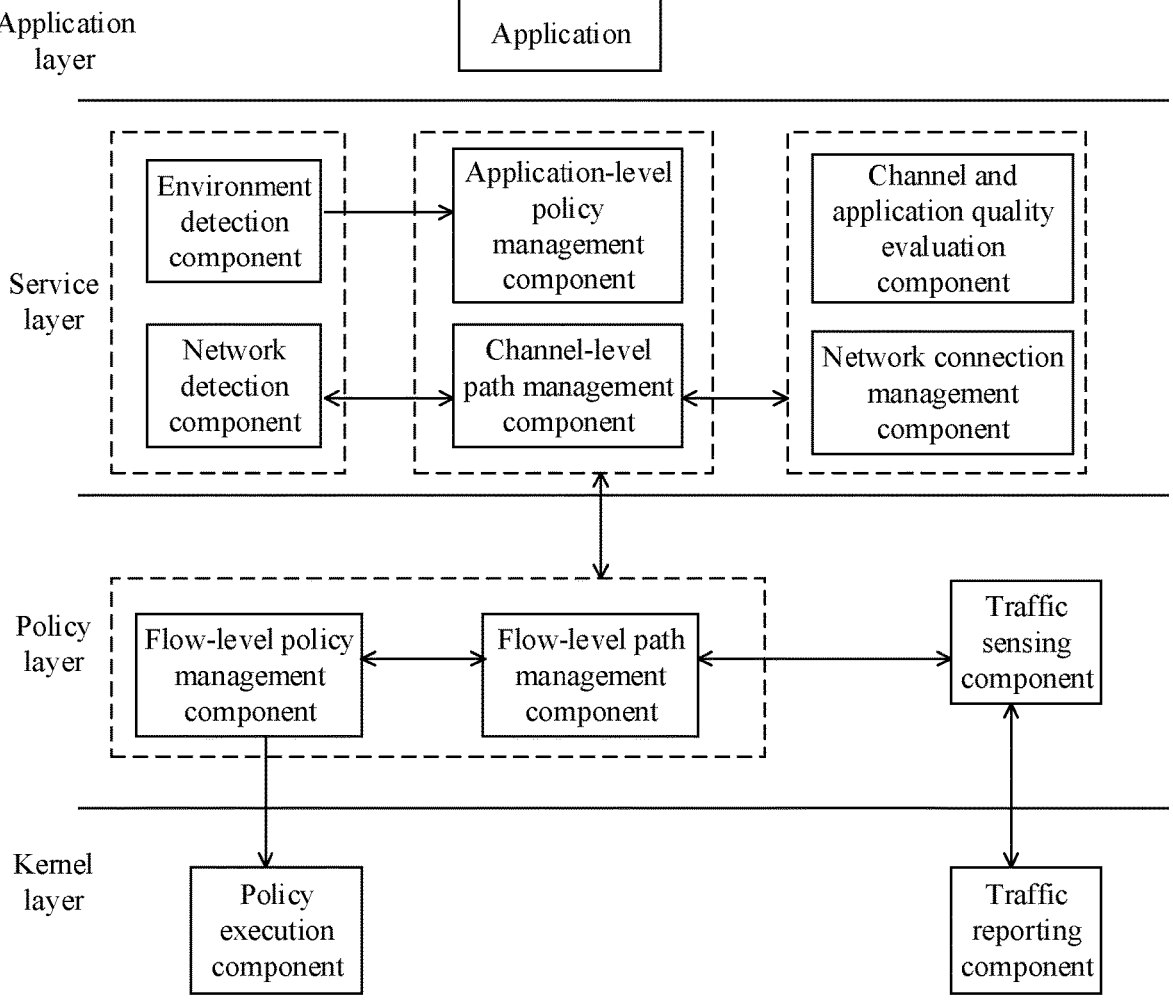
FIG. 7 is a diagram of a technical architecture according to an embodiment of this application.

FIG. 7 is a diagram of a technical architecture of a network acceleration method according to an embodiment of this application.

The technical architecture includes an application layer, a service layer, a policy layer, and a kernel layer. FIG. 7 shows only some layers and some components related to this embodiment of this application. In actual application, a layer and a component that are not shown in FIG. 7 may be further included. Certainly, only some of the components shown in FIG. 7 may alternatively be included.

Various applications such as the foregoing video application or game application exist at the application layer.

An environment detection component, a network detection component, a channel-level path management component, an application-level policy management component, a channel and application quality evaluation component, and a network connection management component exist at the service layer.

The environment detection component is configured to detect various events of an upper-layer application, for example, may detect enable/disable of an application, detect an application that is currently switched to the foreground, and detect installation and uninstallation of an application. The network detection component is configured to detect a state (enabled, disabled, or the like) of a Wi-Fi network supported by the electronic device, and may further detect a state of a data service network supported by the electronic device. For example, a wireless network interface card 1 of a 2.4 GHz frequency band and a wireless network interface card 2 of a 5.0 GHz frequency band are disposed in the electronic device. The network detection component may detect whether a wireless network in the 2.4 GHz frequency band is in an enabled state or a disabled state, and may further detect whether a wireless network in the 5.0 GHz frequency band is in an enabled state or a disabled state. A data service network interface card 1 of an operator A and a data service network interface card 2 of an operator B are disposed in the electronic device. The network detection component may detect whether a data service of the operator A is in an enabled state or a disabled state, and may further detect whether a data service of the operator B is in an enabled state or a disabled state.

The channel and application quality evaluation component is configured to evaluate quality of a network channel. For example, the channel and application quality evaluation component may evaluate quality of a Wi-Fi network in the 2.4 GHz frequency band, and may further evaluate quality of a Wi-Fi network in the 5.0 GHz frequency band. The channel and application quality evaluation component may also evaluated quality of a cellular network of the operator A, and may further evaluate quality of a cellular network of the operator B. The network connection management component is configured to enable a network channel, that is, change the network channel from a sleep state to a wake-up state. The network channel in the wake-up state may be directly used.

The channel-level path management component stores paths of a plurality of network channels, and is configured to request or disable any network channel, to sense a state change of any network channel and sense quality of any network channel. The application-level policy management component is configured to enable a network acceleration function and enable a data flow monitoring function.

A flow-level policy management component, a flow-level path management component, and a traffic sensing component are disposed at the policy layer. The traffic sensing component is configured to collect statistics on reported data flows and evaluate network quality of each flow: The flow-level policy management component stores a transmission quality improvement policy for a flow in an application, and is further configured to indicate execution of the transmission quality improvement policy: The flow-level path management component is configured to update network channel selection based on an upper-layer policy change, trigger network channel quality detection, and dynamically select an optimal channel, and may be further configured to store paths of different network channels, for example, may store a path of a network channel (for example, a primary network channel) currently used by an application and a path of an alternate network channel.

A policy execution component and a traffic reporting component exist at the kernel layer. The traffic reporting component is configured to collect data flow information, and report the collected data flow information. The policy execution component is configured to perform network channel switching.

In another embodiment of this application, one component in the foregoing embodiment may be split into two or more components, and two or more components at a same layer may be combined into a same component.

For example, the flow-level policy management component and the flow-level path management component at the policy layer may be combined into a same component, and the application-level policy management component and the channel-level path management component may be combined into a same component.

To have a clearer understanding of the foregoing architectural diagram, FIG. 8A, FIG. 8B, FIG. 8C, FIG. 8D, and FIG. 8E are a sequence diagram of a network acceleration method implemented based on the components shown in FIG. 7 according to an embodiment of this application.

Step B1: A user enables an application A or switches an application A from a background to a foreground.

Step B2: The environment detection component detects that the application A is enabled or the application A is switched from the background to the foreground, to obtain an identifier of the application A.

Step B3: The environment detection component sends the identifier of the application A to the application-level policy management component.

The identifier of the application is used to uniquely identify the application, and may have a one-to-one correspondence with a packet name of the application or may use a packet name of the application.

Step B4: The application-level policy management component queries, from an application configuration library based on the received identifier of the application A, whether the application A corresponding to the received identifier supports network acceleration. A result queried from the application configuration library is that network acceleration is supported.

Step B5: When the query result is that network acceleration is supported, the application-level policy management component delivers, to the flow-level path management component, information representing that the application A enables network acceleration.

In a specific implementation, the message may carry the identifier of the application A.

Step B6: The flow-level path management component delivers, to the traffic reporting component, a message representing that the application A enables network acceleration.

In a specific implementation, the message may also carry the identifier of the application A, and the message sent in step B6 and the message sent in step B5 may be the same or different.

Step B7: The traffic reporting component receives the information representing that the application A enables network acceleration, and registers a packet listening hook.

The packet listening hook may listen to related information of a data flow of the application A, and the related information is information stored in a flow feature library of the application A. The data flow carries path information of a network that carries the data flow.

After step B4, a path of a network currently used by the application A may be detected, and network quality of the network currently used by the application A may be periodically detected.

As described above, the path of the network currently used by the application A may be determined based on the data flow listened to by the packet listening hook.

For another example, the path of the network currently used by the application A may alternatively be determined according to logic that is set by a system and that is of selecting a primary network when there are a plurality of available networks.

In actual application, if a wireless network interface card 1 of a 2.4 GHz frequency band, a wireless network interface card 2 of a 5.0 GHz frequency band, a data service network interface card 1 of an operator A, and a data service network interface card 2 of an operator B are disposed in an electronic device, one of the wireless network interface card 1 or the wireless network interface card 2 may be considered as primary Wi-Fi by default, the other wireless network interface card is secondary Wi-Fi, one of the data service network interface card 1 of the operator A and the data service network interface card 2 of the operator B is considered as a primary card by default, and the other data service network interface card is a secondary card.

For example, a network channel in the 2.4 GHz frequency band is a primary Wi-Fi network, a network channel in the 5.0 GHz frequency band is a secondary Wi-Fi network, a network channel corresponding to the data service network interface card 1 is a primary cellular network, and a network channel corresponding to the data service network interface card 2 is a secondary cellular network.

When the primary Wi-Fi network is available, the system considers, by default, that a current primary network of the electronic device or the application in the foreground is the primary Wi-Fi network. When the primary Wi-Fi network is unavailable, the system considers, by default, that the current primary network of the electronic device or the application in the foreground is a primary card cellular network. When the primary card cellular network is unavailable, the system considers, by default, that the current primary network of the electronic device or the application in the foreground is the secondary Wi-Fi network. When the secondary Wi-Fi network is unavailable, the system considers, by default, that the current primary network of the electronic device or the application in the foreground is a secondary card cellular network.

When the application A runs in the foreground after being enabled, the application A uses the primary network according to the foregoing rule. Even when the application A is in the foreground, the system switches some data flows of the application A to another network. After the application A is switched to the background, a default primary network of the system is used for the data flows of the application A again. After the application A is switched from the background to the foreground, the application A continues to use the default primary network of the system.

Therefore, in this embodiment of this application, networks in the electronic device may be sequentially requested according to the foregoing rule: the primary Wi-Fi, a primary card network, the secondary Wi-Fi, a secondary card network, and the like, until an available network whose quality meets a requirement is requested. The available network whose quality meets a requirement may be understood as the network currently used by the application A. For details, refer to step C1 to step C8.

Step C1: After receiving the information that is sent by the application-level policy management component and that is used to represent that the application A enables network acceleration, the flow-level path management component sends request information for a primary network to the channel-level path management component.

After receiving the request information, the channel-level path management component sequentially performs requesting in an order of the primary Wi-Fi, the primary card network, the secondary Wi-Fi, and the secondary card network, until the available network whose quality meets a requirement is found, where the network is the primary network of the application A.

Step C2: The channel-level path management component sends request information for a state of the primary Wi-Fi to the network detection component, where the request information is used to request the state of the primary Wi-Fi.

Step C3: The network detection component determines that the primary Wi-Fi is available.

Step C4: The network detection component returns an available state of the primary Wi-Fi to the channel-level path management component.

Step C5: When receiving the available state of the primary Wi-Fi, the channel-level path management component sends a detection request for quality of the primary Wi-Fi to the channel and application quality evaluation component, where the detection request is used to detect the quality of the primary Wi-Fi.

In this embodiment of this application, network quality of any network may be determined based on a network quality parameter, and the network quality parameter includes at least one of a bandwidth, a latency, and an air interface rate.

Step C6: After evaluating the quality of the primary Wi-Fi, the channel and application quality evaluation component returns a quality monitoring result of the primary Wi-Fi to the channel-level path management component.

In a specific implementation, after step C3, that is, after the network detection component determines that the primary Wi-Fi is available, step D1 may be further performed.

Step D1: The network detection component sends a monitoring message for the quality of the primary Wi-Fi to the channel and application quality evaluation component, where the monitoring message is used to request the channel and application quality evaluation component to monitor network quality of the primary Wi-Fi.

Step D2: After receiving the message, the channel and application quality evaluation component starts to monitor the network quality of the primary Wi-Fi and returns the quality of the primary Wi-Fi to the channel-level path management component.

When the network quality of the primary Wi-Fi is good (for example, a network quality parameter is within a preset range), the primary Wi-Fi may be determined as the primary network of the application A, and the network quality of the primary Wi-Fi may be periodically monitored.

It should be noted that, in step D2, the quality of the network channel is monitored, and a used monitoring algorithm is different from the network quality evaluation algorithm determined based on the feature of the data flow in the foregoing embodiment. For ease of description, the monitoring algorithm used in this step may be denoted as an algorithm A.

In an example of the algorithm A, quality of a network channel may be evaluated with reference to parameters such as a latency, a packet loss rate, a bandwidth, and a rate of the channel.

In the manner of step D1 and step D2, the channel and application quality evaluation component may start to monitor the network quality of the primary Wi-Fi before receiving the detection request sent in step C5, so that the quality of the primary Wi-Fi can be quickly obtained. After the quality of the primary Wi-Fi is obtained, the quality monitoring result of the primary Wi-Fi can be returned to the channel-level path management component in time.

In actual application, after the channel and application quality evaluation component receives a monitoring request sent in step D1, a monitoring result may be obtained for the first time before the detection request sent in step C5 is received, or may be obtained after the detection request sent in step C5.

Step C7: When determining that the network quality of the primary Wi-Fi meets a requirement, the channel-level path management component sends a path of the primary Wi-Fi as the primary network to the flow-level path management component.

Step C8: The flow-level path management component stores the path of the primary Wi-Fi as a path of the primary network.

In another example of this application, if the network detection component obtains an unavailable state of the primary Wi-Fi in step C3, the network detection component does not perform step D1, and correspondingly, the channel and application quality evaluation component does not perform step D2 either. After receiving an unavailable message for the primary Wi-Fi that is sent by the network detection component, the channel-level path tube component does not perform step C5, and correspondingly; the channel and application quality evaluation component does not perform step C6 either.

After receiving the unavailable message for the primary Wi-Fi that is sent by the network detection component, the channel-level path tube component continues to request the primary card network (that is, a next priority network of a currently requested network) in the manner of step C2 to step C6 (which may include step D1 and step D2 or may not include step D1 and D2). If an obtained result is that the primary card network is available and network quality meets the requirement, a path of the primary card network is used as the path of the primary network and is sent to the flow-level path management component, and the flow-level path management component stores the path of the primary card network as the path of the primary network. Similarly; when the network quality of the primary card network meets the requirement, the channel and application quality evaluation component also needs to periodically evaluate quality of the primary card network.

In a process of determining the primary network, step C2 to step C6 need to be cyclically performed, until the primary network of the electronic device is obtained. In this example, in a process of cyclically performing step C2 to step C6, a detected network is a network corresponding to a network interface card of an electronic device. In this process, a network interface card corresponding to each requested network may be denoted as a fourth network interface card.

That is, the electronic device sequentially performs primary network determining steps in a priority order of network interface cards of the electronic device, until the primary network of the electronic device is obtained.

The primary network determining steps include:

The electronic device obtains a network state of a network corresponding to the fourth network interface card, where the fourth network interface card is a network interface card of the electronic device;

when the network state of the fourth network interface card is available, the electronic device obtains a network quality parameter of the fourth network interface card, or when the network state of the fourth network interface card is unavailable, this round of primary network determining steps is terminated to enter a next round of primary network determining steps for a next priority network interface card; and when the network quality parameter of the fourth network interface card is within a preset range, the fourth network interface card is stored as the primary network of the electronic device, or when the network quality parameter of the fourth network interface card is not within the preset range, this round of primary network determining steps is terminated to enter a next round of primary network determining steps for a next priority network interface card.

In actual application, whether network quality of a network meets a requirement may be determined by the channel and application quality evaluation component, and the network quality of the network is periodically evaluated when the requirement is met: or after the channel-level path management component receives a quality monitoring result of a network that is sent by the channel and application quality evaluation component, whether network quality of the network meets a requirement is determined, and when the requirement is met, a request message is sent to the channel and application quality evaluation component to request to periodically evaluate the network quality of the network. In the foregoing manner, the advertisement-level path management component may periodically obtain network quality of a network that currently carries the data flow of the application A, and send, to the flow-level path management component, the obtained network quality of the network that currently carries the data flow of the application A.

It may be understood from the foregoing example that the path of the network currently used by the application A can be obtained according to the logic that is set by the system and that is of selecting the primary network when there are a plurality of available networks.

After the application-level policy management component performs step B4, that is, after it is determined that the application A corresponding to the identifier supports acceleration, in a first aspect, the flow-level path management component transmits, to the lower-layer traffic reporting component, the message representing that the application A enables acceleration, to enable the traffic reporting component to register the packet listening hook: in a second aspect, the network path of the primary network and the network quality of the primary network may be further obtained; and in a third aspect, the traffic sensing component transmits a message for enabling data flow monitoring to the lower-layer traffic reporting component, to enable the traffic reporting component to listen to the data flow of the application A by using the registered packet listening hook (for details, refer to step B8).

Step B8: The application-level policy management component sends a request message for enabling service flow monitoring to the traffic sensing component.

In a specific implementation, the application-level policy management component may simultaneously perform step B5 and step B8 after performing step B4. The application-level policy management component may alternatively perform step B5 after performing step B4, and then perform step B8 at a preset time (a specific value may be set based on an actual situation) after performing step B5.

Step B9: After receiving the request message sent in step B8, the traffic sensing component sends a message for traffic monitoring to the traffic reporting component.

Step B10: After receiving the message for traffic monitoring that is sent in step B9, the traffic reporting component reports a data flow obtained through listening to the traffic sensing module.

After step B7, the packet listening hook in the traffic reporting component starts to listen to the data flow: After receiving the message for traffic monitoring that is sent in step B9, the data flow obtained through listening is reported to the traffic sensing module. In addition, subsequently; a data flow obtained through listening may be continuously reported to the traffic sensing component.

Step B11: The traffic sensing component receives the data flow reported by the traffic reporting component, and determines a network quality evaluation algorithm based on a feature of the data flow:

It should be noted that the network quality evaluation algorithm in step B11 and the network channel evaluation algorithm in step D2 are different. For ease of description, the algorithm in step B11 is denoted as an algorithm B. The algorithm A is a common algorithm for each network channel, and is used to evaluate network quality of an entire network channel. The algorithm B is an algorithm determined based on a feature of a data flow of an application that currently enables network acceleration, and is used to evaluate transmission quality of a data flow that meets a preset feature and that is transmitted through a network channel.

Step B12: The traffic sensing component starts to evaluate transmission quality of each data flow of the application A based on the network quality evaluation algorithm, to obtain an evaluation result.

It should be noted that the evaluation result may include: "excellent" (for example, with an identifier 00), "there may be freezing" (for example, with an identifier 10), and "freezing" (for example, with an identifier 11).

For example, Table 2 shows a condition for evaluating "freezing". In actual application, a condition for evaluating "there may be freezing" may be further set.

Condition 1: Within three consecutive periods of five periods, if latencies exceed 300 ms or packet losses exceed 20%, the evaluation result is "freezing".

Condition 2: Within two consecutive periods of five periods, if latencies exceed 200 ms or packet loss rates exceed 10%, the evaluation result is "there may be freezing".

If the foregoing two situations do not occur, the evaluation result is "excellent".

Based on the foregoing understanding, it can be determined that the network quality evaluation algorithm obtained based on the feature of the data flow includes the condition limited in Table 2 for determining "freezing", and may further include a condition for determining "there may be freezing" in actual application.

For another example, the condition 1 and the condition 2 may be preset. The evaluation result may alternatively include: The condition 1 is met, the condition 2 is met, or neither the condition 1 nor the condition 2 is met.

In a specific implementation, a specific form of the evaluation result is not limited.

Step B13: The traffic sensing component sends the evaluation result to the flow-level policy management component.

It should be noted that the evaluation result sent in this step may be an identifier representing "freezing", "there may be freezing", or "excellent", and may further carry the feature of the data flow (or a feature identifier).

Alternatively, the evaluation result may be an identifier representing that the condition 1 is met, the condition 2 is met, or neither the condition 1 nor the condition 2 is met, and may further carry the feature of the data flow (or a feature identifier).

Step B14: After receiving the evaluation result, the flow-level policy management component determines to request an alternate network when the evaluation result is "there may be freezing" (the condition 2 is met).

For another example, in actual application, a transmission quality improvement policy used when the condition 1 is met and a transmission quality improvement policy used when the condition 2 is met are "switching". However, request information for an alternate path is sent to the flow-level path management component when the condition 2 is met; and switching information for the alternate path is sent to the flow-level path management component when the condition 1 is met.

By using the foregoing setting, the alternate network may be predetermined when it is predicted that the transmission quality of the data flow may deteriorate (for example, the condition 2 is met), and the alternate network is woken up, so that the data flow with poor transmission quality can be quickly switched to the alternate network when the transmission quality of the data flow actually deteriorates (for example, the condition 1 is met). This is because the transmission quality of the data flow usually gradually deteriorates. Therefore, when the transmission quality of the data flow may deteriorate, the alternate network is selected first, and the alternate network is woken up, so that when the transmission quality of the data flow actually deteriorates, the data flow with poor transmission quality is switched to the alternate network that is already woken up. In this way; switching of the data flow can be quickly responded to, so that the user is unaware of switching of the data flow: In addition, a problem of high power consumption caused by prematurely waking up the alternate network can be avoided.

Step B15: When determining that the condition 2 is met, the flow-level policy management component sends the request information for the alternate path to the flow-level path pipeline component.

Step B16: When determining that there is no alternate network currently; the flow-level path management component sends the request message for the alternate path to the channel-level path management component.

After receiving the request message for the alternate path, the channel-level path management component starts to search for an available network with optimal quality other than the currently used primary network. For details, refer to the descriptions in step B17 to step B23.

Step B17: The channel-level path management component sends a query request for a state of a network B to the network detection component.

In this embodiment of this application, the network B may be any network other than the current primary network. The current primary network may be denoted as a network A. The network B may be denoted as a network corresponding to third network interface cards.

Step B18: The network detection component queries that a network state of the network B is available.

Step B19: The network detection component sends an available state of the network B to the channel-level path management component.

Step B20: When receiving the available network state of the network B, the channel-level path management component sends a detection request for quality of the network B to the channel and application quality evaluation component.

In actual application, to quickly obtain network quality of the network B, the network detection component may perform step B19 and step E1 when the network detection component determines that the network B is available in step B18.

Step E1: The network detection component sends a monitoring request for the quality of the network B to the channel and application quality evaluation component.

Step E2: When receiving the monitoring request for the quality of the network B that is sent by the network detection component, the channel and application quality evaluation component starts to monitor the quality of the network B based on the algorithm A.

Step B21: The channel and application quality evaluation component obtains a quality monitoring result of the network B.

In this embodiment of this application, a network quality parameter is used when quality of a network channel is evaluated, and a flow quality parameter is used when transmission quality of a data flow is evaluated.

Step B22: The channel-level path management component obtains a state of each network channel other than the primary network and network quality of a network in an available state in a manner of step B17 to step B21.

Step B23: The channel-level path management component determines, based on states and network quality of networks other than the primary network, an available network with optimal network quality as the primary card network. Certainly, in actual application, a range may alternatively be set, and network interface cards that are in the third network interface cards and whose network quality parameters are in the range are used as alternate networks.

It should be noted that an algorithm used in step E2 to detect the quality of the network B is the same as the algorithm used in step D2.

In this embodiment of this application, the network with optimal quality (for example, with largest signal strength and a larger bandwidth) is determined as the alternate network, and is actually applied. Certainly, in actual application, another condition for determining the alternate network may alternatively be set. For example, a priority condition for the alternate network may alternatively be set as that an available network other than the primary network is used as the alternate network, where network quality of the available network meets a requirement and the available network does not generate extra charges, and the network that does not generate extra charges may be a Wi-Fi network, a data service network whose traffic package is not limited, or a data service network whose traffic package is limited but currently used traffic is less than currently monthly planned traffic (total traffic/a quantity of total monthly days×a quantity of current days). Certainly; the alternate network may be one network that has optimal network quality in networks other than the primary network, where the networks meet the priority condition.

When the networks other than the primary network currently do not meet the priority condition, a network that meets a lower priority condition is selected as the alternate network, where the lower priority condition is that an available network other than the primary network is used as the alternate network, and network quality of the available network meets a requirement. Certainly, the alternate network may be one network that has optimal network quality in networks other than the primary network, where the networks meet the lower priority condition.

When the networks other than the primary network currently still do not meet the lower priority condition, an available network other than the primary network is selected as the alternate network. Certainly; the alternate network may be one network that has optimal network quality in available networks other than the primary network.

The foregoing manner of selecting the alternate network is merely used as an example and is not limited herein. In actual application, there may alternatively be another manner.

Step B24: After determining that the network with optimal quality is the primary card network, the channel-level path management component sends an enable request for the primary card network to the network connection management component.

Step B25: After receiving the enable request for the primary card network, the network connection management component switches the primary card network from a sleep state to a wake-up state.

Step B26: The network connection management component sends, to the channel-level path management component, a message representing that the primary card network is already woken up.

Step B27: The channel-level path management component sends the path and the quality that are of the currently determined primary card network with optimal quality to the flow-level path management component.

As described above, the channel-level path management component may periodically obtain the network quality of the primary network of the electronic device. Certainly, the channel-level path management component may periodically send the obtained network quality of the primary network of the electronic device to the flow-level path management component.

Therefore, the flow-level path management component can periodically obtain the network quality of the primary network (the primary Wi-Fi).

Step F1: The flow-level path management component already stores the network path of the primary network, and after the path and the network quality that are of the primary card network and that are sent by the channel-level path management component are received, a quality parameter corresponding to the latest received network path of the stored primary card network may be compared with the received quality parameter of the primary card network, to determine a network path with better quality:

In a specific implementation, if the network path with better quality is a prestored path of the primary network, it represents that the quality of the alternate network is poorer, and there is no need to perform switching even if the primary network is poor currently: The network path of the alternate network does not need to be stored. If the network path with better quality is not the prestored path of the primary network, it represents that the quality of the alternate network is better, and the network path of the alternate network needs to be stored, so that when the transmission quality of the data flow currently using the primary network is poorer, the data flow is switched to the alternate network.

When a comparison result of step F1 is that quality of the primary card is better, a network path of the primary card is stored as the alternate network.

For another example, after step B26, the channel-level path management component may request to periodically monitor the network quality of the primary card network, and periodically send the network quality of the primary card network to the flow-level path management component.

Certainly; in actual application, network quality of a network other than the primary network may be periodically monitored. If the network quality of the currently stored alternate network is no longer optimal, the alternate network may be replaced with a network with better quality other than the current primary network and the current alternate network. If a network is woken up as the alternate network, and then the network is no longer the alternate network or the primary network, the network may be switched from the wake-up state to the sleep state, thereby avoiding excessive power consumption of the electronic device.

As described above, the traffic reporting component continuously performs data flow monitoring and continuously reports a monitored data flow.

Step B29: The traffic reporting component continuously reports a monitored data flow to the traffic sensing component.

Step B30: The traffic sensing component already determines the network quality evaluation algorithm (the algorithm B) for each data flow, and continuously obtains an evaluation result based on the algorithm B.

Step B31: The traffic sensing component continuously sends the evaluation result to the flow-level policy management component.

Step B32: The flow-level policy management component determines, based on the evaluation result, that the data flow needs to be switched to the alternate network.

For example, if the condition 1 in the foregoing example is met, it is determined to switch the data flow to the alternate network.

Step B33: After it is determined to switch the data flow to the alternate network, the flow-level policy management component sends an instruction to the flow-level path management component, where the instruction is used to represent switching to the alternate network.

Step B34: After receiving the instruction for switching to the alternate network, the flow-level path management component checks that the path of the alternate network (the path of the primary card network) is stored, and sends an instruction for switching to the primary card network to the flow-level policy management component.

It should be noted that the flow-level policy management component stores a transmission quality improvement policy: Therefore, the flow-level policy management component can determine whether to switch a single flow; some flows, or all flows. In actual application, step B33 may carry an identifier of a to-be-switched data flow. In addition, the instruction transmitted in B34 may also carry the identifier of the to-be-switched data flow. Alternatively, the instructions sent in the two steps may not carry the identifier of the to-be-switched data flow:

Step B35: The flow-level policy management component sends an instruction to the policy execution component, where the instruction carries a data flow identifier and the path of the primary card network, and the data flow identifier is an identifier of a data flow whose evaluation result meets the condition 1, an identifier of each of a data flow whose evaluation result meets the condition 1 and a related data flow; or an identifier of each of all the data flows of the application A in which a data flow whose evaluation result meets the condition 1 is located.

Step B36: The policy execution component switches, to the primary card network represented by the network path carried in the instruction, the data flow represented by the data flow identifier carried in the received instruction.

In this embodiment of this application, the network path may alternatively be a network identifier for distinguishing between different networks.

In another embodiment of this application, in actual application, the network quality may not gradually deteriorate, but may suddenly deteriorate. For example, if the evaluation result received by the flow-level policy management component in step B14 is determined as switching to the alternate network, the flow-level policy management component sends, to the flow-level path management component, switching to the alternate path in step B15. However, the flow-level path management component does not store the path of the alternate network in this case. In this case, the alternate network needs to be determined first (step B16 to step B27), and then step B34 is directly performed when the alternate network is determined, to switch the data flow to the alternate network.

Certainly, if the evaluation result received by the flow-level policy management component in step B14 is determined as switching to the alternate network, the flow-level path management component receives switching to the alternate path in this case; and when the path of the alternate network is already stored, step B16 to step F1 may not be performed, but step B34 is directly performed to switch the data flow to the alternate network.

For example, a data flow C and a data flow D currently exist in the application A. In a period, the electronic device requests and stores an alternate path based on a transmission quality evaluation result ("there may be freezing") of the data flow C, and a transmission quality evaluation result of the data flow D is "excellent". In a next period, the transmission quality evaluation result of the data flow C is "excellent", and the transmission quality evaluation result of the data flow D is determined as switching to the alternate path. In this case, the electronic device already stores the alternate path, and the electronic device may switch the data flow to the alternate network.

In the foregoing example, the feature of the data flow is used as a condition for determining and waking up the alternate network. In actual application, another manner may alternatively be used as a condition for determining and waking up the alternate network. To be specific, a column may be further added to Table 2: Condition for determining and waking up an alternate network. When different applications (or different service scenarios of a same application) run in the foreground, conditions for determining and waking up the alternate network may be the same or different, or may be partially the same and partially different.

For example, for different service scenarios of each application, conditions related to traffic features of data flows of the service scenarios of the application may be set as conditions for determining and waking up the alternate network. For all service scenarios of all applications, a same condition may be set as that signal strength gradually decreases or the like. This example is merely used for illustration and does not constitute any limitation.

Figure 8A:
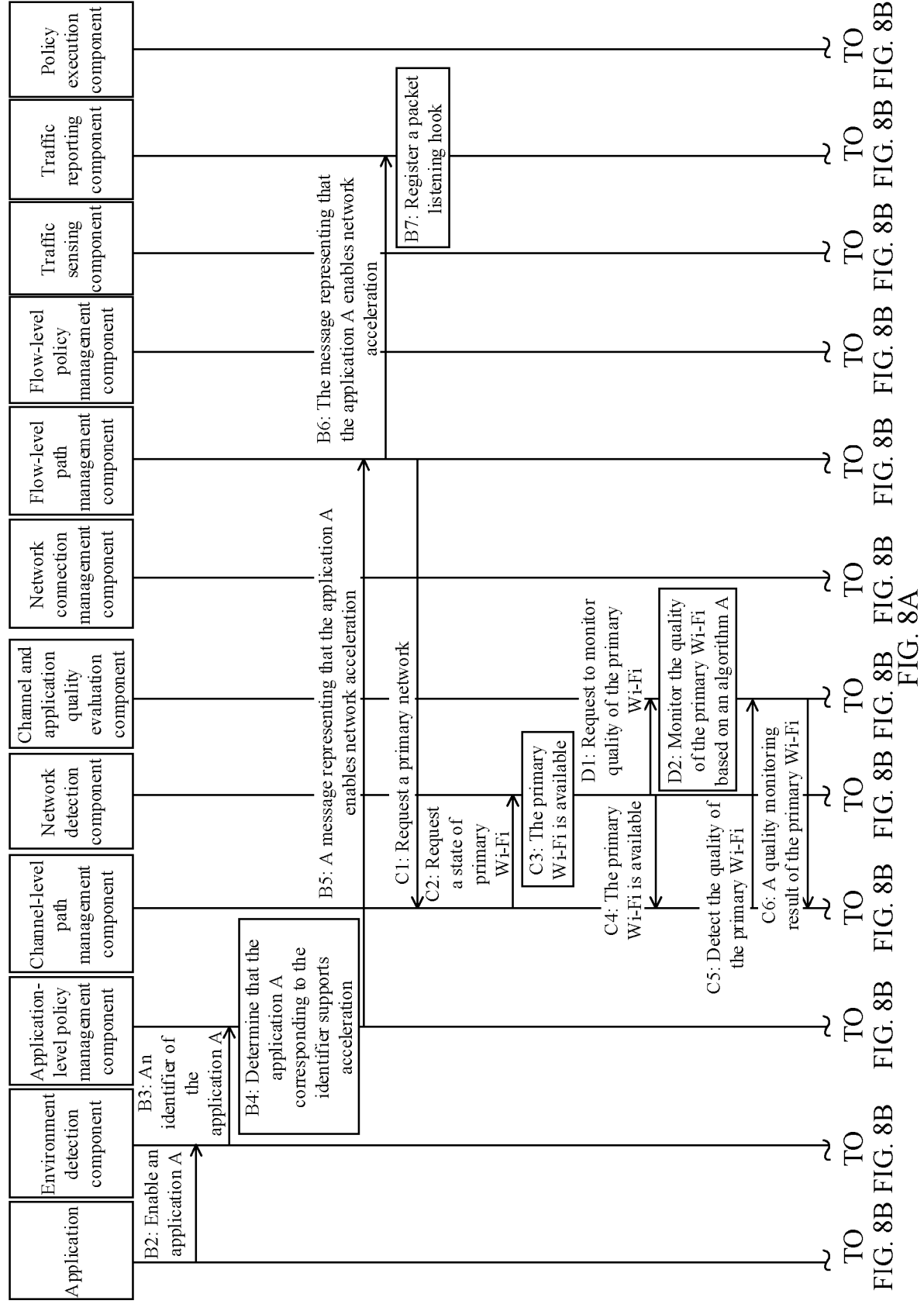
FIG. 8A, FIG. 8B, FIG. 8C, FIG. 8D, and FIG. 8E are a sequence diagram of a network acceleration method according to an embodiment of this application.
Figure 8B:
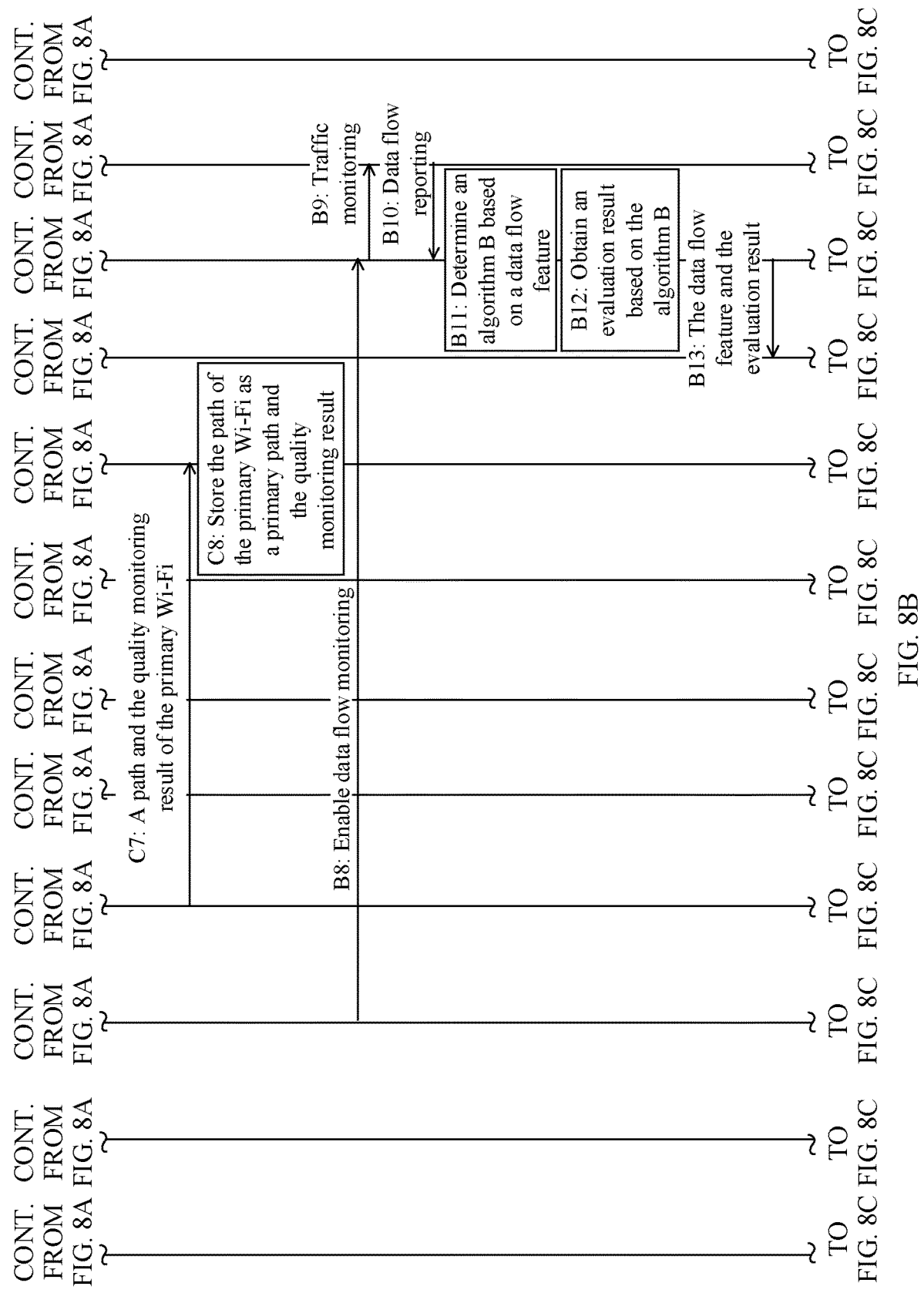
Figure 8C:
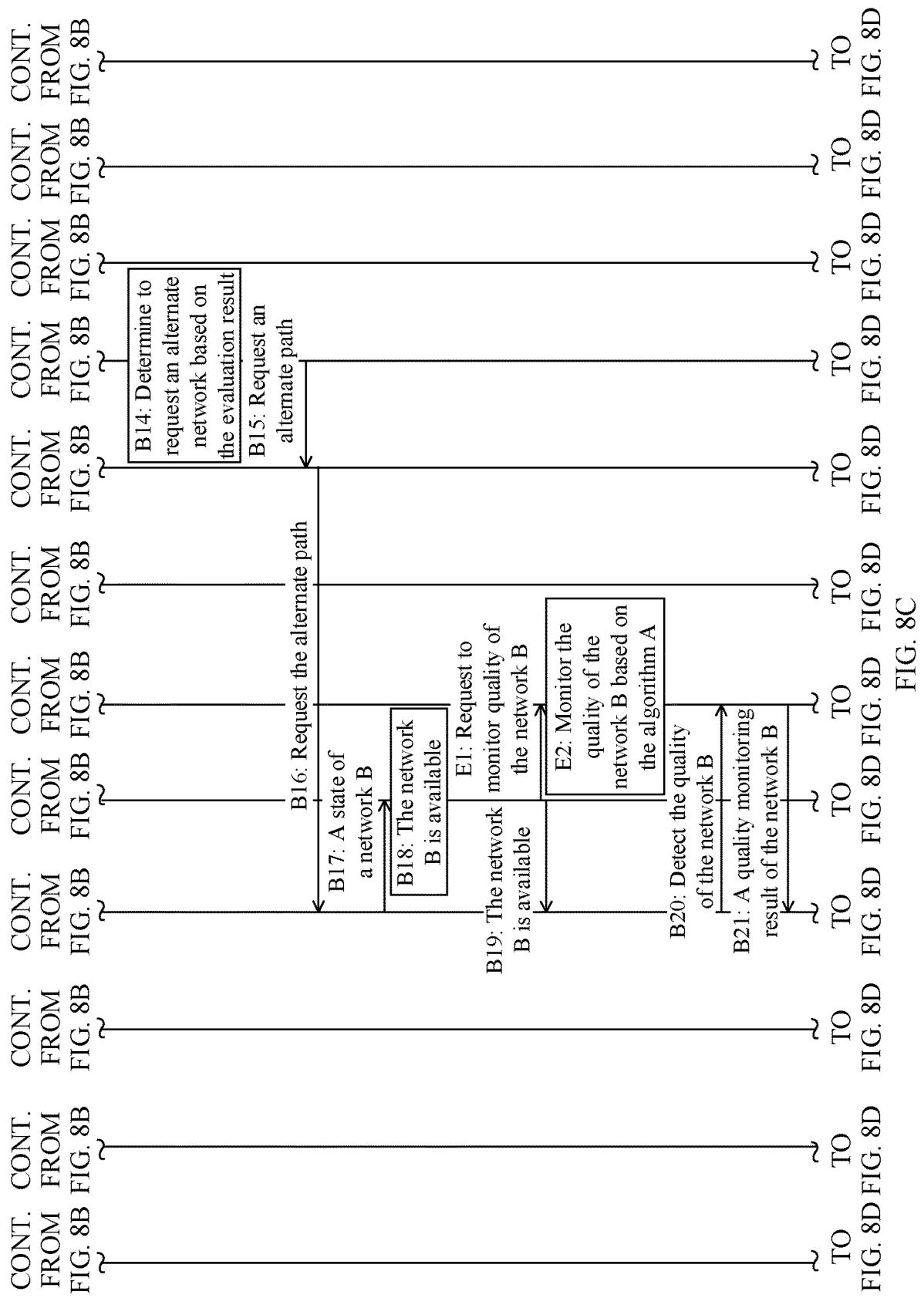
Figure 8D:
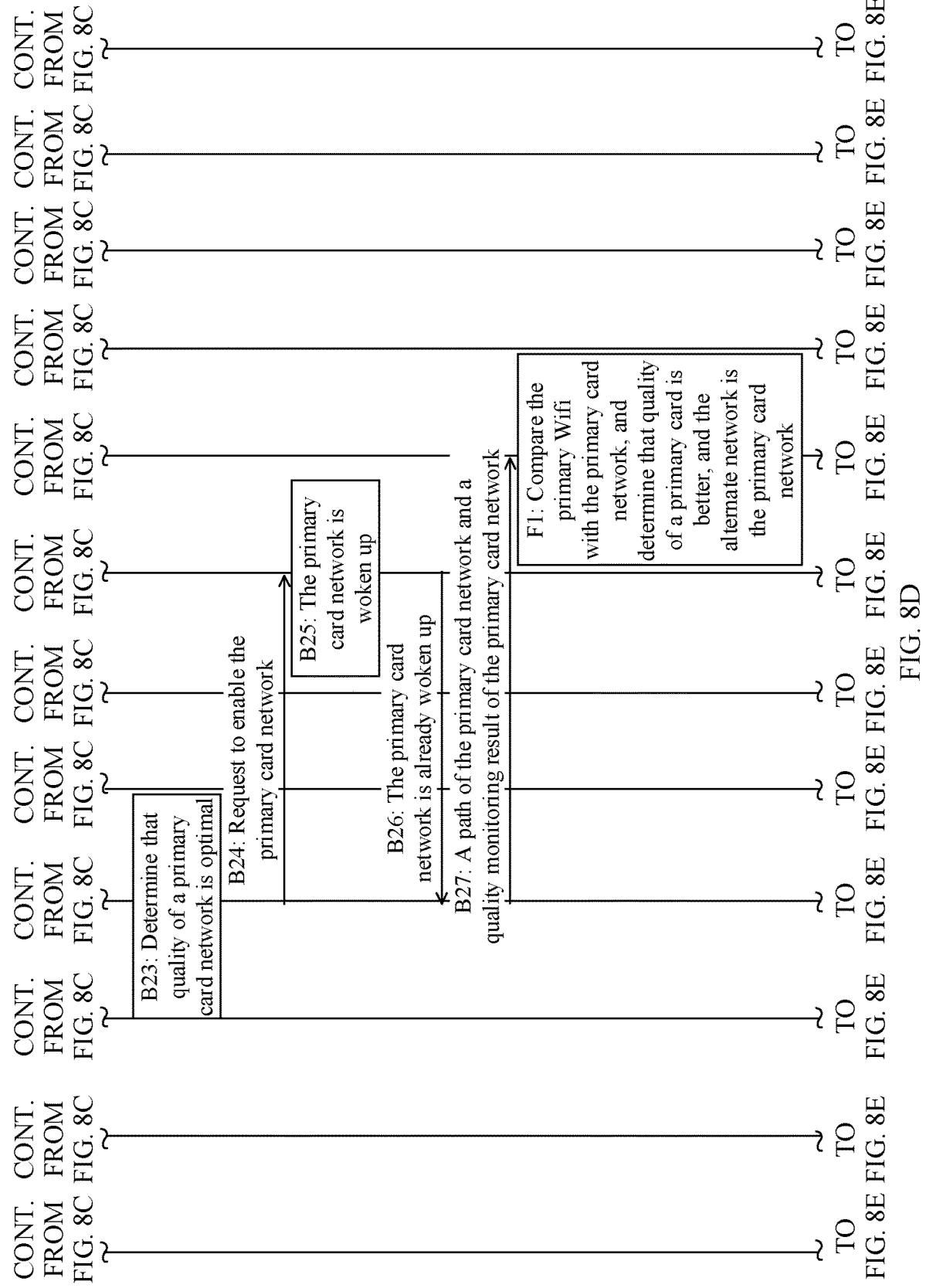
Figure 8E:
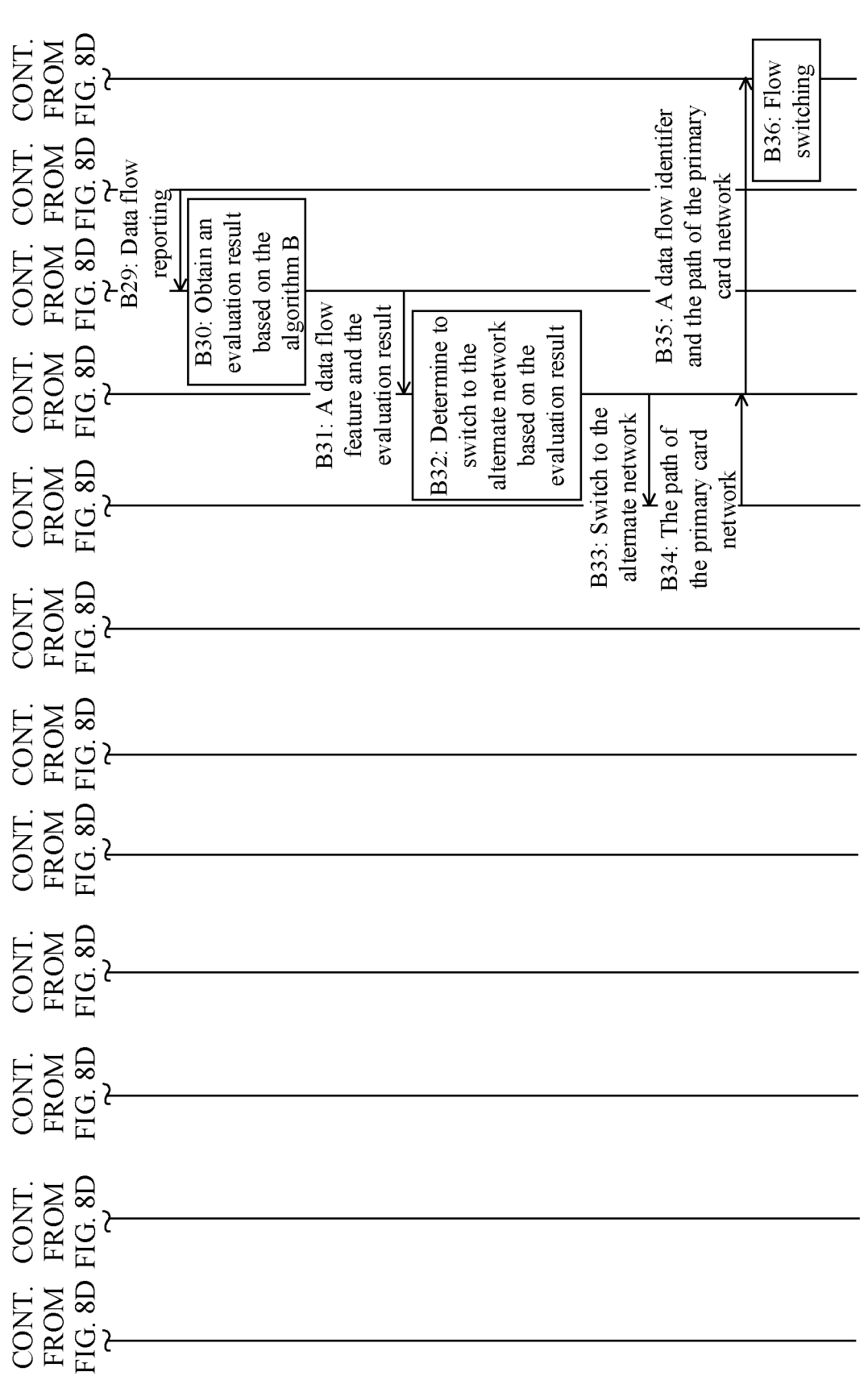
Figure 9A:
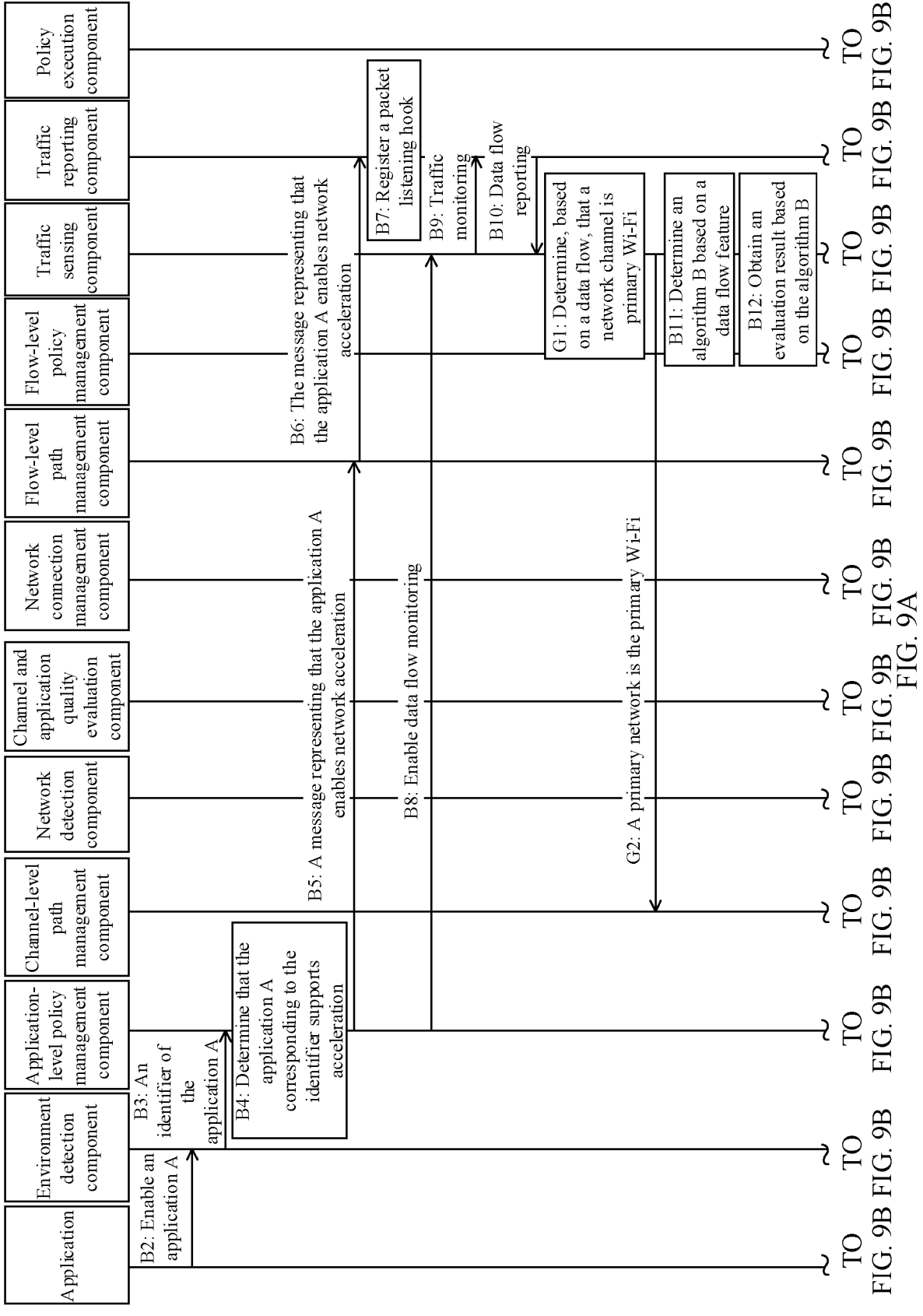
FIG. 9A, FIG. 9B, FIG. 9C, FIG. 9D, and FIG. 9E are a sequence diagram of another network acceleration method according to an embodiment of this application.
Figure 9B:
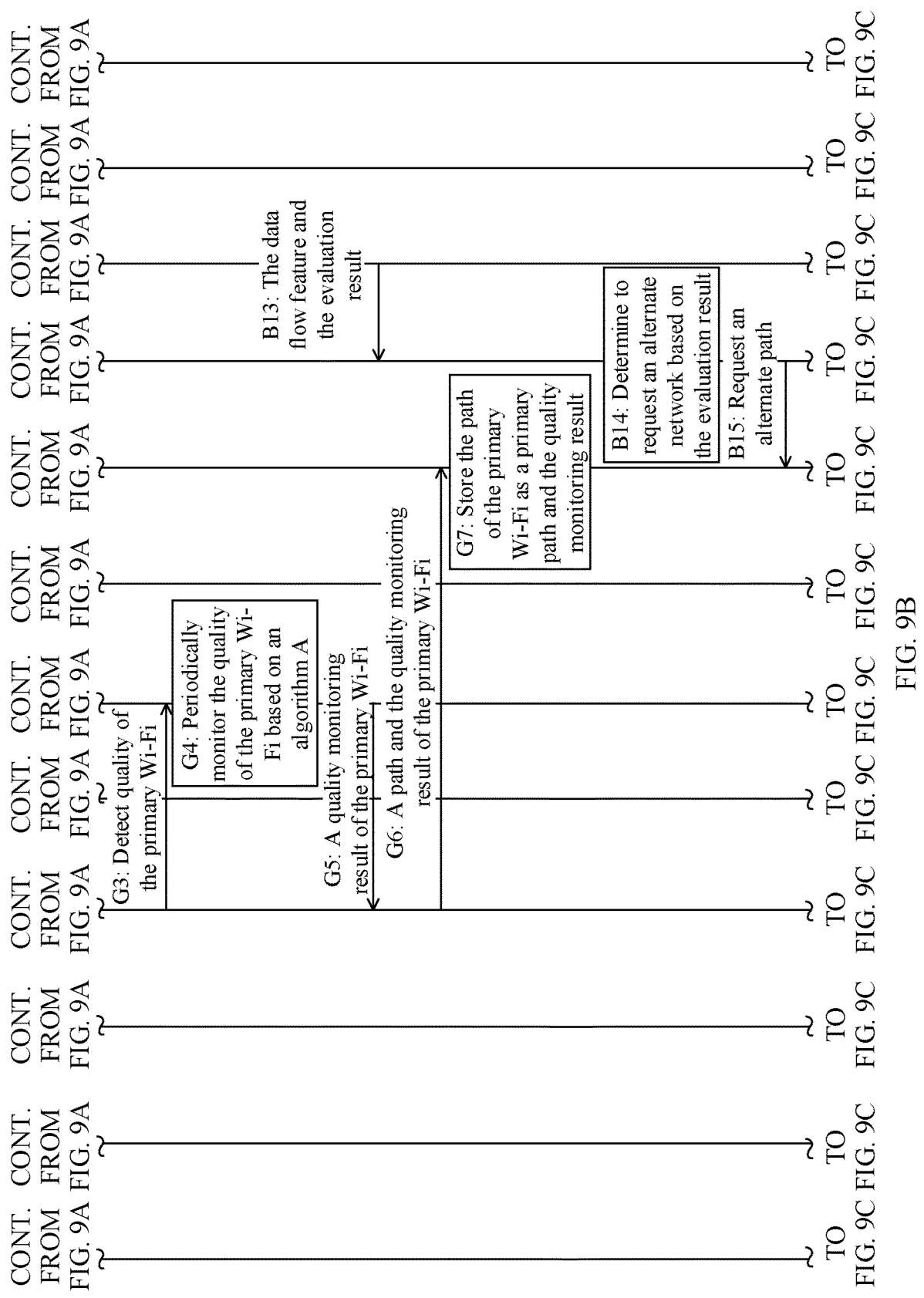
Figure 9C:
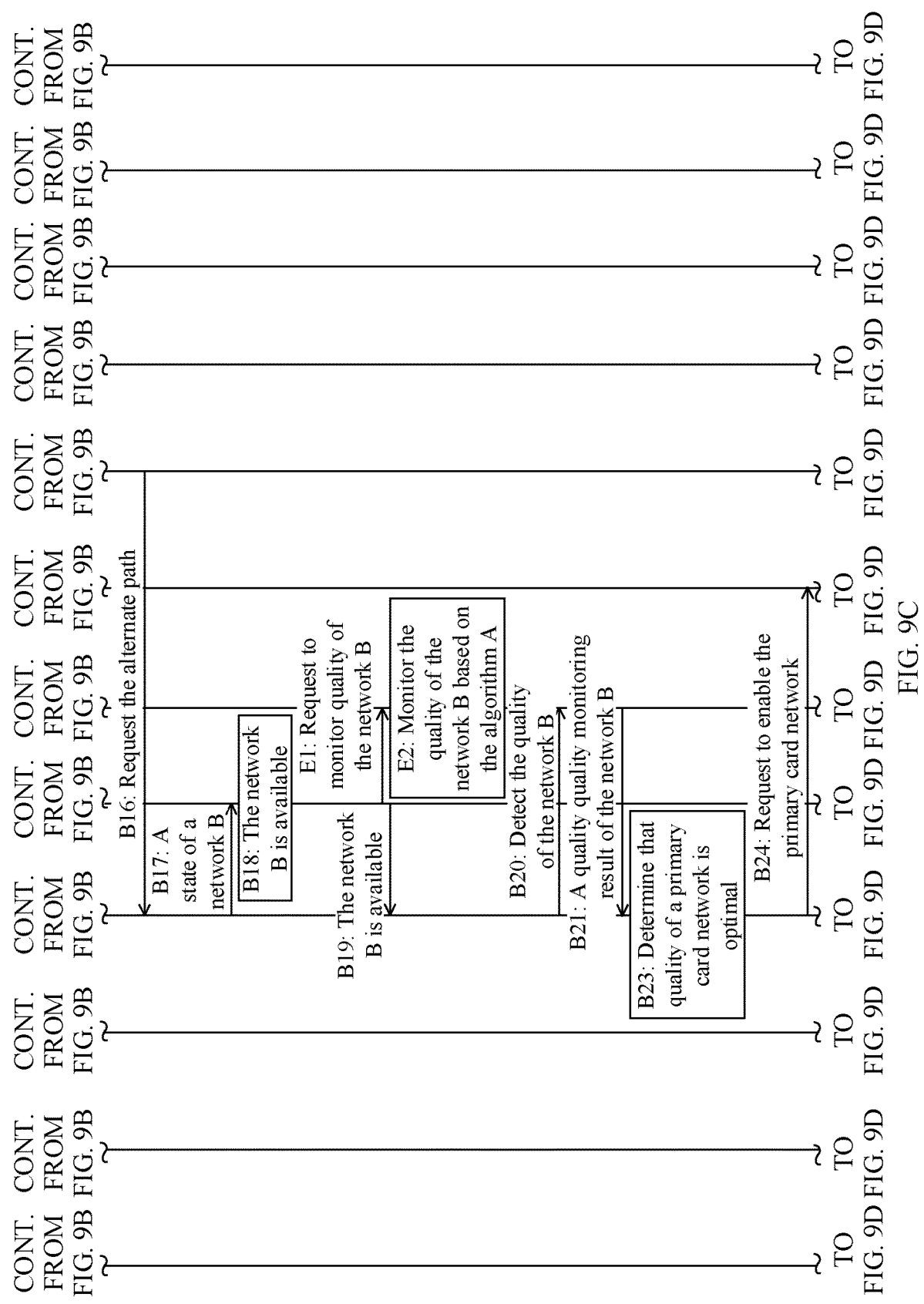
Figure 9D:
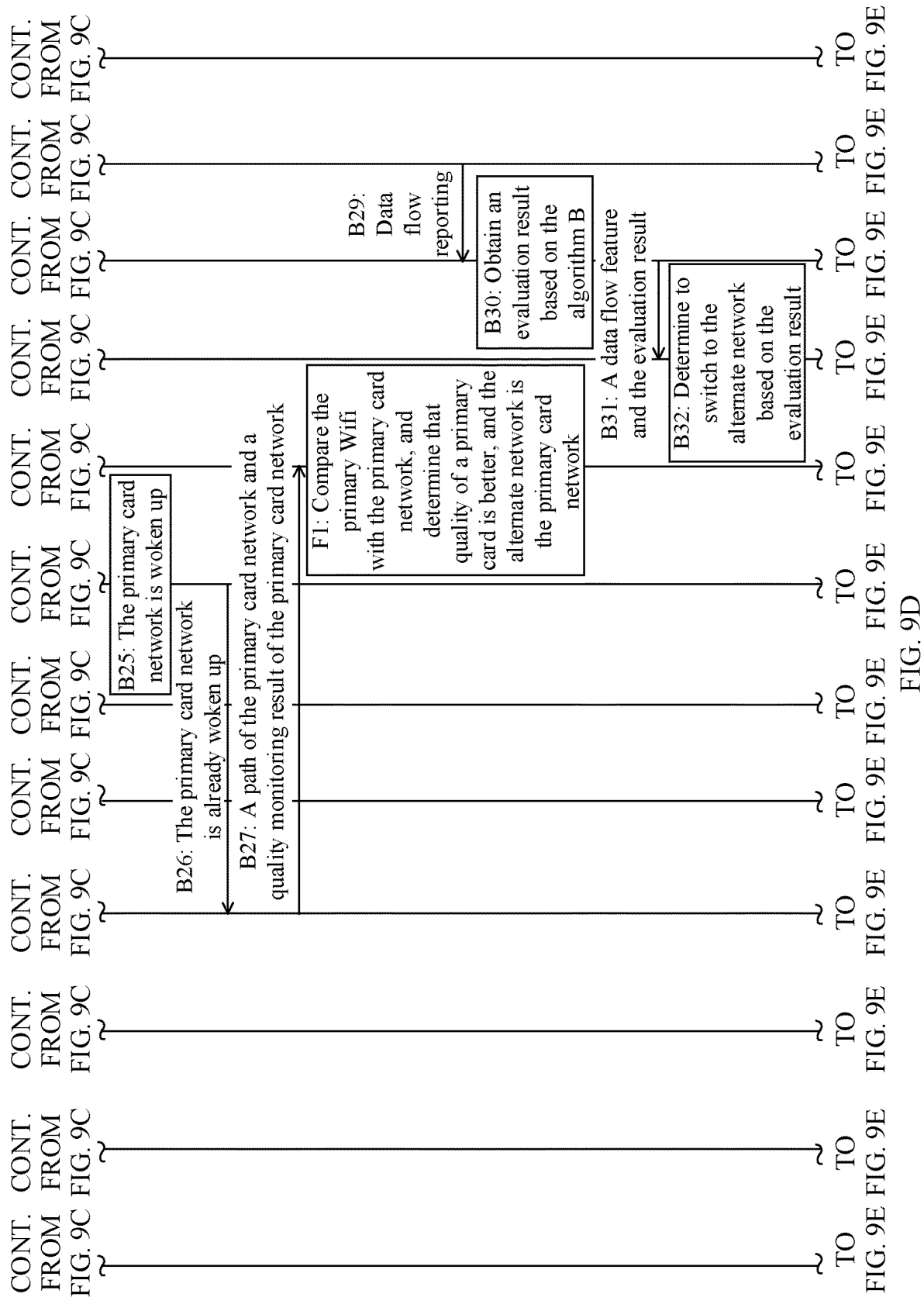
Figure 9E:
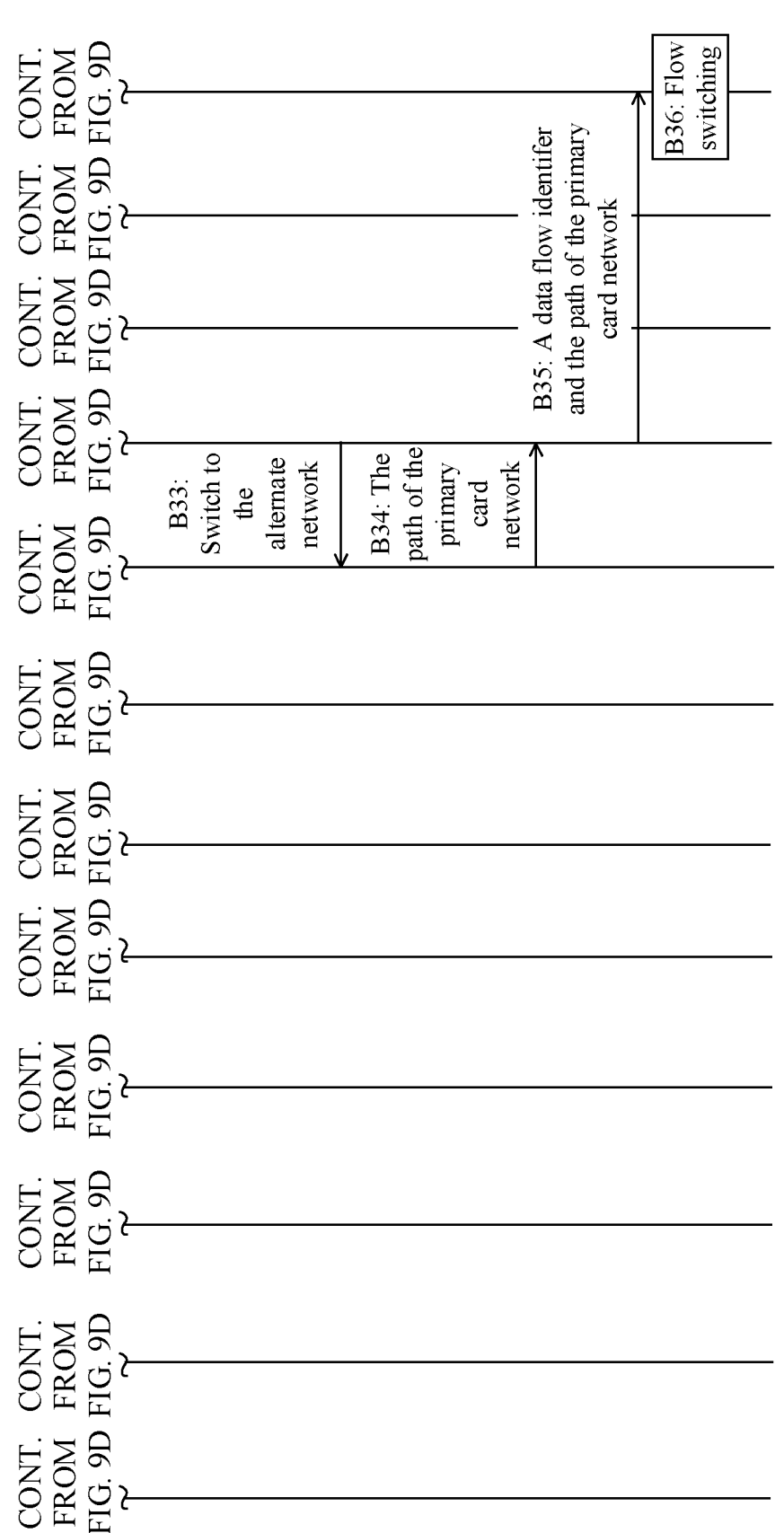
Figure 10A:
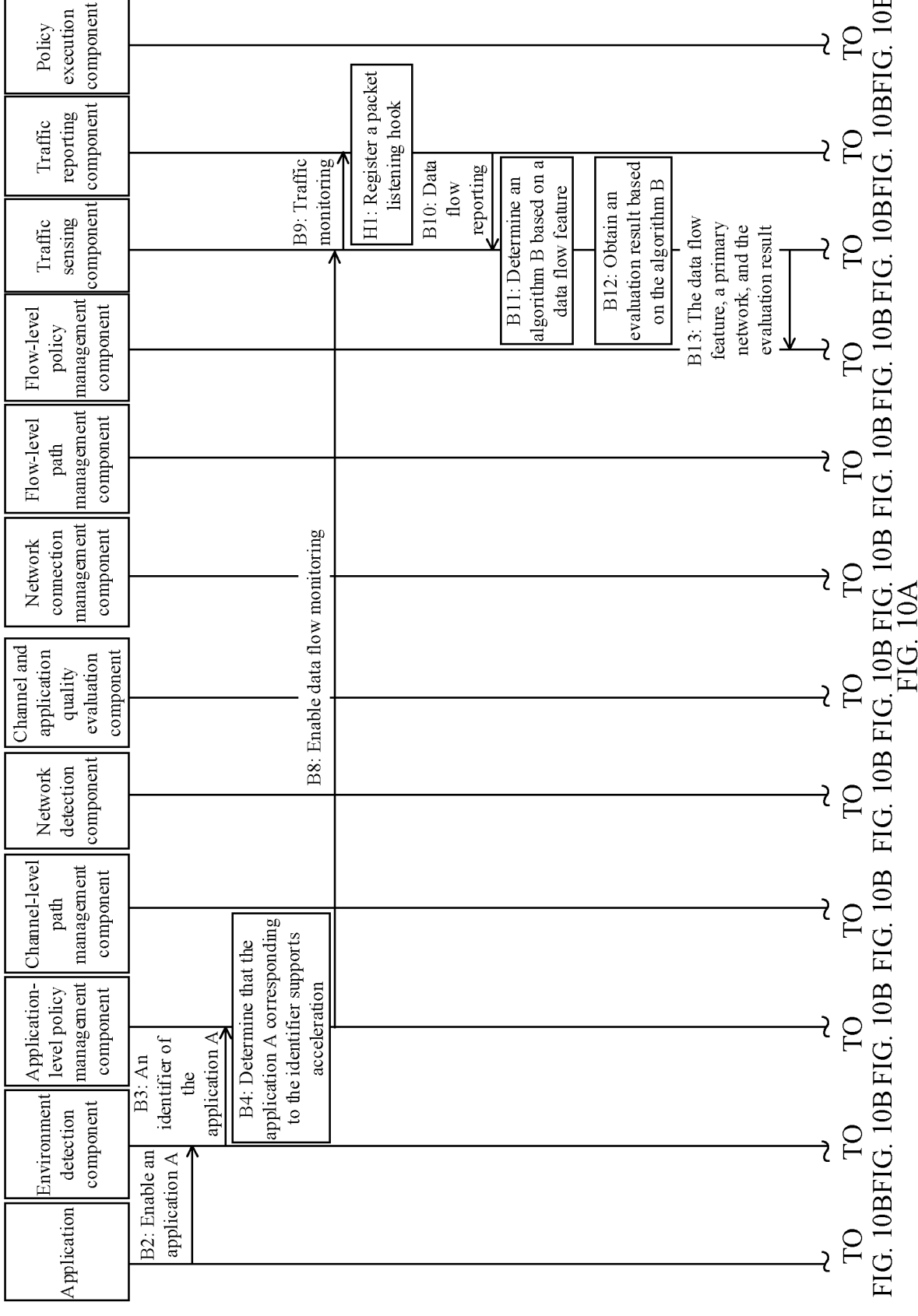
FIG. 10A, FIG. 10B, FIG. 10C, and FIG. 10D are a sequence diagram of another network acceleration method according to an embodiment of this application.
Figure 10B:
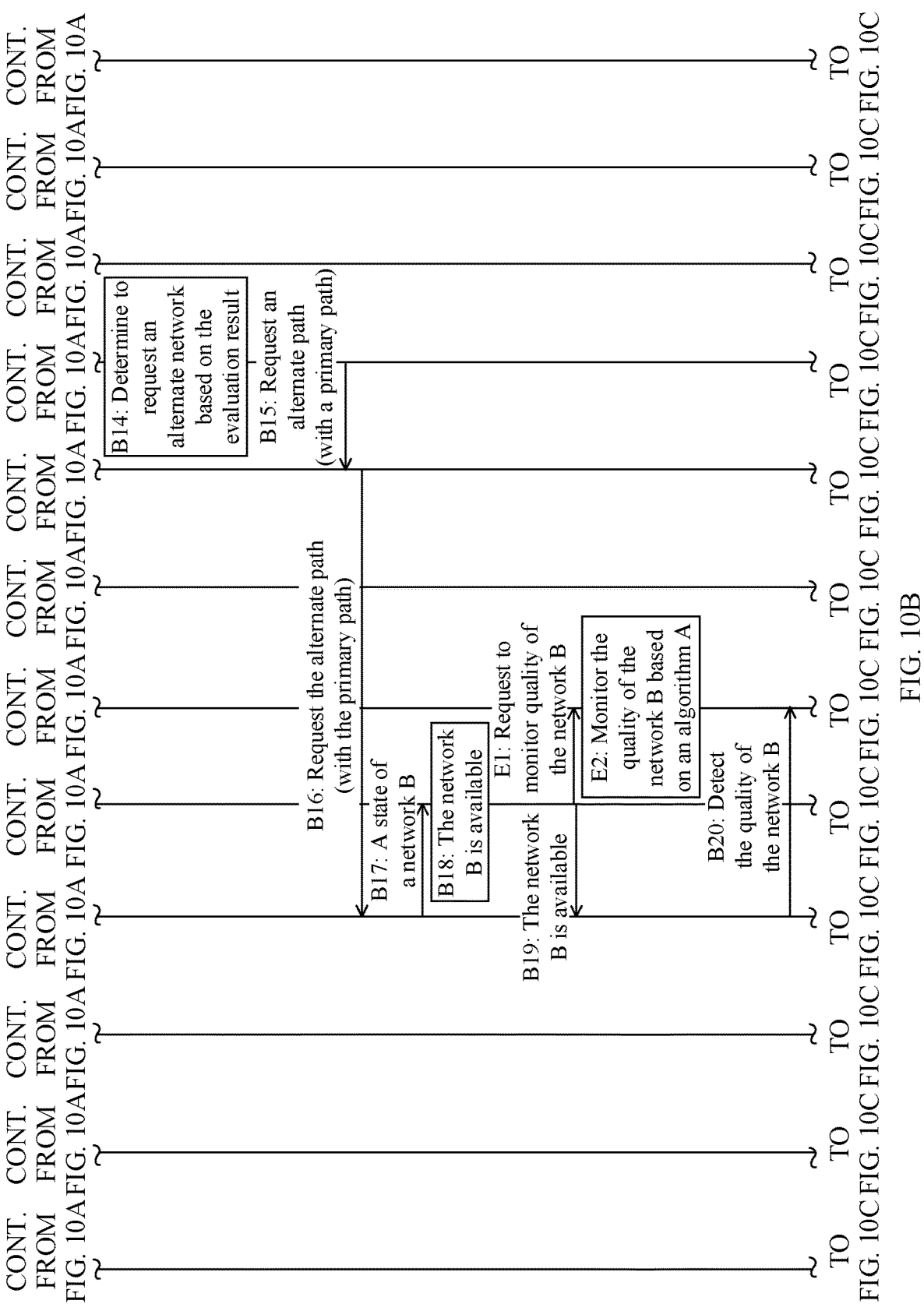
Figure 10C:
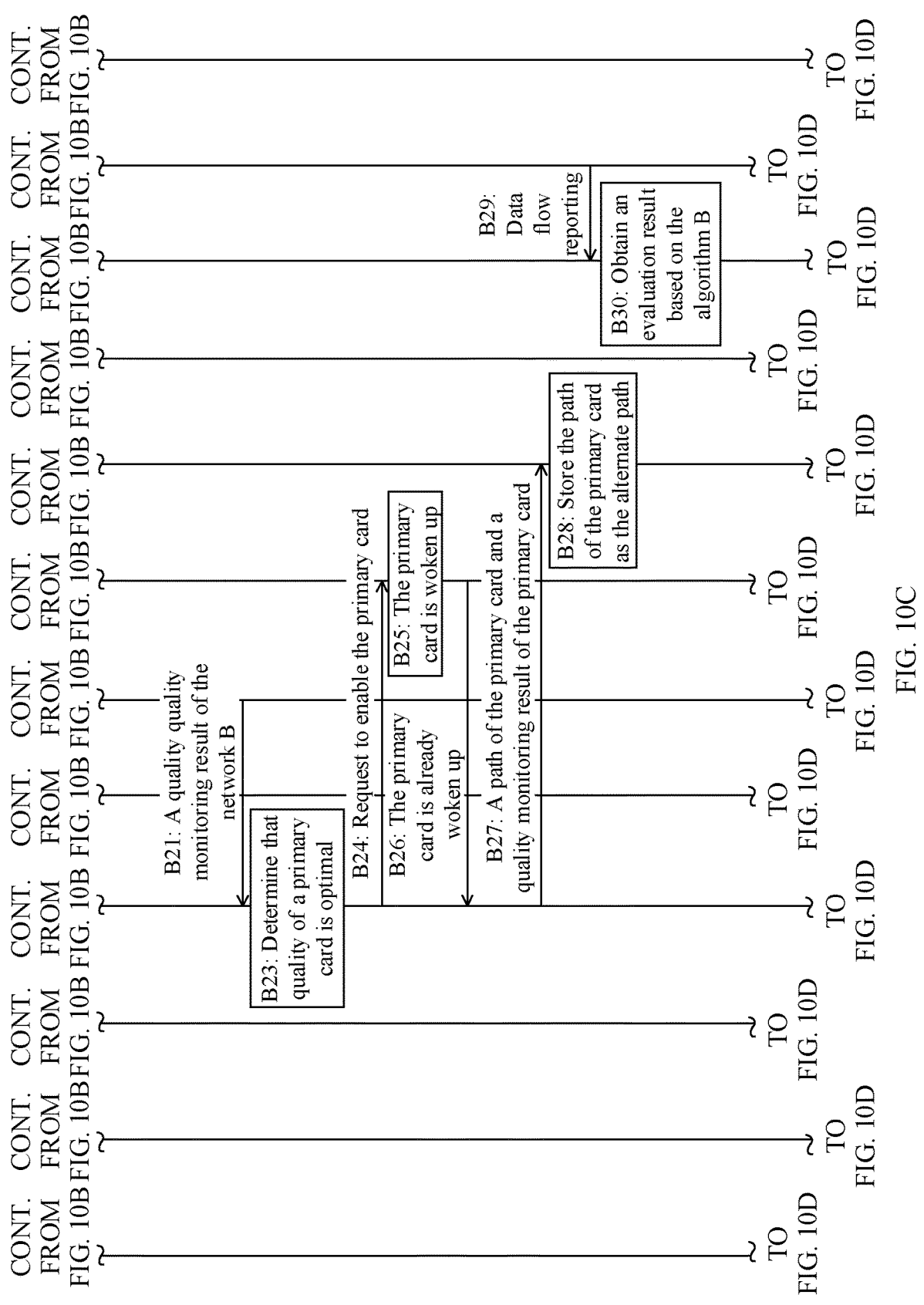
Figure 10D:
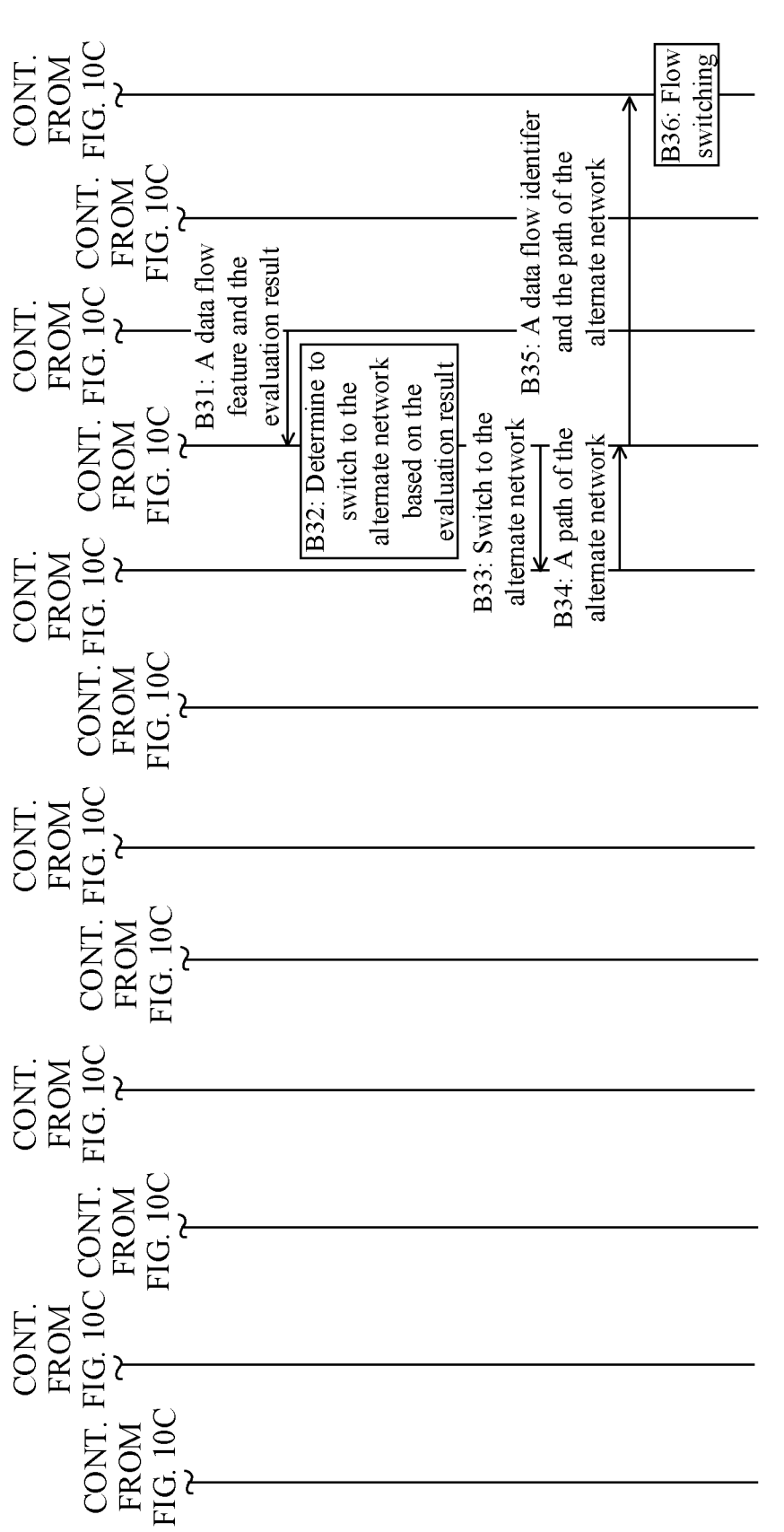

In another embodiment of this application, in the embodiment shown in FIG. 8A, FIG. 8B. FIG. 8C, FIG. 8D, and FIG. 8E, if all or some of flows of the application A are switched to the primary card, after the application A is switched from the foreground to the background, all the data flows of the application A return to the default primary network of the system, for example, the primary Wi-Fi. For a manner of determining the primary network, refer to the descriptions in the foregoing embodiment. After the application A is switched from the background to the foreground again, all the data flows of the application are still on the primary network: the primary Wi-Fi. Then, the network acceleration method provided in this embodiment of this application continues to be implemented.

In another embodiment of this application, in a specific implementation, the path of the primary network currently used by the application A may alternatively be obtained in another manner, and the network quality of the currently used primary network is monitored when the path of the primary network currently used by the application A is determined.

FIG. 9A, FIG. 9B, FIG. 9C, FIG. 9D, and FIG. 9E are a sequence diagram of another network acceleration method according to an embodiment of this application.

When listening to the data flow; the traffic reporting component may determine a network that carries the data flow: It is preset that a currently used network channel is still determined for all the data flows of the application in a default manner of the system after the application A is switched from the background to the foreground again. Therefore, after the application A is switched from the background to the foreground again or the application A is enabled, the network channel in which the data flow listened to by the traffic reporting component is located is the primary network of the application A. Because, the path of the primary network can be determined based on the data flow reported by the traffic reporting component.

After step B10, that is, after the traffic sensing component receives the reported data flow; step G1 to step G6 may be performed to store the path and the quality monitoring result of the primary network.

Step G1: The traffic sensing component determines, based on the reported data flow; the network channel that carries the data flow:

Step G2: When the network channel (the primary Wi-Fi) is determined, the traffic sensing component sends, to the channel-level path management component, a message used to represent that the primary network is the primary Wi-Fi.

Step G3: The channel-level path management component sends a quality detection request for the primary Wi-Fi to the channel and application quality evaluation component.

Step G4: The channel and application quality evaluation component periodically monitors quality of the primary Wi-Fi based on the algorithm A.

Step G5: The channel and application quality evaluation component returns a quality monitoring result of the primary Wi-Fi to the channel-level path management component.

Step G6: The channel-level path management component sends the path and the quality monitoring result of the primary Wi-Fi to the flow-level path management component.

Step G7: The flow-level path management component stores the path of the primary Wi-Fi as a primary path, and stores the quality monitoring result of the primary Wi-Fi.

Because the quality of the primary network (the primary Wi-Fi) is periodically monitored in step G4, the flow-level path management component periodically receives the quality of the primary network (the primary Wi-Fi). In a process in which the electronic device performs step G1 to step G7, the electronic device may also perform step B11 and step B13. That is, a performing sequence of step G1 and step B11 is not limited.

When the flow-level policy management component performs B14, if it is determined based on the feature of the data flow and the evaluation result that the alternate network needs to be requested, subsequent steps (step B15 to step B36) continue to be performed. For the subsequent steps, refer to the descriptions in the embodiment shown in FIG. 8A, FIG. 8B, FIG. 8C, FIG. 8D, and FIG. 8E. Details are not described herein again.

As described above, when the path of the primary network is determined, a network other than the primary network may be requested when the alternate path is requested. When the quality of the primary network is periodically monitored, the alternate network may be compared with the primary network after the alternate network is determined, to switch the data flow with poor transmission quality to the alternate network when the quality of the alternate network is better than the quality of the primary network. Certainly, in actual application, the data flow with poor transmission quality may alternatively be directly switched to the alternate network when it is determined that the alternate network has optimal quality.

FIG. 10A, FIG. 10B, FIG. 10C, and FIG. 10D show another network acceleration method according to an embodiment of this application.

Step B8 and step B9 are performed after step B4 is performed.

After receiving the traffic monitoring request sent by the traffic sensing component in step B9, the traffic reporting component is triggered to perform step Hl to register the packet listening hook.

The packet listening hook may listen to the data flow of the application A after the packet listening hook is registered. A subsequent step is performed after the data flow of the application A is listened to.

It should be noted that the network channel that carries the data flow may be obtained from the data flow. Therefore, the traffic sensing component can determine the network channel currently used by the application A, and can send an identifier of the currently used network channel (the primary network) to the flow-level policy management component by performing step B13.

Step B14: The flow-level policy management component determines, based on the feature of the data flow and the evaluation result, to request the alternate network.

Step B15: When the flow-level policy management component sends the request information for the alternate path to the flow-level path management component, the request information may carry an identifier of the primary network (or the path of the primary network).

Step B16: The flow-level path management component sends the request information for the alternate path to the channel-level path management component, where the request information may also carry the identifier of the primary network (or the path of the primary network).

After receiving the request information that is sent by the flow-level path management component and that carries the identifier of the primary network, the channel-level path management component may sequentially request states of network channels other than the primary network in network channels supported by the electronic device. When the states are available, the available network channels are requested to be monitored to obtain quality monitoring results, and finally, an available network channel with optimal quality is woken up and is sent to the flow-level path management component as the alternate network. For details, refer to the descriptions in step B17 to step B27. References may be made to the descriptions in the foregoing embodiment. Details are not described herein again.

Step 28: When determining that the primary network is not stored, the flow-level path management component does not need to compare the quality of the received alternate network with the quality of the primary network, but directly stores the received network channel as the alternate path.

For descriptions of subsequent step B29 to step B36, refer to the descriptions in the foregoing embodiment.

In another embodiment of this application, as shown in Table 2, the transmission quality improvement policies further include: concurrency. In this embodiment of this application, when a large file is downloaded from an upload/download (storage) application, a data flow is first allocated to a plurality of available network channels of the electronic device. After the data flow is allocated to the plurality of network channels, if any data flow meets a switching condition (for example, a transmission rate is slow) specified by the network quality evaluation algorithm, the data flow that meets the switching condition specified by the network quality evaluation algorithm is switched to another network channel with better quality. For details, refer to the descriptions in the embodiment shown in FIG. 11A, FIG. 11B, FIG. 11C, FIG. 11D, and FIG. 11E.

For descriptions of the steps before step B11, refer to the descriptions in the foregoing embodiment. Details are not described herein again.

Step B11: The traffic sensing component determines, based on the feature of the data flow, that the data flow needs to be allocated to a plurality of network channels.

For example, in Table 2, when a large file is downloaded from an upload/download application, a data flow that meets a specific feature needs to be allocated to a plurality of network channels.

Step J1: The traffic sensing component sends request information for all alternate networks to the channel-level path management component.

Step B17: After receiving the request information for all alternate paths, the channel-level path management component starts to perform step B17 to step B26 on the networks other than the primary network in the network channels supported by the electronic device.

It should be noted that, in this embodiment of this application, all the available network channels other than the primary network need to be woken up. Therefore, after step B21, step B24 is directly performed to request to wake up the current available network channels. Each available network channel other than the primary network is woken up based on the foregoing process.

Step B27: The channel-level path management component sends a path and a quality monitoring result (which may be represented by a quality parameter) of each alternate network that is woken up to the flow-level path management component.

Step B28: The flow-level path management component stores the path and the quality parameter of each alternate network.

It should be noted that in a process in which the electronic device performs step J1, step B17, and step B28, the traffic reporting component always reports the data flow, and the traffic sensing component always transmits, to the flow-level path management component, the identifier of the data flow that is currently listened to.

Step K3: After receiving the path of the primary network, the paths of the alternate networks, and identifiers of a plurality of data flows, the flow-level path management component allocates the plurality of data flows to the plurality of network channels (the primary network and the alternate networks).

For example, if the flow-level path management component receives a path of one primary network and paths of three alternate networks, and five data flow identifiers are received, the five data flow identifiers may be allocated to the four network channels.

During allocation, allocation may be first performed according to an average allocation principle based on a quantity of data flows and a quantity of network channels. When average allocation cannot be performed, a difference between quantities of data flows allocated to the network channels is less than 2. That is, allocation in step K3 is that the plurality of data flows are allocated to the plurality of network channels according to the average allocation principle as far as possible.

Certainly; in actual application, another allocation principle may alternatively be used. For example, the plurality of data flows are allocated to the plurality of network channels based on quality of each network channel, so that a network channel with better quality carries more data flows, and a network channel with poor quality carries fewer data flows. Other allocation principles are not illustrated one by one.

Certainly, alternatively, the quantity-based average allocation principle may be used for first time of allocation when the application runs in the foreground, and another principle is used for a next time of allocation (for example, an allocation period may be set) after the first time of allocation.

It should be noted that step K3 may be performed in the flow-level policy management component, or may be performed in the flow-level path management component.

If step K3 is performed in the flow-level path management component, the flow-level policy management component needs to send the data flow identifiers to the flow-level path management component.

If step K3 is performed in the flow-level policy management component, the flow-level path management component needs to send the plurality of network paths to the flow-level policy management component, and step K2 is cancelled.

Step K4: The flow-level path management component sends a path of a network channel corresponding to each data flow identifier to the flow-level policy management component.

Step K5: The flow-level policy management component sends the received path of the network channel corresponding to each data flow identifier to the policy management component.

Step K6: After receiving each data flow identifier and the path of the corresponding network channel, the policy management component switches a data flow corresponding to the data flow identifier to the corresponding network channel.

As described above, the packet monitoring hook always performs data flow monitoring and always reports a monitored data flow. Refer to step B29.

After the plurality of data flows are allocated from the primary network channel to the plurality of network channels, data flows that are monitored by the packet monitoring hook are carried on corresponding network channels. Therefore, after receiving the data flows reported by the traffic reporting component, the traffic sensing component may determine, based on the monitored data flows, that the plurality of data flows are already allocated to the plurality of network channels.

Step K7: After determining that the plurality of data flows are already allocated to the plurality of network channels, the traffic sensing component may obtain, based on a feature of each data flow; an evaluation algorithm C corresponding to each data flow.

Step B30: The traffic sensing component obtains a transmission quality evaluation result of each data flow based on the evaluation algorithm C for determining each data flow:

For step B31 to step B36, refer to the descriptions in the foregoing embodiment. Details are not described herein again.

In this embodiment of this application, when an evaluation result of a specific data flow meets a switching condition specified by a set evaluation algorithm, the data flow needs to be switched to another network channel with better quality:

As described above, when concurrency is determined, network quality of each network channel may be periodically monitored, and the network quality is sent to the flow-level path management component.

Step K8: The flow-level path management component switches the data flow (a data flow that does not meet a condition set by the algorithm C) to a network channel with optimal quality (for example, with a fastest transmission rate) based on the periodically received quality of each network channel.

In this example, the data flow that does not meet the condition set by the algorithm C is switched to the network channel with better quality: In actual application, another switching manner may alternatively be set. For example, the data flow is switched to a network channel that currently carries fewest data flows. Alternatively, when a specific data service of the user is a traffic package with unlimited traffic, a data flow that is currently on the Wi-Fi network and that does not meet the condition set by the algorithm C is preferentially switched to a data service network whose traffic package has unlimited traffic. Certainly, when a data service of the user is a traffic package with limited traffic, a data flow that is currently on the Wi-Fi network and that does not meet the condition set by the algorithm C is preferentially switched to another Wi-Fi network.

The foregoing switching manner is merely used as an example. In actual application, a switching manner may be set based on an actual situation. A principle is that a data flow that meets a specific feature and that is of a current application is transmitted most quickly on a premise of causing no extra traffic fees as far as possible.

In another embodiment of this application, FIG. 12A, FIG. 12B, FIG. 12C, and FIG. 12D show another network acceleration method according to an embodiment of this application.

Differences from FIG. 11 include:
(1) A manner of triggering the traffic reporting component to register the packet listening hook is different. Triggering in FIG. 11A, FIG. 11B, FIG. 11C, FIG. 11D, and FIG. 11E is implemented by the flow-level path management component, but triggering in FIG. 12A, FIG. 12B, FIG. 12C, and FIG. 12D is implemented by the traffic sensing component.
(2) The path of the primary network is no longer separately requested, but when the traffic sensing component determines, based on the feature of the data flow; that the current data flow needs to be allocated to the plurality of network channels first, step J1 is performed to request all network paths.

Figure 11A:
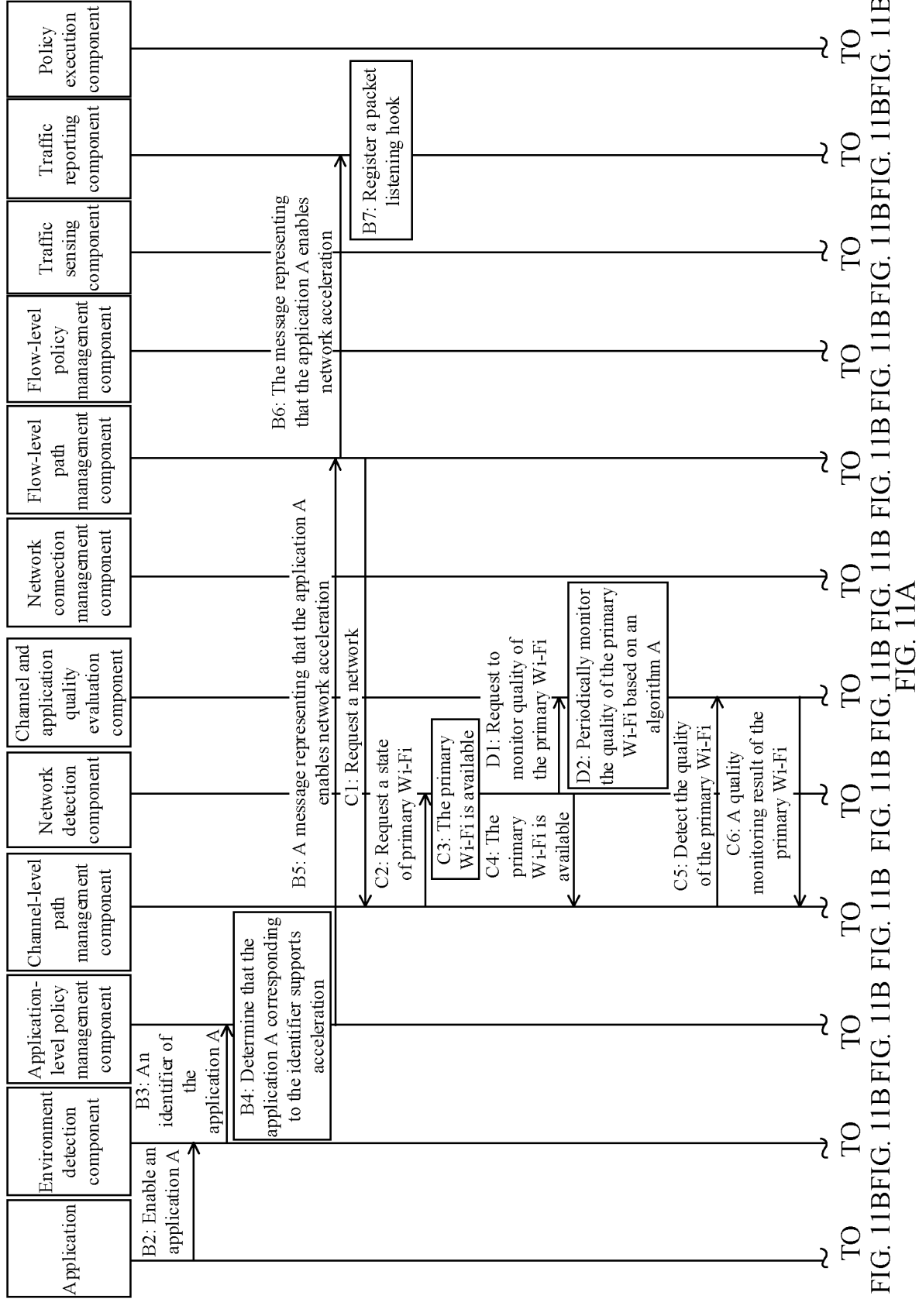
FIG. 11A, FIG. 11B, FIG. 11C, FIG. 11D, and FIG. 11E are a sequence diagram of another network acceleration method according to an embodiment of this application.
Figure 11B:
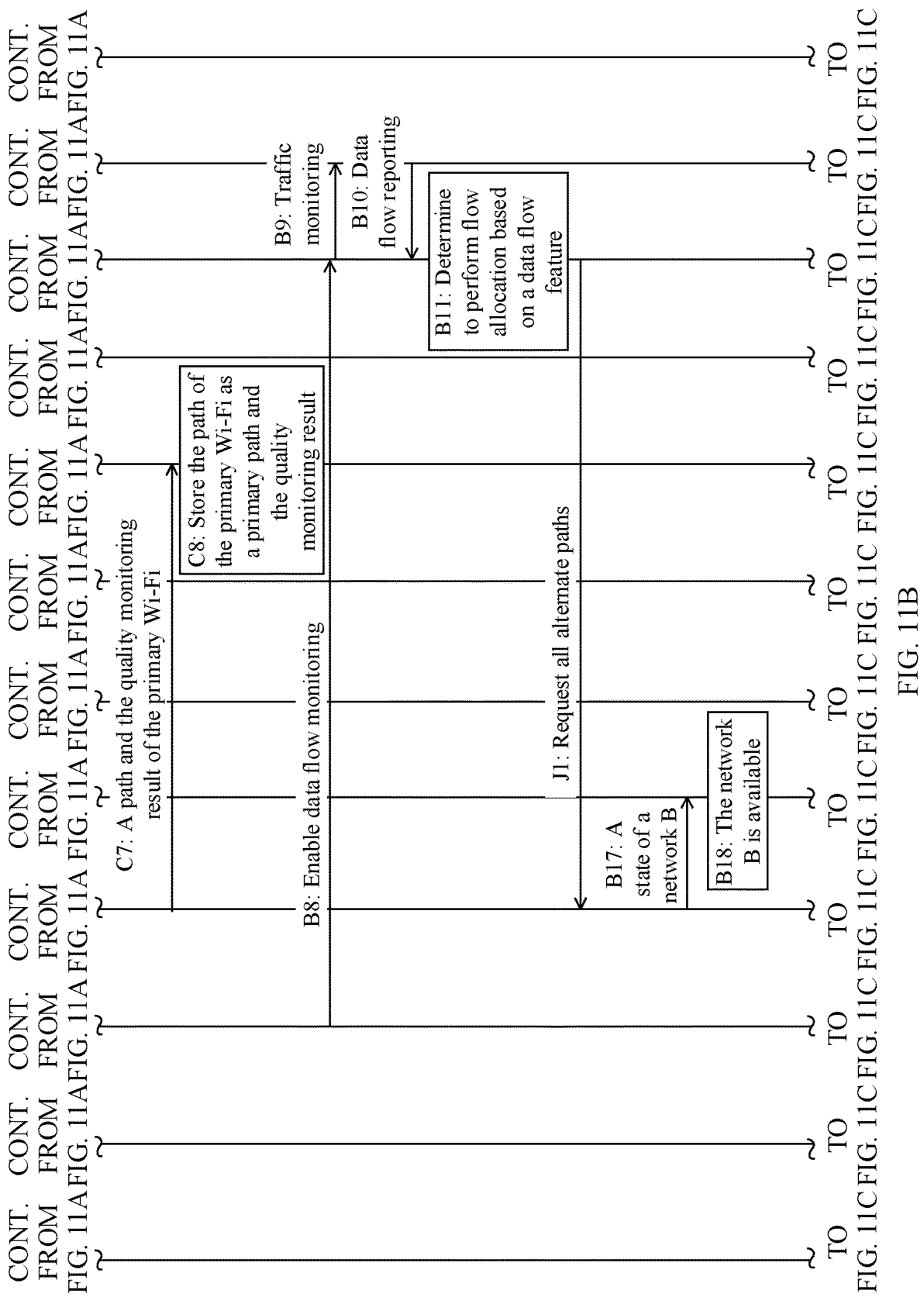
Figure 11C:
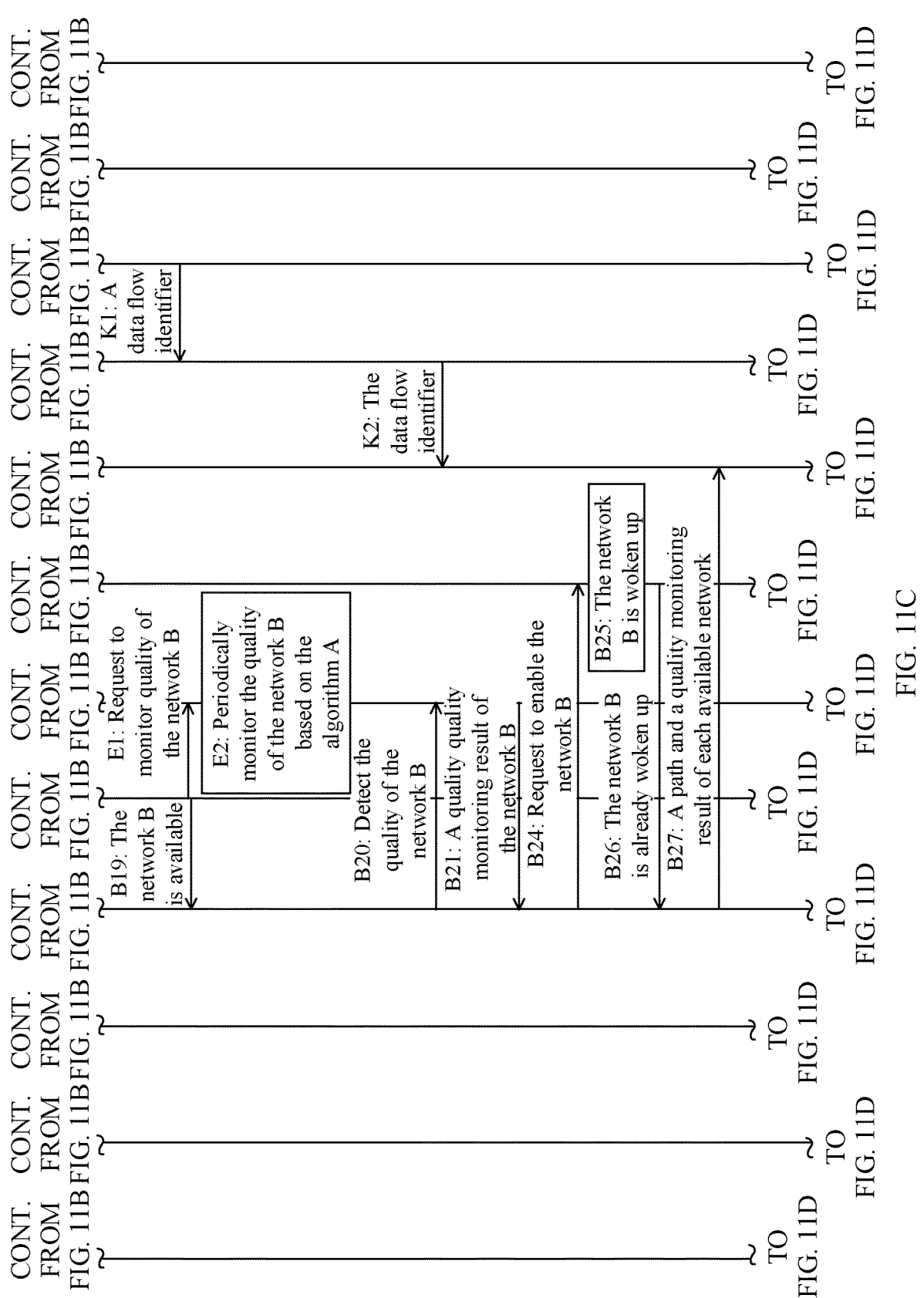
Figure 11D:
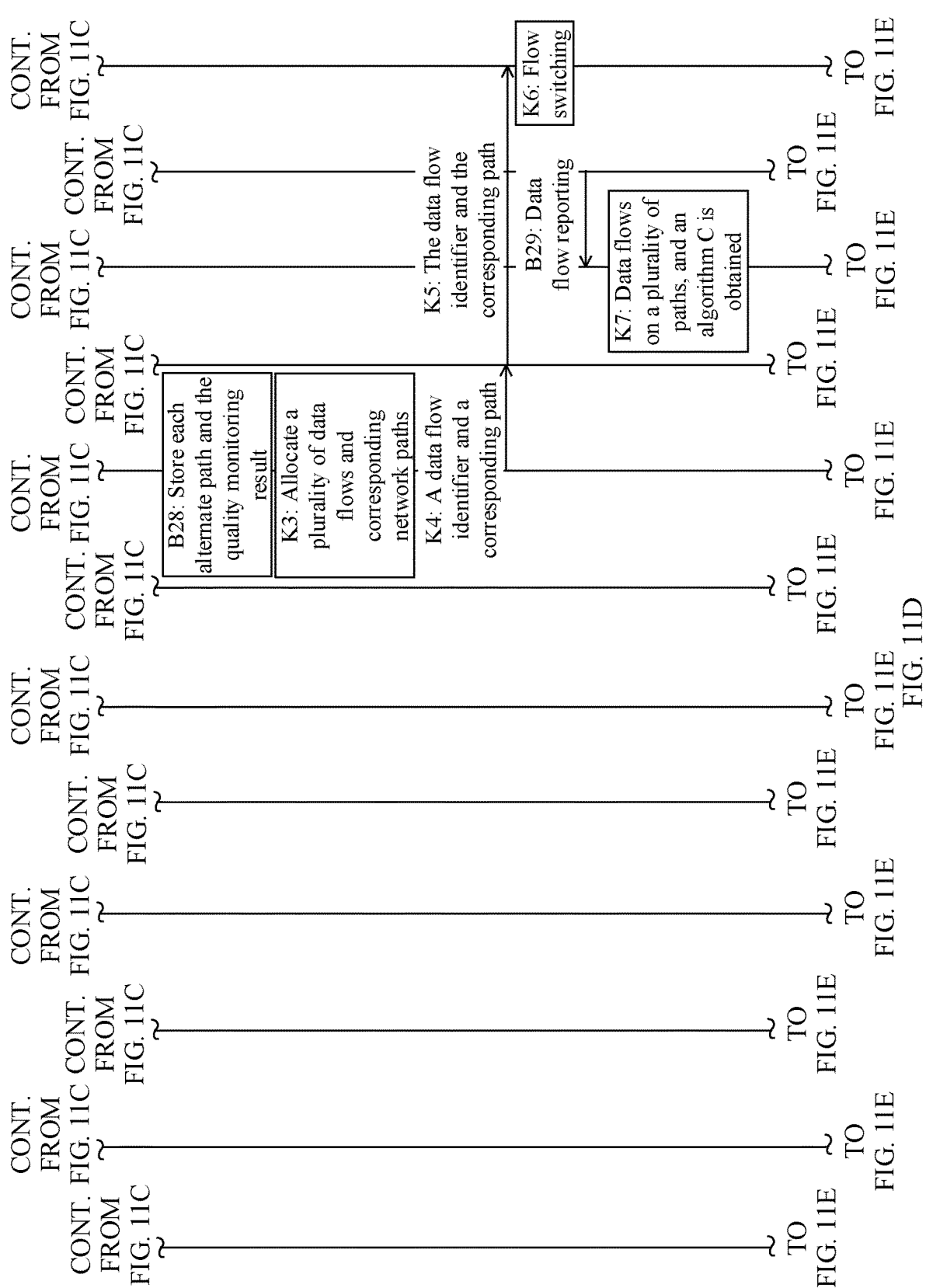
Figure 11E:
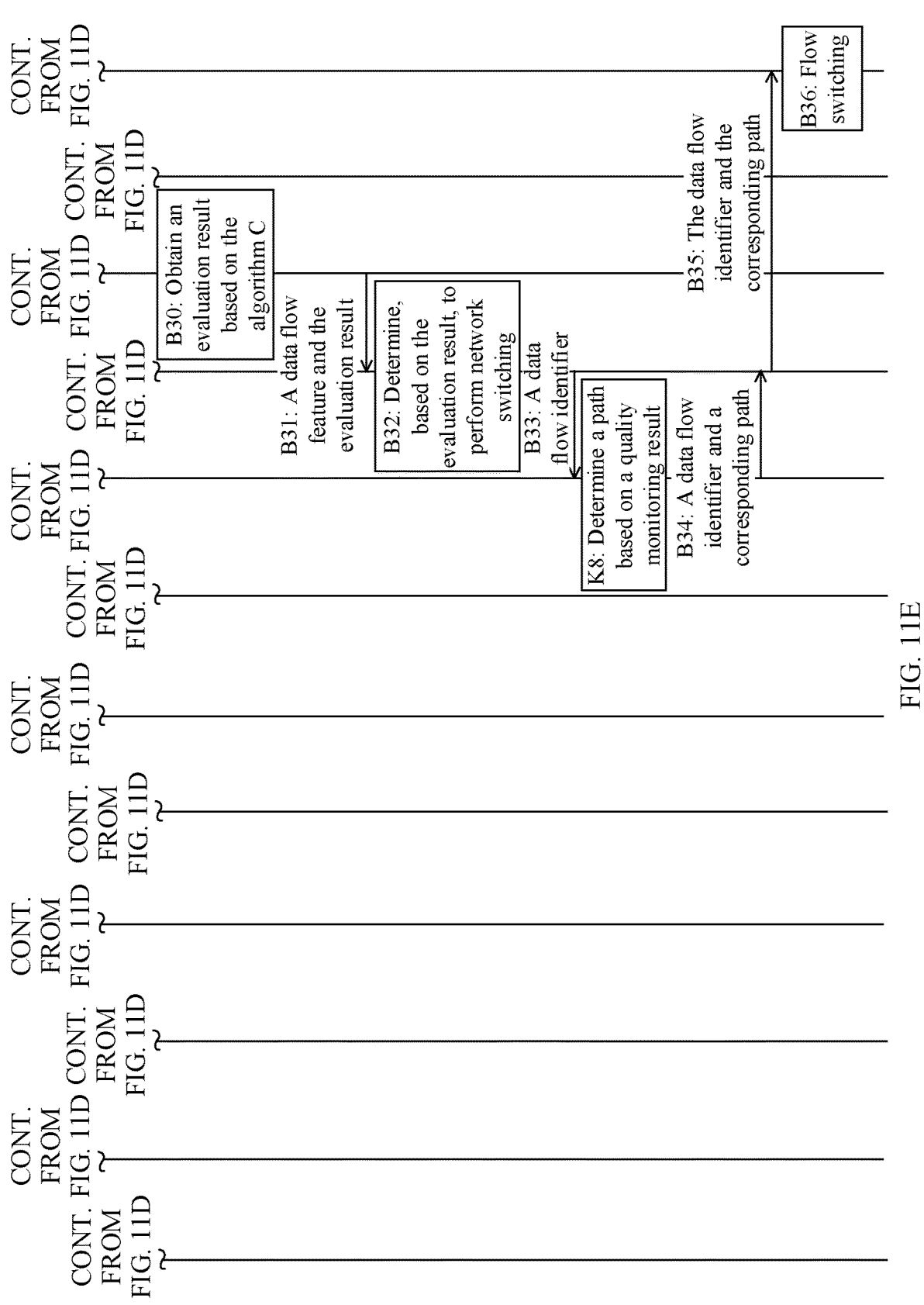
Figure 12A:
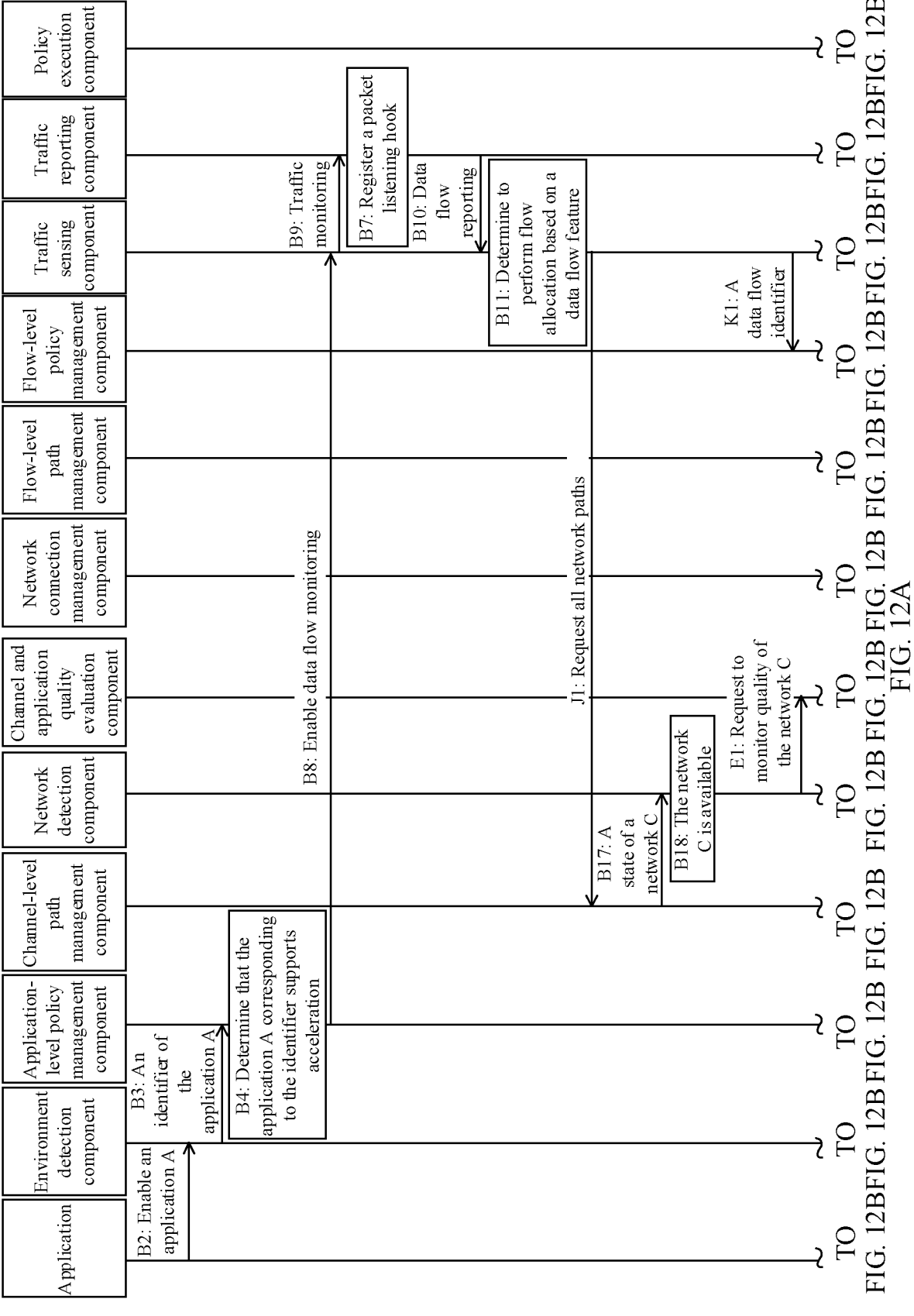
FIG. 12A, FIG. 12B, FIG. 12C, and FIG. 12D are a sequence diagram of another network acceleration method according to an embodiment of this application.
Figure 12B:
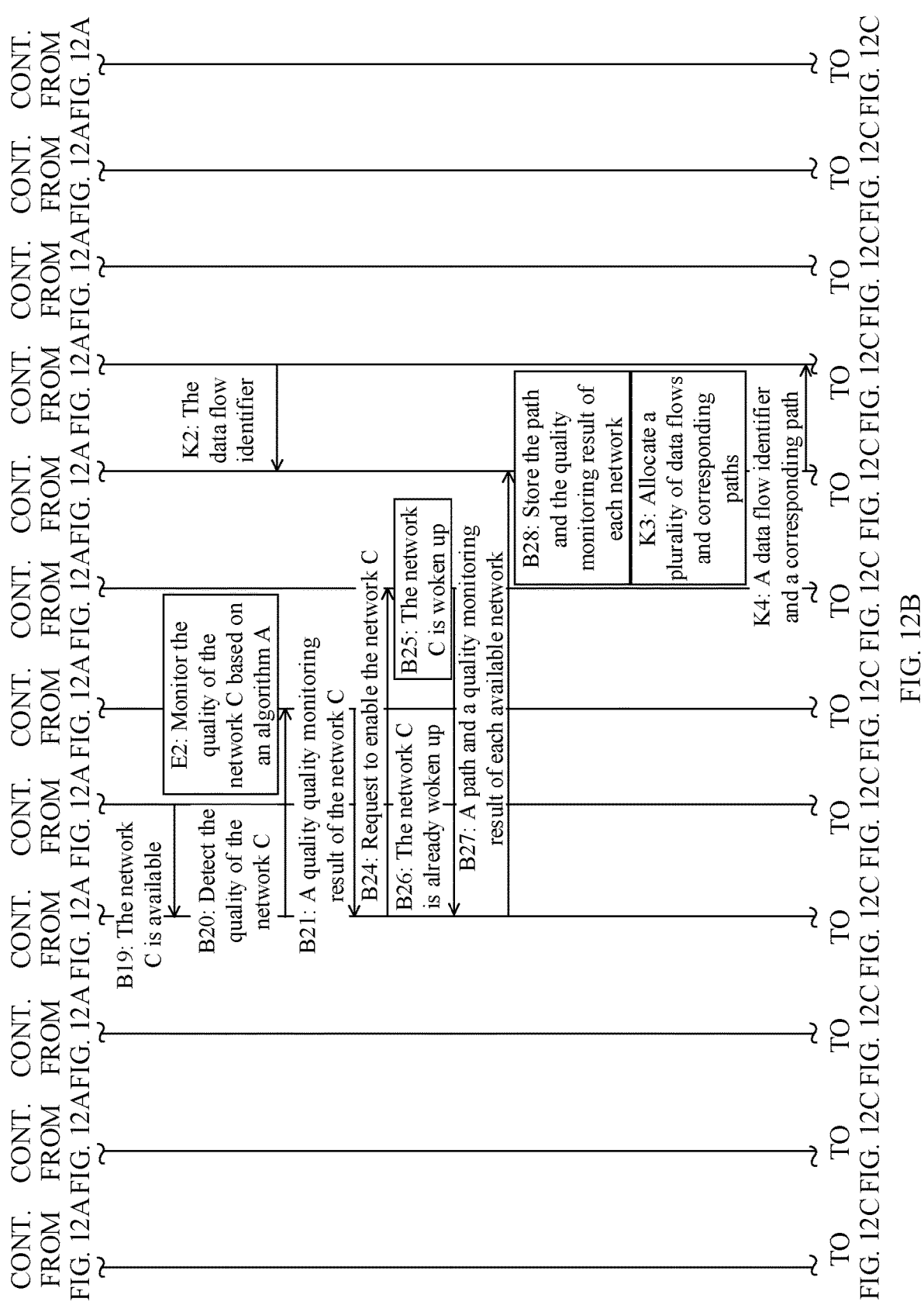
Figure 12C:
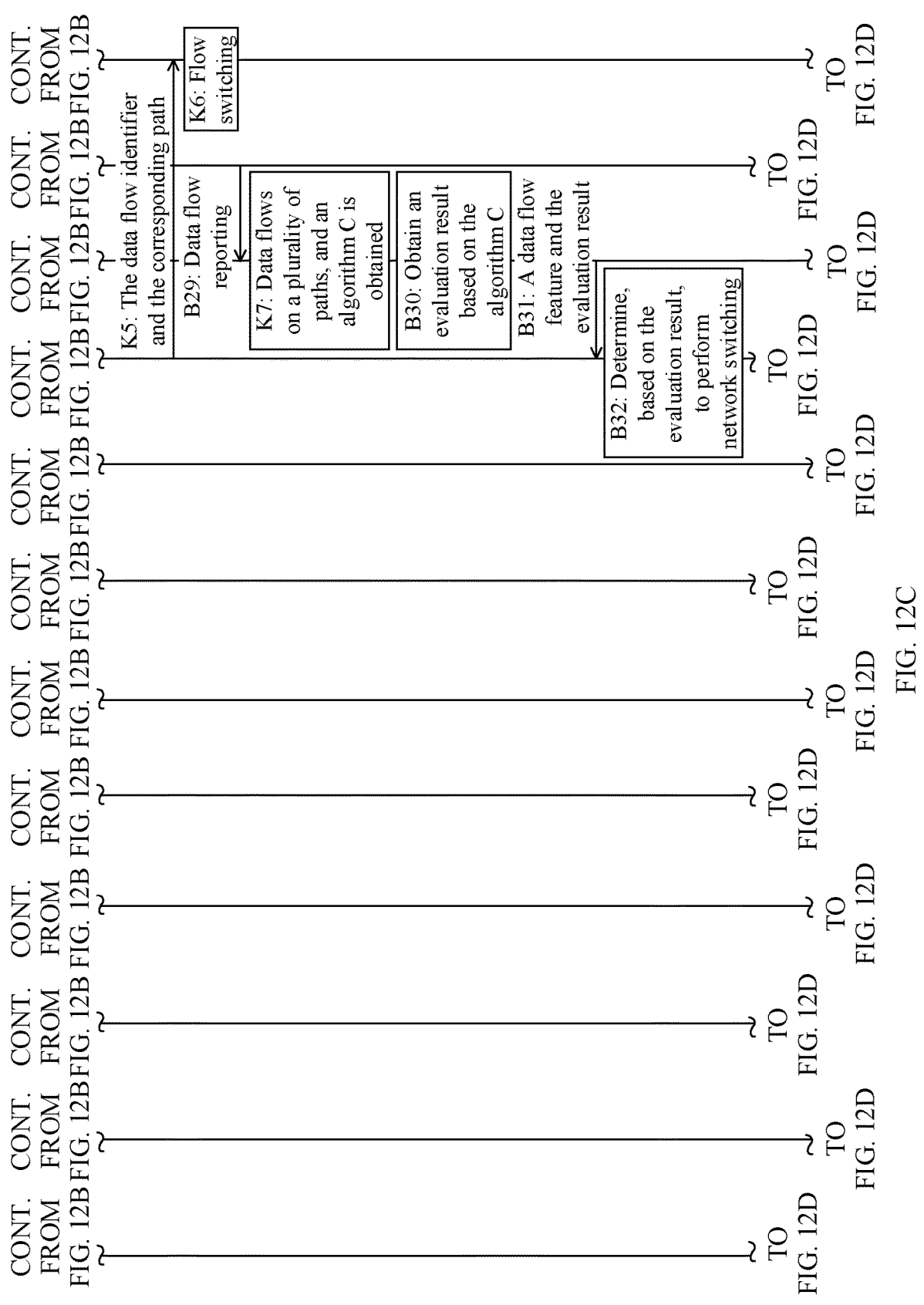
Figure 12D:
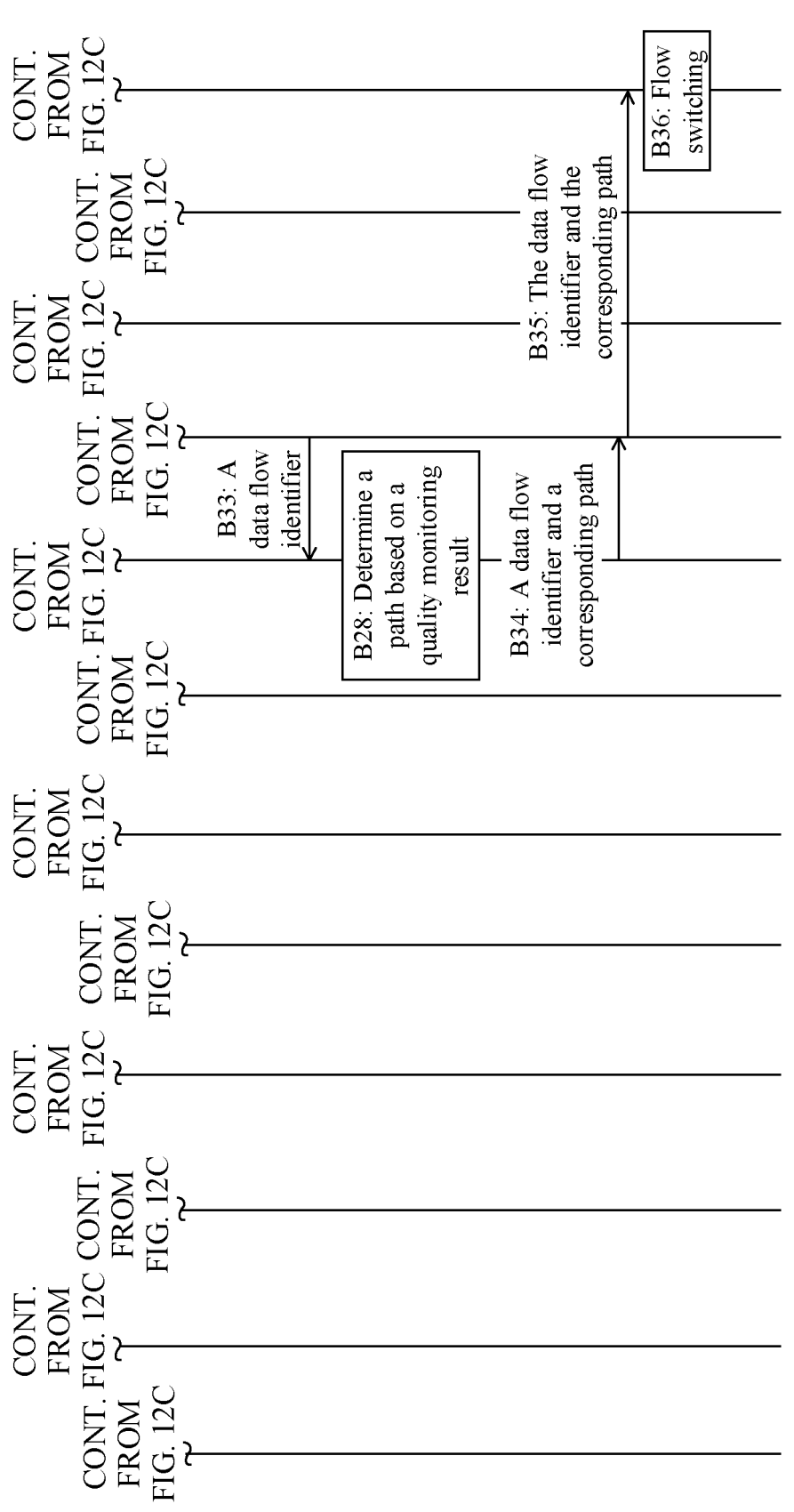

Then, the available network channels of the electronic device are woken up by performing step B17 to step B26, and a path and a quality monitoring result of each network channel that is woken up is sent to the flow-level path management component. The flow-level path management component allocates the data flow to the plurality of network channels. For step B28 to step B36, refer to the descriptions in the embodiment shown in FIG. 11A, FIG. 11B, FIG. 11C. FIG. 11D, and FIG. 11E. Details are not described herein again. The network C in FIG. 12A, FIG. 12B, FIG. 12C, and FIG. 12D is any network channel supported by the electronic device.

In the foregoing embodiment, an example in which the packet listening hook in the traffic reporting component listens to the data flow of the application A is used for description. The following describes how the packet listening hook listens to the data flow of the application A, and sends, to the traffic sensing component, the data flow that is listened to.

As described above, the Netfilter component exists in the system of the electronic device, and a data flow of an application corresponding to a specific application identifier may be obtained by using the component. The traffic reporting component may obtain the packets of the data flow of the application A by invoking the Netfilter component. In a specific implementation, information reported by the traffic reporting component to the traffic sensing component includes the packets of the data flow of the application A and some statistical information of the packets of the data flow of the application A. For details, refer to the descriptions in the embodiment shown in FIG. 13.

Figure 13:
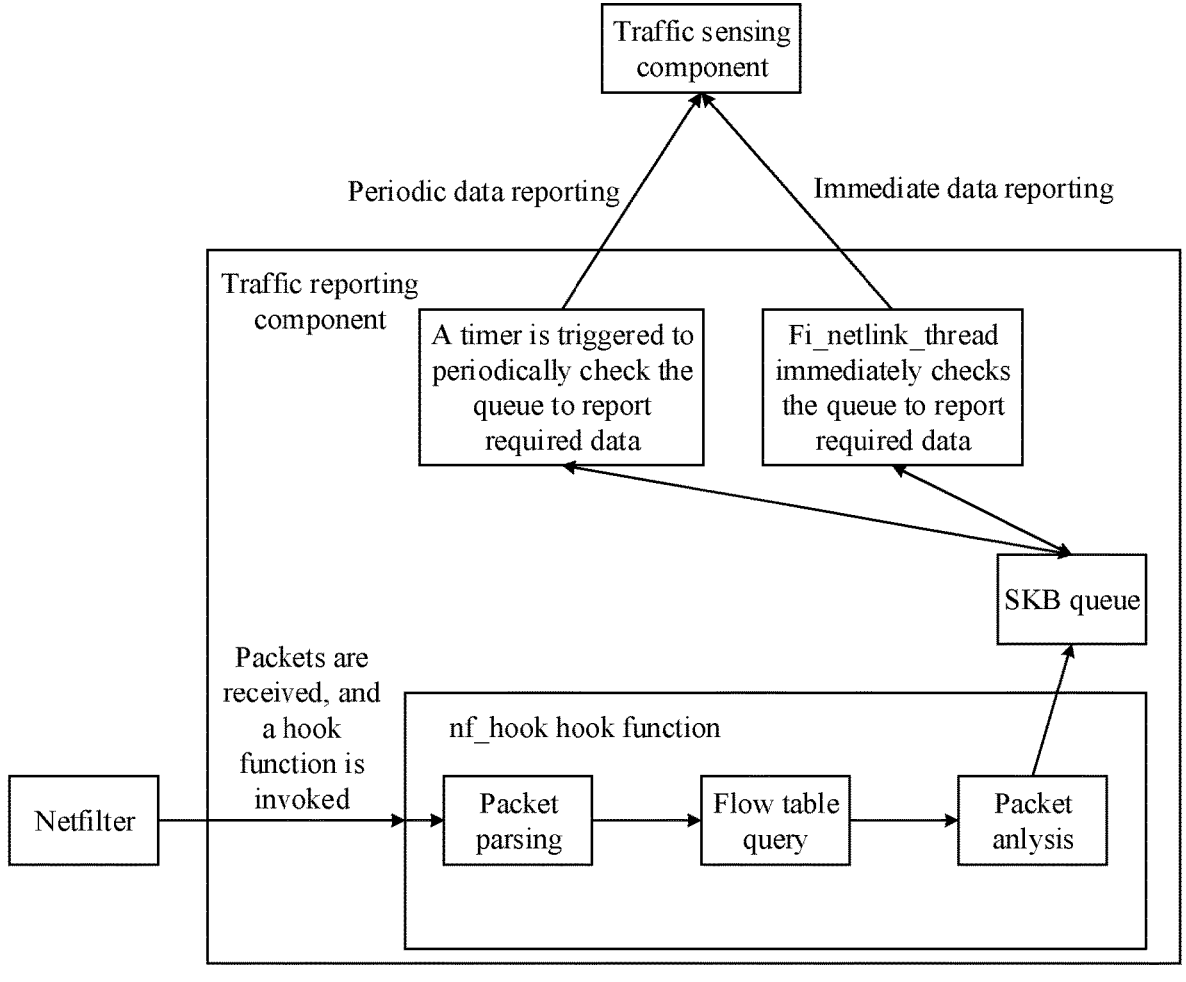
FIG. 13 is a schematic diagram of reporting a data flow to a traffic sensing component by a traffic reporting component according to an embodiment of this application.

Refer to FIG. 13. The traffic reporting component may pre-register the packet listening hook (for example, an nf_hook hook function).

After the traffic reporting component invokes the Netfilter component, the Netfilter component reports the packets of the data flow of the application A. After receiving the packets that are of the data flow and that are reported by the Netfilter component, the traffic reporting component invokes the pre-registered nf_hook hook function.

The nf_hook hook function is used to perform the following operations on the received packets of the data flow: packet parsing, flow table query; packet analysis, and another operation.

During parsing, whether an application identifier exists in the packet and four tuples (or five tuples) of the packet may be checked, to obtain a parsing result. If the application identifier exists, an application corresponding to the packet may be determined. The four tuples include: a source IP, a destination IP, a source port, and a destination port; and the five tuples include: a source IP, a destination IP, a source port, a destination port, and a protocol number. That is, a part of the feature of the data flow in Table 2 is carried in the four tuples or the five tuples of the packet. In addition, the packet (data packet) also carries the header feature.

After parsing is performed, the flow table is queried based on the parsing result, and statistical information of the flow table is updated. The flow table stores identifier information of a data flow of each application and statistical information of each data flow: The statistical information of each flow includes: a packet quantity; a total byte quantity; an error packet quantity; and the like of the data flow are received.

In actual application, the statistical information of each flow may be determined based on a parameter set in a network quality evaluation algorithm. Therefore, the statistical information of each flow may further include other information, for example, time-varying traffic distribution information of a data flow, where the time-varying traffic distribution information is generated based on sizes of data packets received based on time points, and the data packets belong to the data flow.

Certainly, if identifier information or related statistical information of a specific data flow does not exist in the flow table, an identifier and the related statistical information of the data flow may be added to the flow table.

After the flow table is queried and information about the flow table is updated, the packets may be analyzed. For example, the packets are filtered to obtain all or some of the packets.

For example, the filtering process may be filtering for heartbeat packets of a specific data flow: After filtering processing is performed, the heartbeat packets of the data flow are obtained. The filtering processing process may be that some specific features are preset and packets that meet the features are retained. That is, the packets that meet the specific preset features are filtered packets.

The heartbeat packets are packets that exist in the data flow at a specific time interval. The heartbeat packets each have a fixed feature (for example, 0x64 or 0x65) at a fixed position (for example, at a sixth byte). Because the heartbeat packets are packets that exist at a specific time, because a latency (for example, a total time from sending a heartbeat request packet by a mobile phone to a server to receiving, by the mobile phone, a heartbeat response packet fed back by the server) may be calculated based on the heartbeat packets. Information about the latency is used to determine whether the data flow meets the transmission quality improvement condition set in Table 2.

The foregoing example is described by using filtering of the heartbeat packets as an example. In actual application, filtering processing may be further performed to obtain data packets that meet other features.

For another example, a filtering condition may further include: a data packet with a specific length is selected to be retained. In a specific implementation, whether a length of a data packet is a specific preset length is determined. If the length of the data packet is the specific preset length, the packet is retained: or if the length of the data packet is not the specific preset length, the packet is filtered out.

After the foregoing processing, some filtered packets are stored in an SKB queue.

Policies for reporting the packets that are of the data flow and that are stored in the SKB queue include immediate reporting and periodic reporting.

For immediate reporting, a specific thread in the traffic reporting component checks the queue in time, and reports the packets in the queue to the traffic sensing component in time.

For periodic reporting, a timer is set in the traffic reporting component. The packets in the SKB queue are checked in a specific period based on a time set by the timer, and some or all of the packets in the queue are reported to the traffic sensing component.

Certainly; in actual application, some of the packets that are of the data flow and that are stored in the SKB queue need to be immediately reported, and some of the packets need to be periodically reported. According to the same principle, a specific thread in the traffic reporting component checks the queue in time, and reports the packets that need to be immediately reported in the queue to the traffic sensing component in time. A timer is further set in the traffic reporting component. The packets in the SKB queue are checked in a specific period based on a time set by the timer, and the packets that need to be periodically reported in the queue are reported to the traffic sensing component.

It should be noted that when the packets are reported, the statistical information related to the packets also needs to be reported.

Based on the foregoing understanding, the traffic reporting component does not report all the packets sent by the Netfilter component to the traffic sensing component. Instead, packets that meet a specific feature (statistical information of the packets that meet the specific feature may be carried) are reported to the traffic sensing component. In addition, the statistical information related to the packets that meet the feature is reported.

For example, if both a packet 1 and a packet 2 are packets of a same data flow, when the flow table is queried after the packet 1 is received, statistical information related to the data flow in the flow table is updated based on the packet 1. However, because the packet 1 does not meet the specific feature, the packet 1 is filtered out and is not reported to the traffic sensing component. When the flow table is queried after the packet 2 is received, the statistical information related to the data flow in the flow table is updated based on the packet 2. Because the packet 2 meets the specific feature, the packet 2 is not filtered out, and the packet 2 is reported to the traffic sensing component. That is, although some packets are reported, the statistical information is obtained based on all packets in the data flow.

In the foregoing example, the reported packets and the related statistical information are used by the traffic sensing component to determine a feature of the data flow represented by the packets and transmission quality of the data flow. After how the traffic reporting component reports the packets of the data flow to the traffic sensing component is described, the following describes how to determine, based on the data packets that are of the data flow and that are reported by the traffic reporting component to the traffic sensing component, the feature conditions for setting the data flows and the transmission quality improvement conditions set by the network quality evaluation algorithms in the Table 2.

For example, packets (data packets) with same four tuples (a source address, a source port, a destination address, and a destination port) belong to a same data flow: If a plurality of packets having same four tuples are transmitted through a network channel, the plurality of packets having the same four tuples belong to one data flow. It may also be understood as that the plurality of packets may exist in one data flow. In addition, the packets in the data flow carry sequence numbers of the packets in the data flow: Because these packets have a same feature, an identifier of the data flow to which the packets belong may be generated based on the same feature. For example, the identifier of the data flow to which the packets belong may be generated based on the four tuples of the packets.

After receiving the packets, the traffic reporting component may determine, based on an application identifier carried in the packets, an application to which the packets belong. The identifier of the data flow to which the packets belong may be further generated based on the four tuples of the packets.

Certainly, after the traffic uploading component uploads the packets to the traffic sensing component, the traffic sensing component may alternatively determine, based on the received packets, the identifier of the application to which the packets belong and the identifier of the data flow to which the packets belong. The traffic reporting component may determine a protocol in a feature of the data flow based on a protocol number in five tuples of the packets, and may determine a port in the feature of the data flow based on a destination port in the four tuples or the five tuples. A packet feature in the feature of the data flow may be determined based on a header feature of the packets. That is, based on the packets reported by the traffic reporting component, the feature of the data flow in which the packets are located may be determined.

Certainly, the foregoing manner of determining the feature of the data flow is merely used as an example. In actual application, the feature of the data flow in which the packets are located may alternatively be determined in another manner.

After the electronic device can determine the feature of the data flow to which the received packets belong, the electronic device may determine, based on the feature of the data flow, a transmission quality improvement condition set by a corresponding network quality evaluation algorithm.

Certainly, in actual application, to ensure accuracy of the obtained transmission quality improvement condition set by the network quality evaluation algorithm, a limitation condition may be further added: an identifier of an application. That is, the transmission quality improvement condition set by the corresponding network quality evaluation algorithm is jointly determined based on the identifier of the application and the feature of the data flow.

After the transmission quality improvement condition set by the network quality evaluation algorithm is determined, the transmission quality improvement condition set by the network quality evaluation algorithm is used to evaluate only transmission quality of data flows having a same data flow feature (or a same application identifier and/or a same data flow identifier may be added).

When the transmission quality is evaluated, one or more of the following parameters may be used: a latency; a packet loss rate, whether there is a response, and a rate.

As described above, the latency may be determined based on heartbeat packets in a specific data flow: Because the packets carry the sequence numbers of the packets in the data flow, a packet loss condition may be determined based on the sequence numbers. Whether there is no downlink response is determined based on a total packet quantity in the statistical information in the foregoing example. For example, if total packet quantities received within two consecutive periods are the same, it is determined that there is no downlink response. A transmission rate is determined based on the total byte quantity in the statistical information in the foregoing example. For example, a ratio of a difference between total byte quantities received in a previous period and a current period to the period is a downlink rate of the current period.

Certainly, the foregoing parameter determining manner is merely used as an example. In actual application, the foregoing parameters may alternatively be determined in another manner.

In another embodiment of this application, a specific application may be installed in a plurality of electronic devices, and the plurality of electronic devices may all communicate with a server corresponding to the application.

Figure 14:
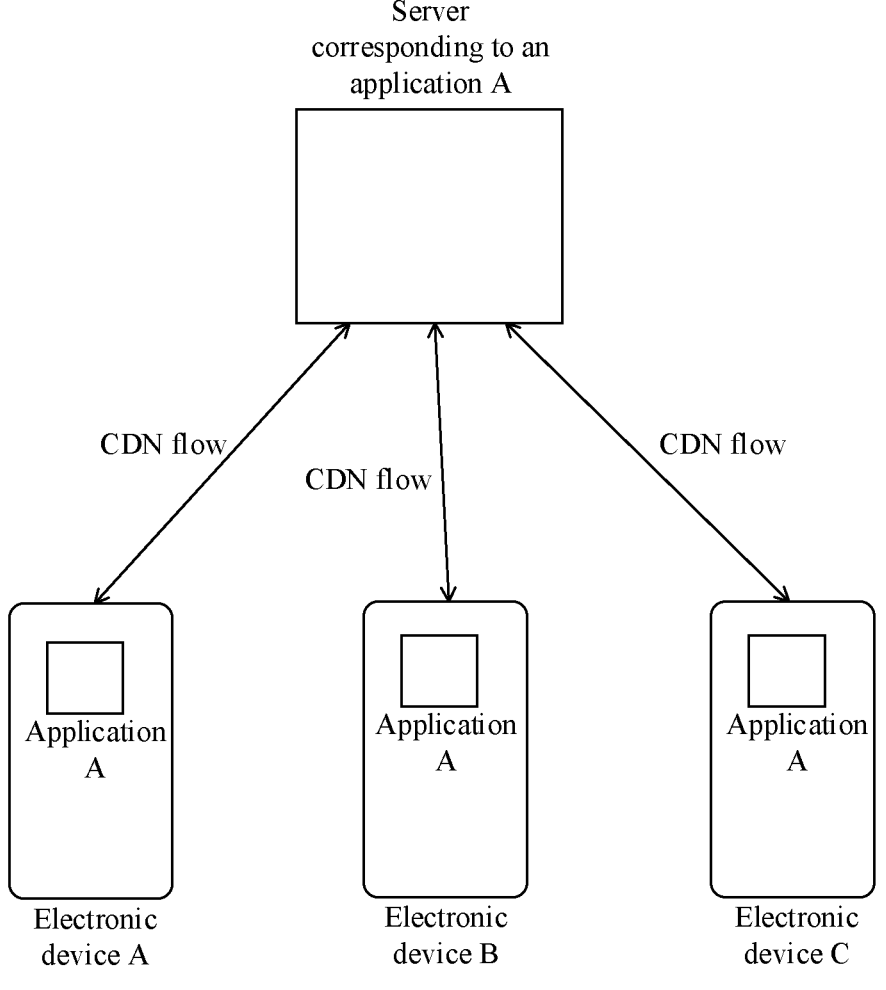
FIG. 14 shows a CDN network architecture according to an embodiment of this application.

FIG. 14 is a diagram of a scenario in which applications in a plurality of electronic devices communicate with a server corresponding to the applications.

In the figure, an application A is installed in a plurality of electronic devices. The plurality of electronic devices all communicate with a server corresponding to the application A, where an electronic device A, an electronic device B, and an electronic device C separately communicate with the server corresponding to the application A. A network architecture shown in FIG. 14 is a content delivery network (CDN) architecture.

Figure 15:
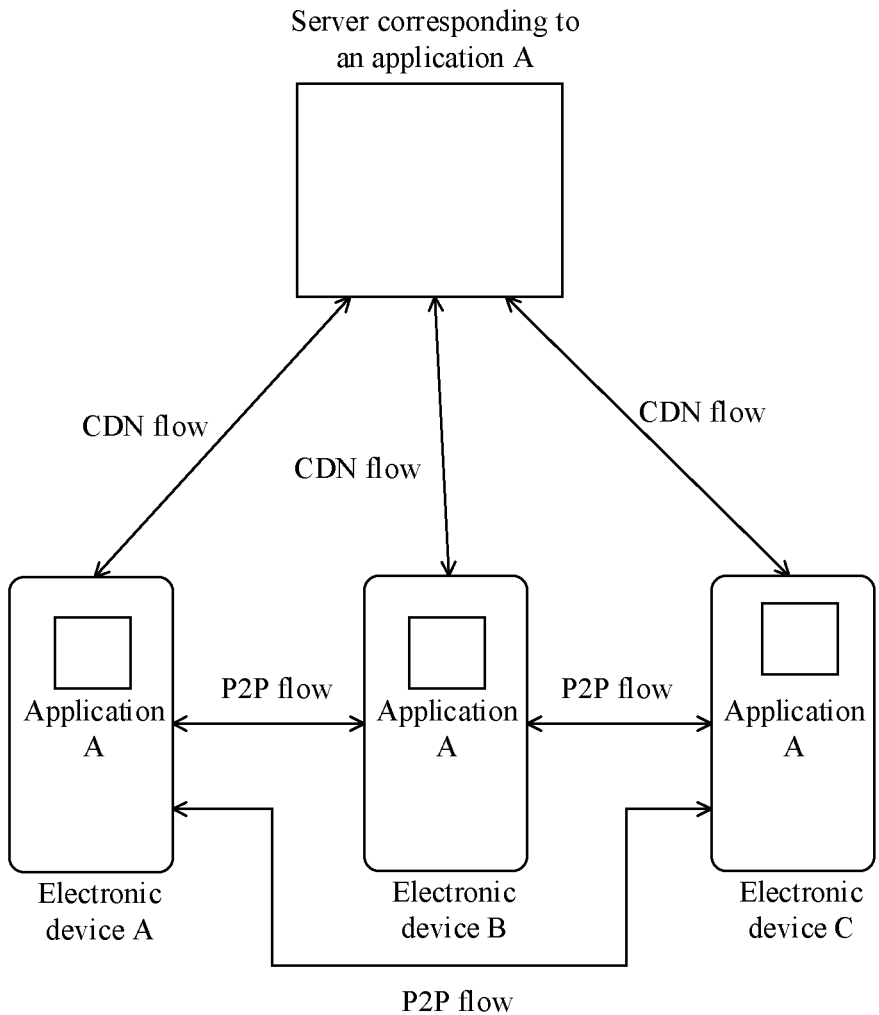
FIG. 15 shows a CDN network architecture including a P2P technology according to an embodiment of this application.
Figure 16A:
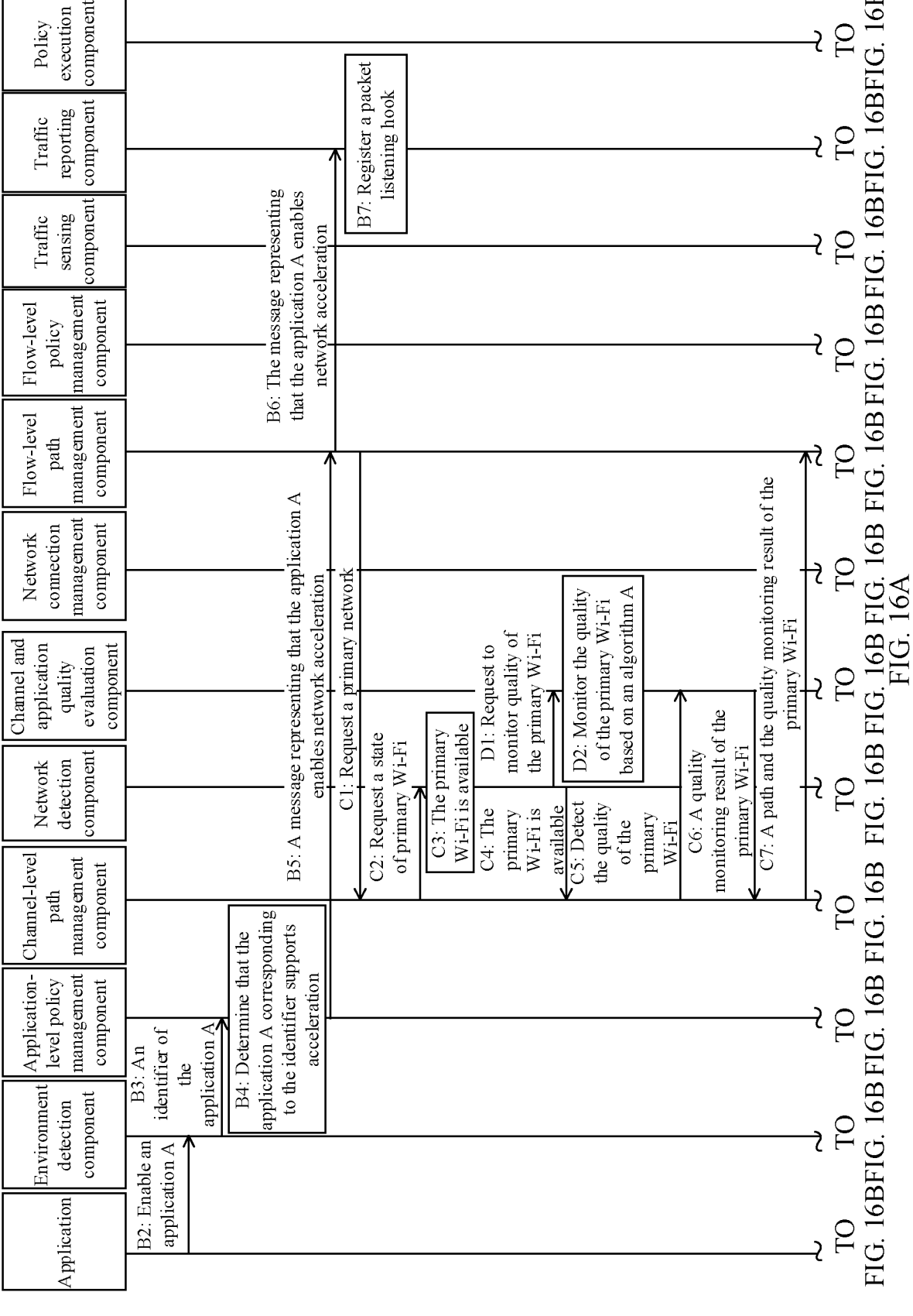
FIG. 16A, FIG. 16B, FIG. 16C, FIG. 16D, and FIG. 16E are a sequence diagram of a network acceleration method for data flows including a P2P flow according to an embodiment of this application.
Figure 16B:
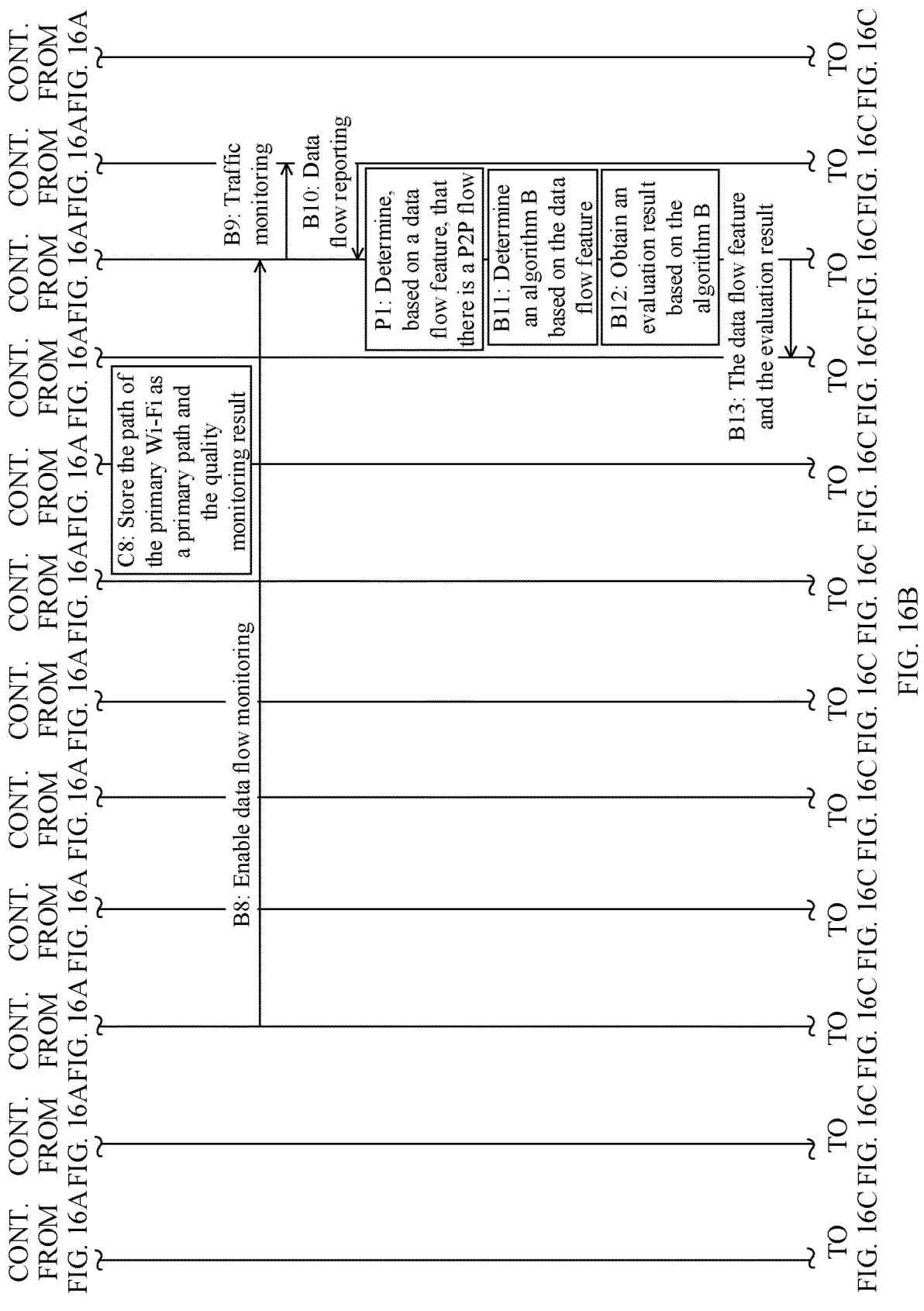
Figure 16C:
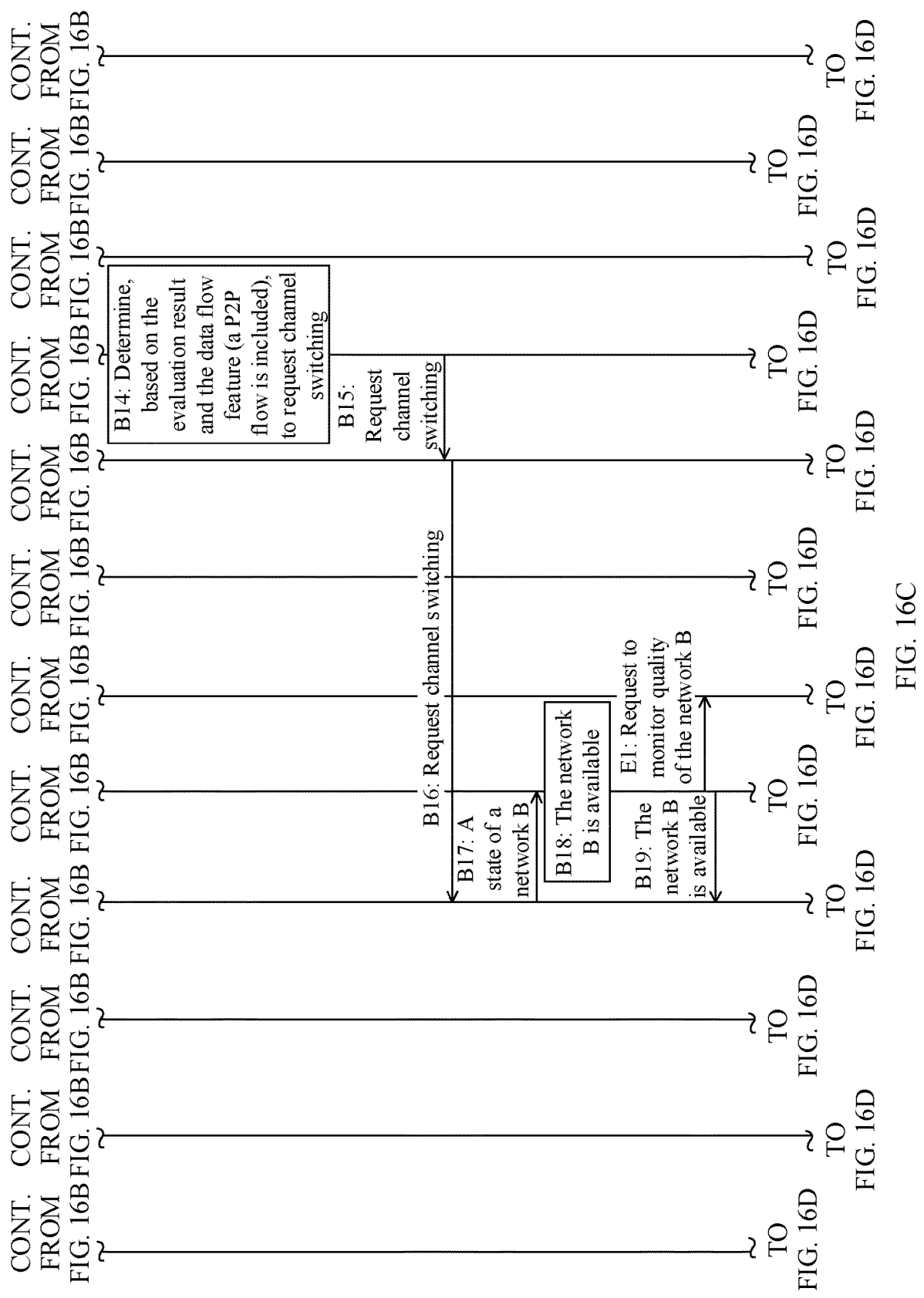
Figure 16D:
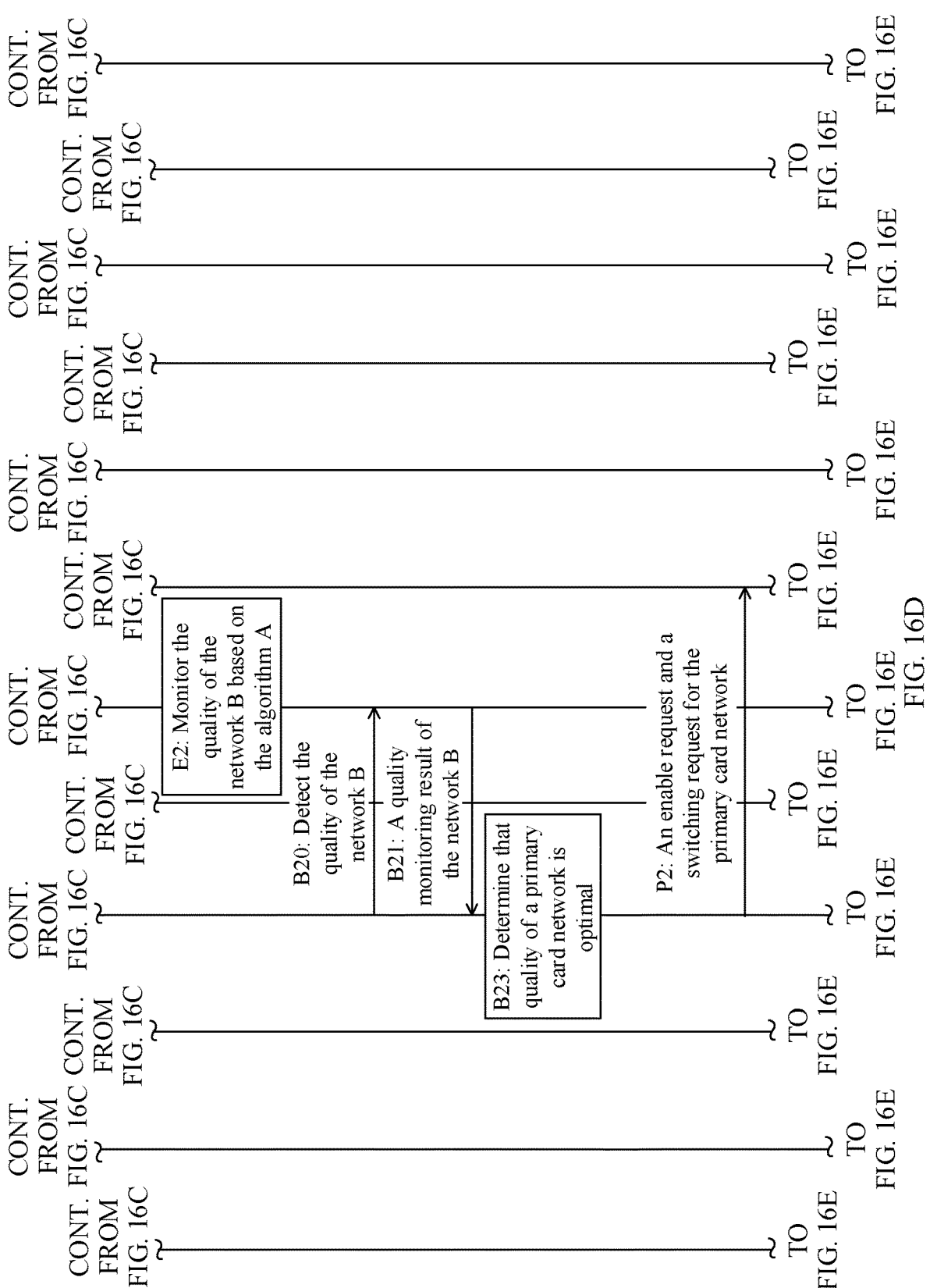
Figure 16E:
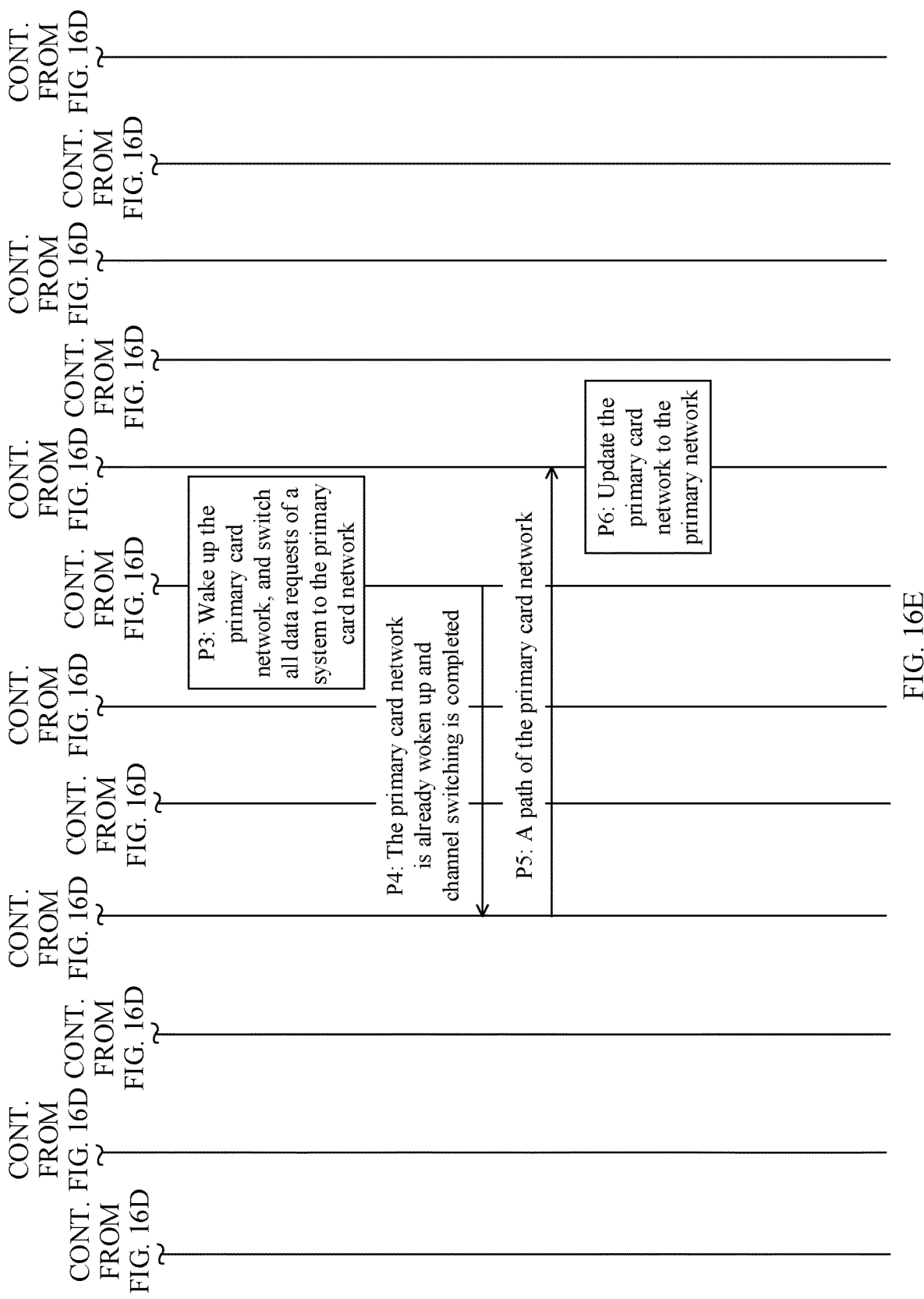
Figure 17A:
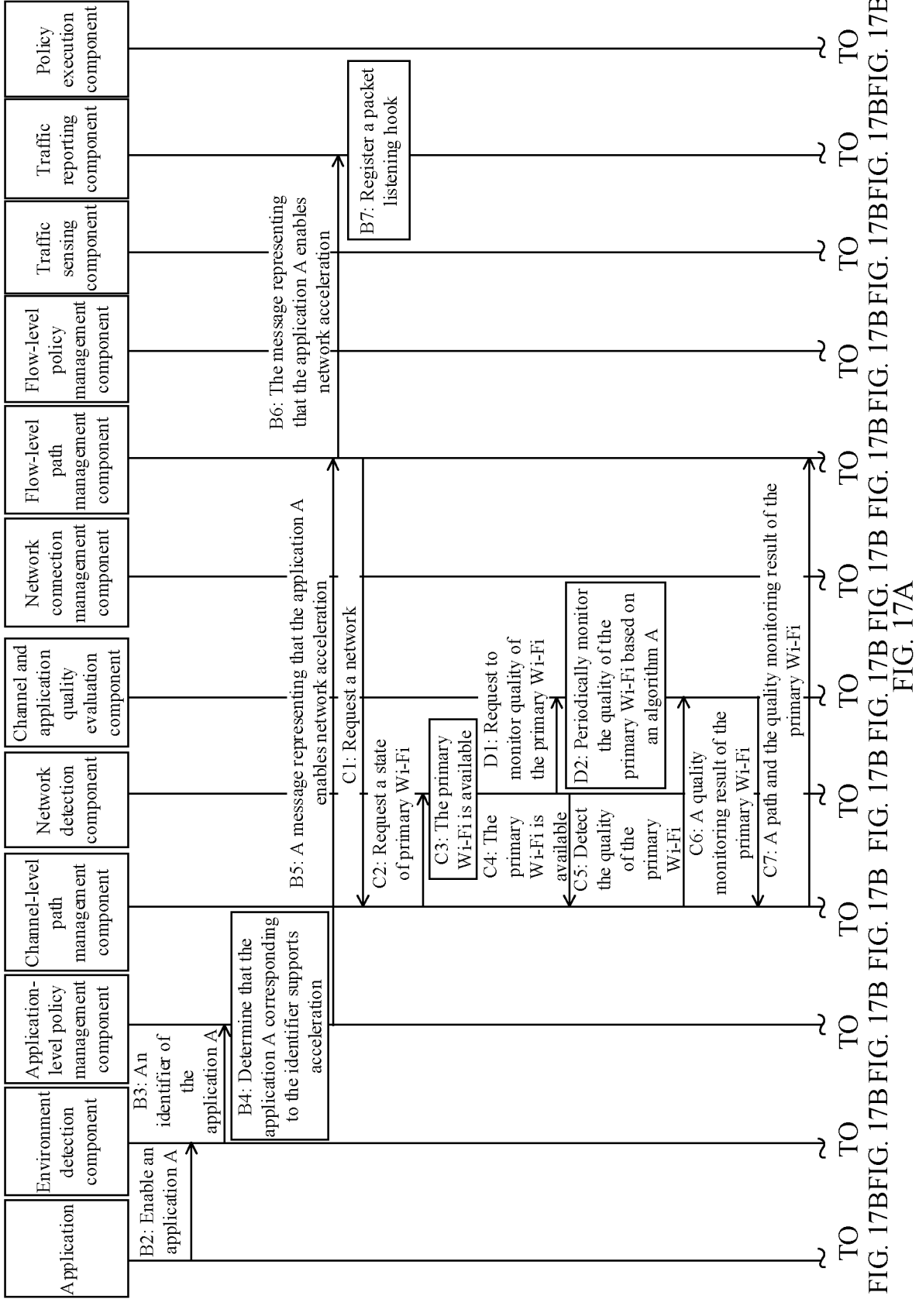
FIG. 17A, FIG. 17B, FIG. 17C, FIG. 17D, and FIG. 17E are a sequence diagram of another network acceleration method for data flows including a P2P flow according to an embodiment of this application.
Figure 17B:
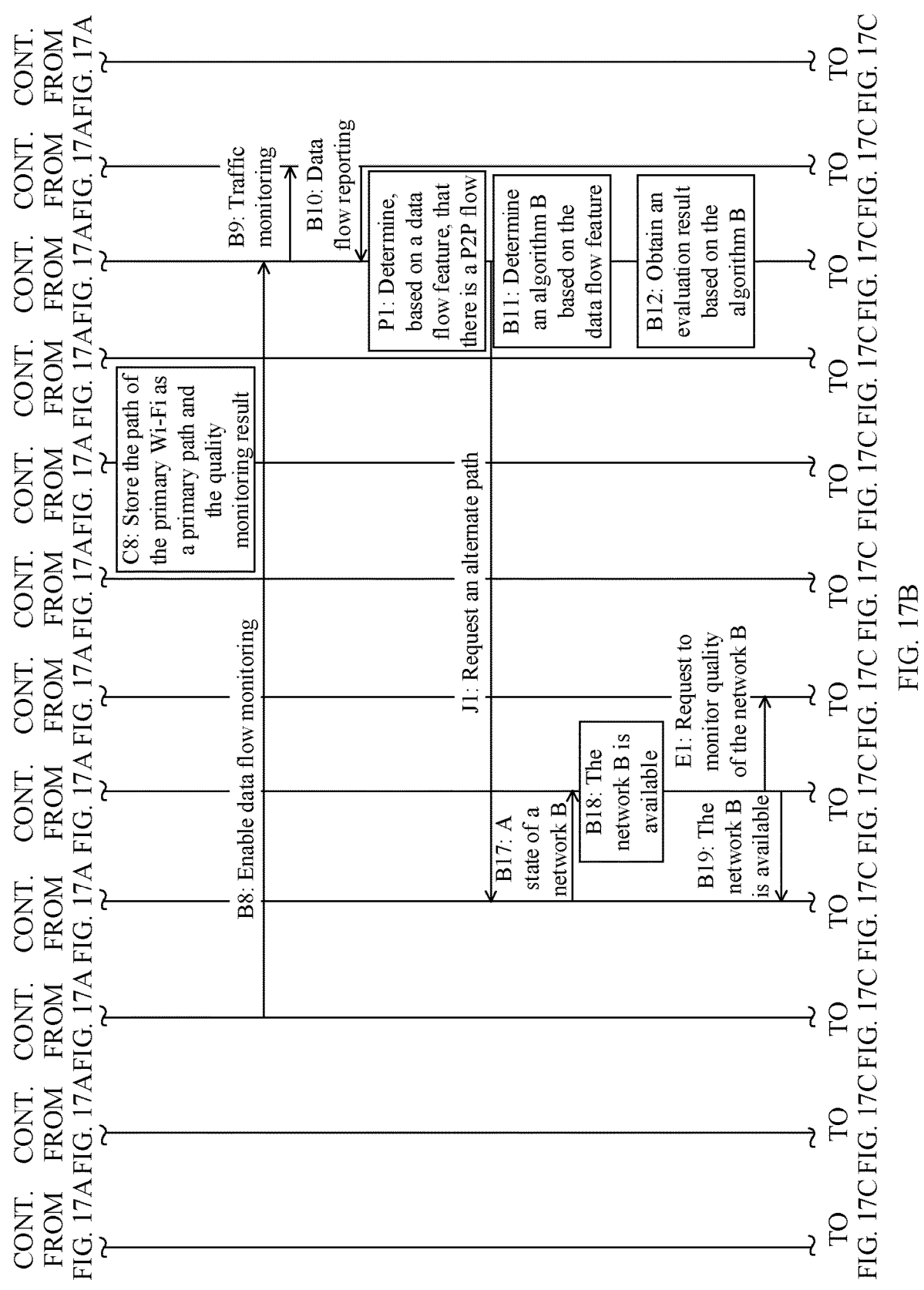
Figure 17C:
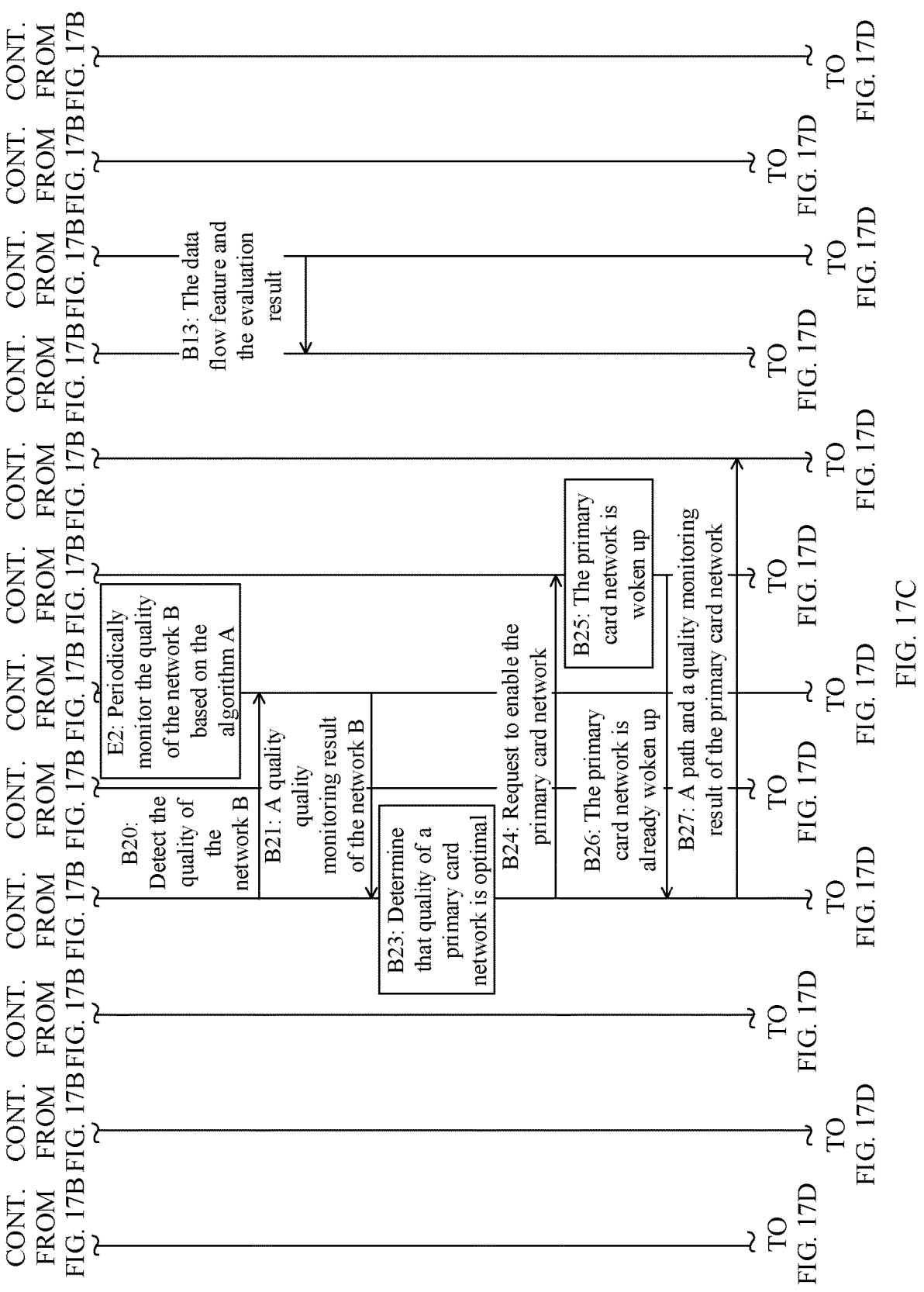
Figure 17D:
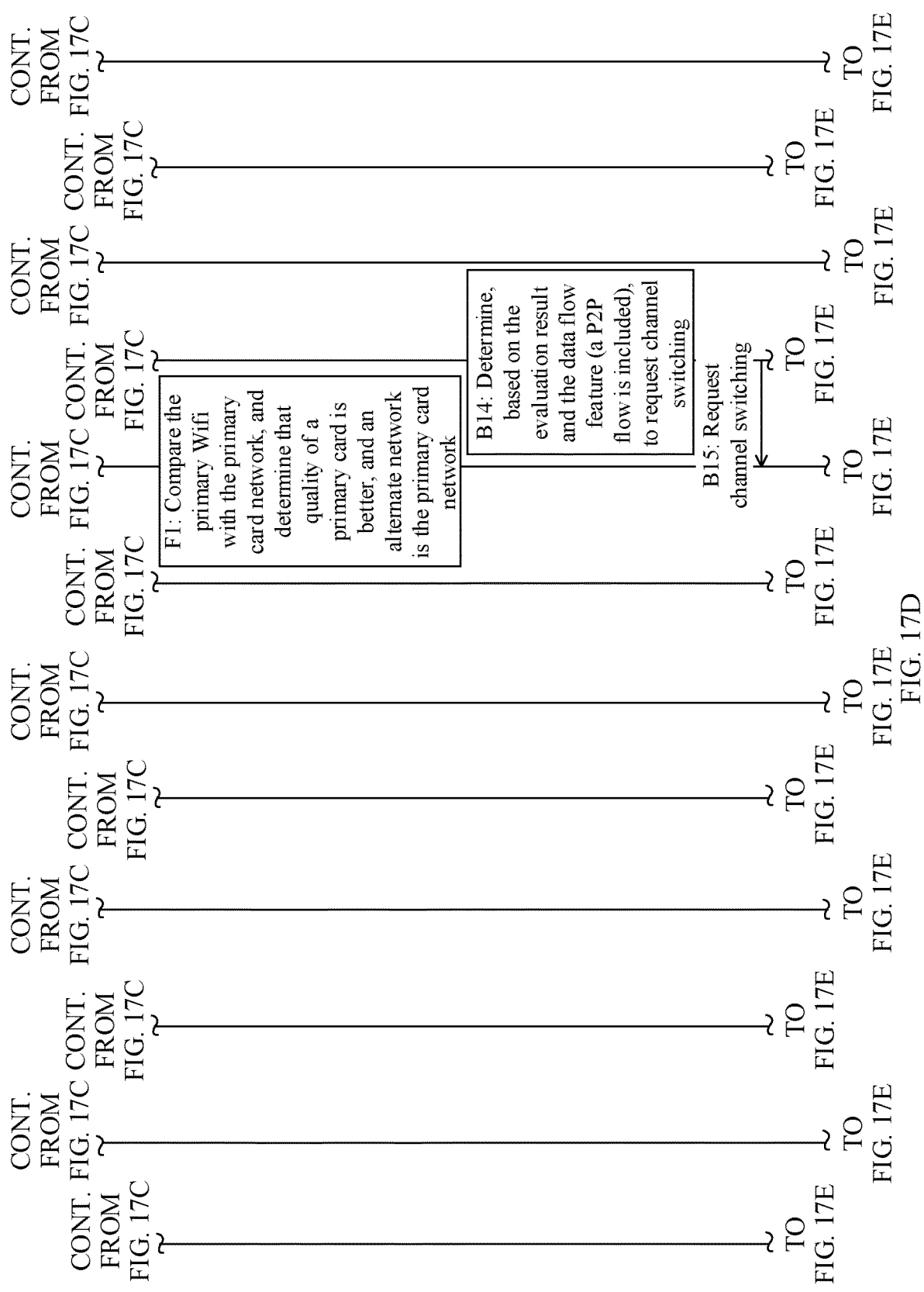
Figure 17E:
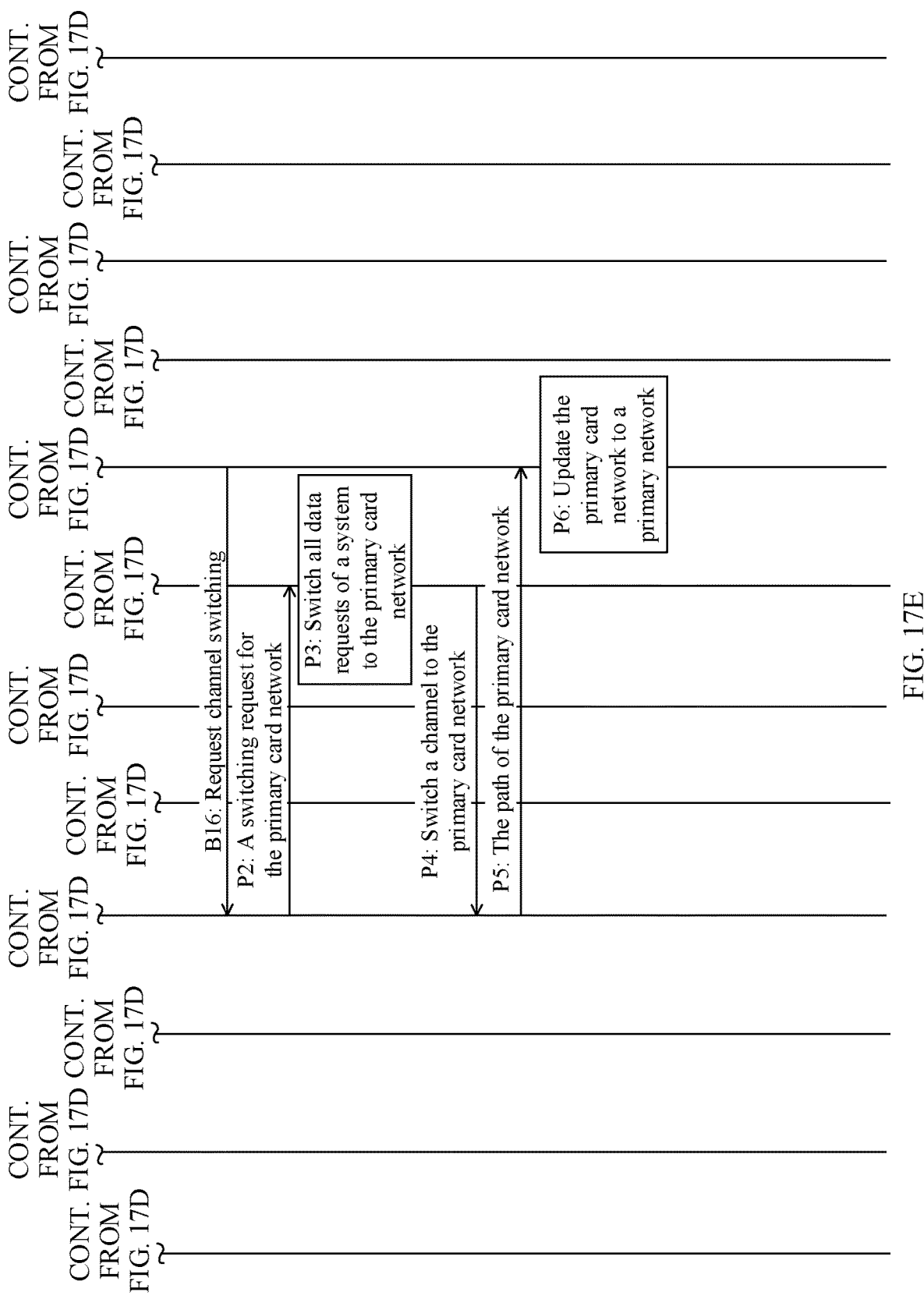

In a specific implementation, communication may alternatively be implemented in another network architecture form. FIG. 15 shows another network architecture according to an embodiment of this application.

In the figure, based on the network architecture shown in FIG. 14, the plurality of electronic devices may also communicate with each other. For example, the electronic device A and the electronic device B may communicate with each other, the electronic device B and the electronic device C may also communicate with each other, and the electronic device A and the electronic device C may also communicate with each other. An architecture for communication between the electronic devices is a peer to peer (P2P) architecture. That is, the network architecture shown in FIG. 15 includes a CDN architecture and a P2P architecture.

By using the CDN architecture shown in FIG. 14, each electronic device may upload stored data to the server. If the electronic device A needs to obtain data A, the electronic device A needs to send a query request for the data A to the server, and the server transmits, to the electronic device A based on the query request for the data A, the data A uploaded by the electronic device B to the server in advance.

By using the P2P architecture shown in FIG. 15, each electronic device may upload a list of stored data to the server. If the electronic device A needs to obtain data A, the electronic device A needs to send a query request for the data A to the server, the server returns, based on the query request for the data A, an address of the electronic device B in which the data A is located, the electronic device A requests, based on the received address, to obtain the data A from the electronic device B, and the electronic device B returns the data A to the electronic device A.

In actual application, in particular, if the CDN architecture is used in a video service scenario of a video application, the applications A in the plurality of electronic devices may simultaneously communicate with the server to request video flow data. Consequently, the server is overloaded, or even the server is crashed. Therefore, the foregoing problem is usually improved based on the CDN architecture by using a P2P technology: For ease of description, a video flow received by the electronic device by using the CDN architecture may be denoted as a CDN flow, and a video flow received by the electronic device by using the P2P architecture may be denoted as a P2P flow.

To have a clearer understanding of the P2P flow, the following scenario is used to describe the P2P flow:

When the electronic device A prepares to share a video file A, the electronic device A fragments the video file A based on a BitTorrent protocol (for example, client software Bit-Torrent, BitComet, and BitSpirit, where the software may exist as plugins of a browser application), and fragment information and a download address of the video file A are uploaded to the server.

Another electronic device may download the video file A by using the electronic device A as a seed node. The electronic device B may obtain the download address of the video file A from the server, and then download the video file A from the electronic device A as the seed node based on the download address. In a download process, the electronic device B may download some video fragments, and the video fragments already downloaded by the electronic device B may also be shared by another electronic device (for example, the electronic device C). If the electronic device C also needs to download the video file A, the electronic device C may obtain download addresses (the electronic device A and the electronic device B) of the video file A from the server, and then based on the download addresses, download the video file A from the electronic device A as the seed node or download the video fragments from the electronic device B. In addition, the video fragments already downloaded by the electronic device C may also be shared by another electronic device for download. If an electronic device D also needs to download the video file A, the electronic device D may obtain download addresses (the electronic device A, the electronic device B, and the electronic device C) of the video file A from the server, and then based on the download addresses, download the video fragments of the video file A from the electronic device A as the seed node, download the video fragments from the electronic device B. or download the video fragments from the electronic device C. In addition, the video fragments already downloaded by the electronic device D may also be shared by another electronic device for download. In this process, more electronic devices perform download. Correspondingly, more download addresses may be shared, and a download rate is faster.

Certainly, in the foregoing example, regardless of whether in a process in which the electronic device B downloads the video fragments of the video file A from the electronic device A or after the electronic device A downloads the video file A, if the electronic device A does not delete the video file (or the video fragments) that is already downloaded and is in a networked state, the electronic device A can provide the download address for download by another electronic device.

It should be noted that P2P flow transmission performed in the BitTorrent protocol manner is merely used as an example. In actual application, any P2P flow transmission method that uses a P2P technology principle may be applied to this embodiment of this application for P2P flow transmission between the electronic devices.

In the foregoing example, from a perspective of a user, if a user 1 uploads related information of the video file A by using specific client software on the electronic device A of the user 1, after seeing the related information of the video file A on the client software on the electronic device B of a user 2, the user 2 taps download, and the electronic device B of the user 2 downloads the video file A from the electronic device A of the user 1. After seeing the related information of the video file A on the client software on the electronic device C of a user 3, the user 3 performs taps download, and the electronic device C of the user 3 downloads the video file A from the electronic device A of the user 1 or the electronic device B of the user 2. It should be noted that the electronic device C of the user 3 may download video fragments of the video file A from the electronic device A of the user 1, and download the remaining video fragments of the video file A from the electronic device B of the user 2. After seeing the related information of the video file A on the client software on the electronic device D of a user 4, the user 4 taps download, and the electronic device D of the user 4 downs the video file A from the electronic device A of the user 1, the electronic device B of the user 2, or the electronic device C of the user 3. It should be noted that the electronic device D of the user 4 may download some video fragments of the video file A from the electronic device A of the user 1, download some video fragments of the video file A from the electronic device B of the user 2, and download some video fragments of the video file A from the electronic device C of the user 3. Finally, the electronic device D of the user 4 obtains the complete video file A.

Certainly, in the foregoing process, the user 1, the user 2, and the user 3 may alternatively perform download simultaneously, for example, the user 1 downloads a video fragment 1 of the video file A, the user 2 downloads a video fragment 2 of the video file A, and the user 3 downloads a video fragment 3 of the video file A. The user 1 may download the video score 2 from the electronic device B of the user 2, and download the video score 3 from the electronic device C of the user 3. The user 2 may download the video score 1 from the electronic device A of the user 1, and download the video score 3 from the electronic device C of the user 3. The user 3 may download the video score 1 from the electronic device A of the user 1, and download the video score 2 from the electronic device B of the user 2. Other possible situations are not illustrated one by one.

In the foregoing process, if an electronic device (for example, the electronic device B) that has downloaded the video file A (or the video fragments) deletes the downloaded video file A or the video fragments (certainly, there may alternatively be another situation, for example, the client software is in a disabled state or the electronic device is not in the networked state) after downloading the video file A (or the video fragments), other electronic devices (for example, the electronic device C and the electronic device D) cannot download the video fragments of the video file A from the electronic device B in a process of downloading the video file A (or the video fragments), but can download the video fragments of the video file A from another electronic device that already downloads the video file A or the video fragments.

Certainly, two electronic devices do not directly communicate (for example, Bluetooth communication) with each other when P2P flow transmission is performed between the electronic devices, but may communicate with each other by using networks respectively connected to the electronic devices. That is, P2P flow transmission can also be implemented even if the electronic devices are not located in a same space in which direct connection and communication can be implemented, provided that the electronic devices have a networking function.

When the network acceleration method provided in the foregoing Table 2 is used, a data flow is usually identified based on a feature of the data flow (for example, a protocol and a port), and transmission quality of the data flow is evaluated. When it is determined that the transmission quality of the data flow is poor and the transmission quality of the data flow needs to be improved, the data flow is usually switched to an alternate network (or the data flow is concurrently transmitted on a plurality of network channels) based on the feature of the data flow (for example, an IP address and the port). The CDN flow usually has a fixed feature, but the P2P flow usually does not have a fixed feature. For example, there are a large quantity of types of P2P flows without a fixed service port.

In other words, in this embodiment of this application, although the P2P flow can be identified, and a current flow may be determined as the P2P flow based on original data, a protocol, and a source port of the data flow when the P2P flow is identified, when flow-level switching is performed on the data flow, control is usually performed based on an IP address and a port of the data flow, to switch the data flow to another network channel. P2P flows received by an electronic device may be data flows transmitted between the current electronic device and a plurality of other electronic devices. In addition, in different time periods, the other electronic devices that transmit the P2P flows to the current electronic device may be not fixed. Consequently, the P2P flows do not have fixed IP addresses (a source IP address and a destination IP address) and fixed ports (a source port and a destination port), and a single P2P flow cannot be switched to another network channel.

In this case, when data flows transmitted by the electronic device include both a CDN flow and a P2P flow; transmission quality may need to be determined based on a data flow having a CDN flow feature. When the transmission quality is poor, a related transmission quality improvement policy can be performed on only the data flow having the CDN flow feature, for example, the CDN flow is switched to the alternate network. It is equivalent to that a CDN flow is identified and a P2P flow is not identified when both the CDN flow and the P2P flow simultaneously exist in an application. After the CDN flow is switched to the alternate network, the P2P flow is still transmitted on an original network. Consequently: a freezing problem cannot be resolved.

In this embodiment of this application, for features of the CDN flow and the P2P flow, identification features are respectively set for features of the CDN flow and the P2P flow:

For example, data flows that are of a specific video application and that have the following features may be set as CDN flows: A http sends a request by using a URL, and a suffix of the request includes a string ts; a file extension (content-type) of a first data packet responding to the http includes video; and an hls streaming protocol of the http is used, and a destination port of the data flows is 80.

Data flows that are of the video application and that have the following features may be set as P2P flows: Original data (payload data) recording information in the data flows begins with 020000 or 000000; and a UDP protocol is used, and source ports are the same.

The foregoing merely uses the features of the CDN flows and the P2P flows of the specific video application as an example. In actual application, for different applications, resetting needs to be performed based on features of CDN flows and P2P flows of the applications: whether the features of the CDN flows exist in data flows of the applications and whether the features of the P2P flows exist in data flows of the applications.

A focus of this embodiment of this application is not to separately identify the CDN flow and the P2P flow by using a feature. In actual application, other features may alternatively be used to identify a CDN flow and a P2P flow in data flows, which are not illustrated one by one herein.

When there is a CDN flow and no P2P flow in the data flows of the application A (which is determined based a feature of the CDN flow and a feature of the P2P flow that are preset), transmission quality of the data flow (the CDN flow) of the application A is evaluated based on the preset network quality evaluation algorithm 1. When the transmission quality of the CDN flow of the application A is poor (for example, meets the transmission quality improvement condition set by the network quality evaluation algorithm) and the transmission quality needs to be improved, the CDN flow of the application A is switched to the alternate network for transmission.

When there are both a CDN flow and a P2P flow in the data flows of the application A, transmission quality of the data flows of the application A is evaluated based on a network quality evaluation algorithm 2 in Table 4. When the transmission quality of the data flows of the application is poor and the transmission quality needs to be improved, all data flows of the electronic device (including all the data flows of the application A) are switched to the alternate network for transmission.

It should be noted that the network quality evaluation algorithm 1 and the network quality evaluation algorithm 2 may be the same or different.

TABLE 4

| A network quality evaluation algorithm and a transmission quality improvement policy for a video application | | | | | |
|---|---|---|---|---|---|
| Application name | Application type | Service scenario | Feature condition for a data flow | Transmission quality improvement condition set by the network quality evaluation algorithm 2 (500 ms for each period) | Transmission quality improvement policy |
| iQiYi | Video livestreaming | Video (including | A protocol, a port, a | Latencies within four | WLAN + channel |

TABLE 4-continued

| | | | | A network quality evaluation algorithm and a transmission quality improvement policy for a video application | | |
|---|---|---|---|---|---|---|
| Application name | Application type | Service scenario | Feature condition for a data flow | Transmission quality improvement condition set by the network quality evaluation algorithm 2 (500 ms for each period) | Transmission quality improvement policy | |
| | | a P2P flow) | packet feature of a requested resource, and the like | consecutive periods of five periods exceed 350 ms or uplink retransmission rates within three consecutive periods of six periods exceed 20% | switching | |

The network quality evaluation algorithm 2 shown in Table 4 is merely used as an example. In actual application, the CDN flow and the P2P flow of the application A may be used as one type of data flows to evaluate transmission quality of this type of data flows. For details, refer to Table 5.

TABLE 5

| | | | | Algorithm evaluation examples in which the data flows of the application A include a P2P flow and do not include a P2P flow | | |
|---|---|---|---|---|---|---|
| Application name | Application type | Service scenario | Feature condition for a data flow | Network quality evaluation algorithm | Evaluated data flow | Transmission quality improvement policy |
| Application A | Video livestreaming | Video (not including a P2P flow) | | Algorithm 1 | CDN flow | Switching |
| | | Video (including a P2P flow) | | Algorithm 2 | The CDN flow and the P2P flow are used as one data flow for evaluation | WLAN + channel switching |

When there are both a CDN flow and a P2P flow in the data flows of the application A, the CDN flow and the P2P flow of the application A may be evaluated based on the network quality evaluation algorithm 2 in Table 5, that is, the CDN flow and the P2P flow are used as one type of data flows for simultaneously evaluating the transmission quality of the data flows of the application A. When the transmission quality meets the transmission quality improvement condition set in Table 5, all the data flows of the electronic device (including all the data flows of the application A) are switched to the alternate network.

Certainly, in actual application, the network quality evaluation algorithm 2 may alternatively be used to separately evaluate transmission quality of the CDN flow and transmission quality of the P2P flow of application A. When any of the transmission quality of the CDN flow and the transmission quality of the P2P flow of the application A meets a transmission quality improvement condition set in Table 6, all the data flows of the electronic device (including all the data flows of the application A) are switched to the alternate network. That is, an algorithm 2-1 and an algorithm 2-2 in Table 6 may be the same.

TABLE 6

Other algorithm evaluation examples in which the data flows of the
application A include a P2P flow and do not include a P2P flow

| Application name | Application type | Service scenario | Feature condition for a data flow | Network quality evaluation algorithm 2 | Evaluated data flow | Transmission quality improvement policy |
|---|---|---|---|---|---|---|
| Application A | Video livestreaming | Video (not including a P2P flow) | | Algorithm 1 | CDN flow | Switching |
| | | Video (including a P2P flow) | | Algorithm 2-1 | CDN flow | WLAN + channel switching |
| | | | | Algorithm 2-2 | P2P flow | |

Certainly, in actual application, different network quality evaluation algorithms may be respectively set for the CDN flow and the P2P flow. For example, a network quality evaluation algorithm 2-1 is set for the CDN flow, and a network quality evaluation algorithm 2-2 is set for the P2P flow. The algorithm 2-1 is used to evaluate the transmission quality of CDN flow, and the algorithm 2-2 is used to evaluate the transmission quality of P2P flow. When the transmission quality of the CDN flow meets a transmission quality improvement condition set by the algorithm 2-1 and/or the transmission quality of the P2P flow meets a transmission quality improvement condition set by the algorithm 2-2, all the data flows of the electronic device (including all the data flows of the application A) are switched to the alternate network. That is, the algorithm 2-1 and the algorithm 2-2 in Table 6 may be the different.

In addition, WLAN+channel switching in the transmission quality improvement policies in Table 4 to Table 6 is used to switch all the data flows of the application A (including at least the CDN flow and the P2P flow) to the alternate network.

Because the feature of the P2P flow is not completely fixed, although the P2P flow can be identified, a data flow having the P2P flow feature cannot be precisely switched to the alternate network. Therefore, all data flows of applications of the entire electronic device may be switched to the alternate network. In the foregoing embodiment, the primary network is, for example, a Wi-Fi network, and the alternate network may be a cellular network.

The foregoing embodiment is merely used as an example. In actual application, switching may be performed from any primary network to the alternate network, and is not limited to being performed from the primary Wi-Fi in the foregoing embodiment to the cellular network.

It may also be understood from the foregoing examples that the transmission quality improvement policies in Table 4 to Table 6 are channel-level switching, and the transmission quality improvement policies in Table 2 are flow-level switching.

Therefore, when the transmission quality improvement policy is executed, data requests of all applications in the electronic device may be switched to the alternate network for transmission. The data flows (the CDN flow and the P2P flow) of the application A are also transmitted by using the alternate network.

To have a clearer understanding of the foregoing embodiments, FIG. 16A, FIG. 16B, FIG. 16C, FIG. 16D, and FIG. 16E are a sequence diagram of a network acceleration method for a P2P flow.

A difference between the sequence diagram shown in FIG. 16A, FIG. 16B, FIG. 16C, FIG. 16D, and FIG. 16E and the sequence diagram shown in FIG. 8A, FIG. 8B, FIG. 8C, FIG. 8D, and FIG. 8E includes: Different transmission quality improvement policies are executed. For a specific implementation process, refer to the following descriptions.

For descriptions of step B2 to step B10, refer to the descriptions in the foregoing embodiment. Details are not described herein again.

Step P1: After receiving data flows reported by the traffic reporting component, the traffic sensing component matches preset features based on the received data flows, where a matching result includes the received data flows include a P2P flow.

Step B11: When the received data flow's meet the preset feature of including a P2P flow; a corresponding network quality evaluation algorithm meeting the preset feature of including a P2P flow is obtained. An algorithm B in FIG. 16A, FIG. 16B, FIG. 16C, FIG. 16D, and FIG. 16E may be the algorithm 2 (or the algorithm 2-2) in the foregoing embodiment.

In actual application, step P1 may not be included. That is, the feature of including a P2P flow may be preset, and when the received data flows meet the preset feature of including a P2P flow, the algorithm B is obtained. The algorithm B is used to evaluate the data flows that meet the set feature of including a P2P flow, where the data flows are P2P flows.

For content of step B12 and step B13, refer to the descriptions in the foregoing embodiment. Details are not described herein again.

Certainly, an identifier of a data flow feature (different identifiers may be used to represent different data flow features) and an identifier of an evaluation result (different identifiers are used to represent whether a transmission quality improvement condition is met or different identifiers are used to represent transmission quality) may alternatively be sent in step B13.

Step B14: After receiving the data flow feature and the evaluation result, if the evaluation result is that transmission quality needs to be improved, the flow-level policy management component determines, based on the data flow feature, to request channel switching.

In a specific implementation, when the data flow feature is the preset feature of including a P2P flow; and the evaluation result is that the preset transmission quality improvement condition is met, a channel switching policy is obtained.

Step B15: The flow-level policy management component sends request information for channel switching to the flow-level path management component.

Step B16: After receiving the request information for channel switching, the flow-level path management component checks that the alternate network is not stored, and sends the request information for channel switching to the channel-level path management component.

After step B16, step B17 to step B23 are performed. For content of step B17 to step B23, refer to the descriptions in the foregoing embodiment. Details are not described herein again.

Step P2: After determining the network with optimal quality as the primary card network in step B23, the channel-level path management component sends an enable request and a switching request for the primary card network to the network connection management component.

Step P3: The network connection management component wakes up the primary card network, and switches all data requests (a request for a P2P resource and a request for a CDN resource of the current application A, and another network request for another application) of a system to the primary card network.

Step P4: After completing wake-up of the alternate network and channel switching, the network connection component returns, to the channel-level path management component, information representing that the primary card network is already woken up and channel switching is completed.

Step P5: After receiving the information representing that the primary card network is already woken up and channel switching is completed, the channel-level path management component sends the path of the primary card network to the flow-level path management component.

Step P6: The flow-level path management component stores the path of the primary card network as the path of the primary network.

In the embodiment shown in FIG. 16A, FIG. 16B, FIG. 16C, FIG. 16D, and FIG. 16E, when the evaluated data flow meets the transmission quality improvement condition set by the algorithm (the evaluation manner in the embodiment shown in Table 5 or the evaluation manner in the embodiment shown in Table 6), the alternate network is determined. After the alternate network is determined, all the data requests of the system are switched to the alternate network. Finally, the determined alternate network is updated to the current primary network.

In actual application, when it is determined that there is a P2P flow; the alternate network may alternatively be predetermined. When the evaluated data flow meets the transmission quality improvement condition set by the algorithm (the evaluation manner in the embodiment shown in Table 5 or the evaluation manner in the embodiment shown in Table 6), all the data requests of the system are switched to the alternate network. Finally, the determined alternate network is updated to the current primary network. For details, refer to the embodiment shown in FIG. 17A, FIG. 17B, FIG. 17C, FIG. 17D, and FIG. 17E.

FIG. 17A, FIG. 17B, FIG. 17C, FIG. 17D, and FIG. 17E are a sequence diagram of another network acceleration method for a P2P flow according to an embodiment of this application.

For step B2 to step P1, refer to the descriptions in the embodiment shown in FIG. 16A, FIG. 16B, FIG. 16C, FIG. 16D, and FIG. 16E.

Step J1: When determining, based on a data flow feature, that there is a P2P flow, the traffic sensing component sends request information for an alternate path to the channel-level path management component.

The request information is used to request to wake up and store a path of an alternate network, so that when the traffic sensing component evaluates transmission quality of a data flow; and when the data flow meets the transmission quality improvement condition set by the algorithm (in the evaluation manner in the embodiment shown in FIG. 5 or the evaluation manner in the embodiment shown in FIG. 6), the data flow is switched to the alternate network that is woken up and stored.

For content of step B17 to step F1, refer to the descriptions in the foregoing embodiment. Details are not described herein again.

Step J1 may be performed after step P1, or may be performed after step B11. This is not limited in this embodiment of this application.

Step B11 to step B13 are performed by the electronic device after step B10 is performed. For details, refer to the descriptions in the foregoing embodiment. Details are not described herein again.

Because the traffic reporting component continuously reports the data flows of the application A to the traffic sensing component, the traffic sensing component also continuously obtains evaluation results, and continuously sends data flow features and the evaluation results to the flow-level policy management component.

Step B14: When the evaluation result is that the transmission quality improvement condition is met, it is determined to request channel switching based on the data flow feature.

Step B15: The flow-level policy management component sends request information for channel switching to the flow-level path management component.

Step B16: After receiving the request information for channel switching, the flow-level path management component checks that the alternate network is stored, and sends the request information for channel switching to the channel-level path management component.

For step P2 to step P6, refer to the descriptions in the foregoing embodiment. In this case, the alternate network is already woken up and there is no need to wake up the alternate network, but all the data requests of the system are switched to the alternate network.

FIG. 16A, FIG. 16B, FIG. 16C, FIG. 16D, and FIG. 16E and FIG. 17A, FIG. 17B, FIG. 17C, FIG. 17D, and FIG. 17E merely show two specific implementations for a situation in which the data flows of the application include a P2P flow in Table 4 to Table 6. In actual application, another manner may alternatively be used to improve transmission quality of the data flows of the application when the transmission quality of the data flows is poor in the situation in which the data flows of the application include a P2P flow in Table 4 to Table 6.

In the foregoing embodiment, the P2P flow is used as an example for description. When it is difficult to implement flow-level switching or an effect of flow-level switching is poor (for example, a freezing time is long in a process in which a specific data flow is switched to another network channel with better network quality, resulting in poor user experience), a network quality evaluation algorithm may be determined based on a feature of the data flow: When it is determined based on the network quality evaluation algorithm that the data flow needs to be switched, the data flows of all the applications of the electronic device are switched to the alternate network (the alternate network may be a network with optimal network quality in networks other than the currently used primary network), to implement channel-level switching.

That is, the network quality evaluation algorithm may be determined based on the feature of the data flow: When it is determined based on the network quality evaluation algorithm that transmission quality of the data flow needs to be improved, different switching manners may be selected in different application scenarios, so that a user obtains better use experience. For example, flow-level switching (a single data flow or a single data flow and a data flow related to the single data flow), application-level switching (all data flows of an application in which a single data flow is located), or channel-level switching (all data flows in an electronic device) may be selected.

Certainly, in actual application, some steps in the foregoing embodiment may alternatively be combined to implement a network acceleration method. For example, the alternate network may be requested and woken up at different time points. In a specific implementation, two determining conditions may be set for the network quality evaluation algorithm. One of the determining conditions is used to request and wake up the alternate network, and the other of the determining conditions is used to switch the data requests of all the applications of the electronic device to the alternate network that is already woken up.

The foregoing embodiment may be applied to the following scenario. When the electronic device is used for a networking service by using the wireless local area network interface card, and when a signal received by the wireless local area network interface card of the electronic device from the wireless router has first strength, the electronic device runs an application (denoted as a first application), and the electronic device may transmit data flows of the first application by using the wireless local area network interface card. The data flows of the first application may include a plurality of types of data flows (for example, a first data flow and a second data flow), that is, data flows having a plurality of different features. For example, the data flows may include both a video flow (which is the first data flow) and a session flow (which is the second data flow).

When the electronic device is away from the wireless router, the signal received by the wireless local area network interface card of the electronic device from the wireless router may be reduced to second strength. In this case, if a wireless local area network cannot meet a requirement of the first data flow for a network (for example, a flow quality parameter of the first data flow meets a preset first condition), but meets a requirement of the second data flow for a network (for example, a flow quality parameter of the second data flow does not meet a preset second condition), the electronic device transmits the first data flow by using another network interface card (which may be denoted as a second network interface card) and still transmits the second data flow by using the wireless local area network interface card in this case. In this scenario, the data flows of the first application do not include a P2P flow.

Figure 18:
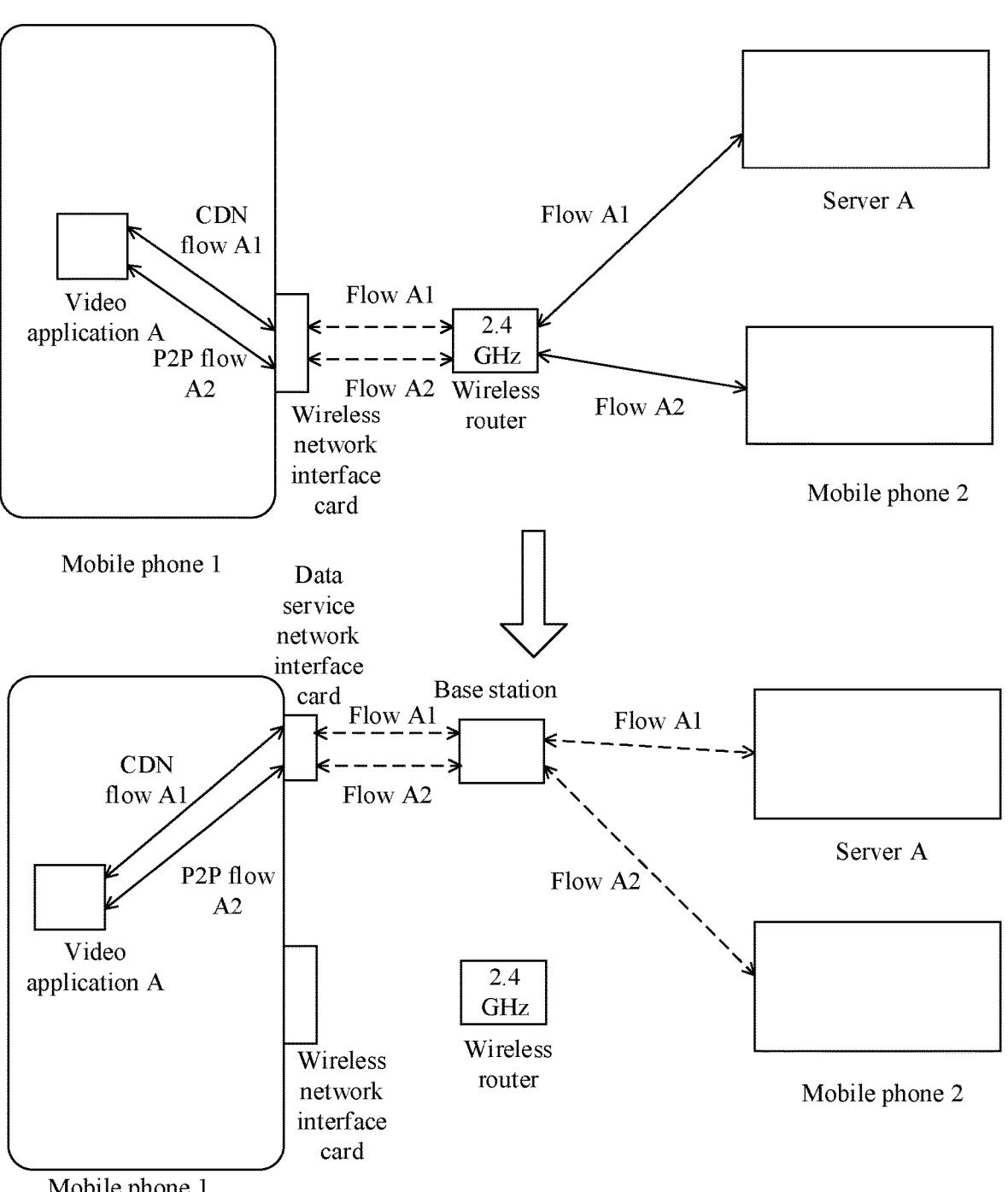
FIG. 18 is a diagram of an application scenario of a network acceleration method for data flows including a P2P flow according to an embodiment of this application.

Refer to FIG. 18. In another scenario, when the electronic device (for example, a mobile phone 1) is used for a networking service by using a wireless local area network interface card, and when a signal received by the wireless local area network interface card of the electronic device from the wireless router has first strength, the electronic device runs another application (denoted as a second application, a video application A in the figure), and the electronic device may transmit data flows of the second application by using the wireless local area network interface card. The data flows of the second application may include one or more types of data flows. For example, the data flows of the second application include a P2P flow (a data flow transmitted between a mobile phone 2, a fourth data flow) and a CDN flow (a data flow transmitted between Fa server of the application, a third data flow).

When the electronic device is away from the wireless router, the signal received by the wireless local area network interface card of the electronic device from the wireless router may be reduced to second strength. In this case, if a wireless local area network cannot meet a requirement of the P2P flow for a network (a flow quality parameter of the P2P flow meets a preset fourth condition), the electronic device transmits all data flows (including the CDN flow and the P2P flow) of the electronic device by using another network interface card (which may be denoted as a second network interface card, a data service network interface card in the figure).

In the foregoing scenario, different types of data flows correspond to different features (specifically as shown in Table 2). The first data flow may be a data flow having a first feature. Different types of data flows correspond to different transmission quality improvement conditions. The first data flow may correspond to a first condition, and the first condition is a condition for determining whether to transmit the first data flow by using a network interface card other than a network interface card in which the first data flow is currently located. The first condition specifies a condition that the flow quality parameter of the first data flow should meet. The flow quality parameter includes at least one of a latency, a rate, a packet loss rate, a retransmission rate, and whether a packet response times out. When the flow quality parameter of the first data flow meets the first condition, it represents that the network in which the first data flow is currently located cannot meet a transmission requirement of the first data flow. Similarly, the second data flow may be a data flow having a second feature, and the second data flow may correspond to a second condition. The second condition is a condition for determining whether to transmit the second data flow by using a network interface card other than a network interface card in which the second data flow is currently located. The second condition specifies a condition that the flow quality parameter of the second data flow should meet. When the flow quality parameter of the second data flow meets the second condition, it represents that the network in which the second data flow is currently located cannot meet a transmission requirement of the second data flow:

When the signal received by the first network interface card from the wireless router has the first strength, network quality is good, the flow quality parameter of the first data flow does not meet the first condition, and the flow quality parameter of the second data flow does not meet the second condition.

When the signal received by the first network interface card from the wireless router has the second strength, the network quality is poor, the flow quality parameter of the first data flow meets the first condition, and the flow quality parameter of the second data flow does not meet the second condition.

Certainly, when the signal received by the first network interface card from the wireless router has third strength, the network quality is poorer, the flow quality parameter of the first data flow meets the first condition, and the flow quality parameter of the second data flow meets the second condition.

As described above, it may be understood that the third data flow has a third feature and may correspond to a third condition, and the fourth data flow has a fourth feature and may correspond to a fourth condition. The third condition is a condition for transmitting the third data flow on the second network interface card or a condition for transmitting the third data flow and the fourth data flow on the second network interface card, and the fourth condition is a condition for transmitting the third data flow and the fourth data flow on the second network interface card.

When the signal received by the first network interface card from the wireless router has the first strength, the network quality is good, the flow quality parameter of the third data flow does not meet the third condition, and the flow quality parameter of the fourth data flow does not meet the fourth condition.

If the third condition is the condition for transmitting the third data flow on the second network interface card, when the signal received by the first network interface card from the wireless router has the second strength, the network quality is poor, and the flow quality parameter of the fourth data flow meets the fourth condition.

If the third condition is the condition for transmitting the third data flow and the fourth data flow on the second network interface card, when the signal received by the first network interface card from the wireless router has the second strength, the network quality is poor, and the flow quality parameter of the third data flow meets the third condition or the flow quality parameter of the fourth data flow meets the fourth condition.

When the signal received by the first network interface card from the wireless router has the third strength, the network quality is poorer, the flow quality parameter of the third data flow meets the third condition, and the flow quality parameter of the fourth data flow meets the fourth condition. In this case, all the data flows of the electronic device are transmitted by using the second network interface card.

The first application and the second application may be a same application or different applications. When the first application and the second application are the same application, different data flows (sometimes including a P2P flow and sometimes not including a P2P flow) are transmitted because service scenarios are different. The third condition and the fourth condition may be the same or different. Certainly, the first condition and the third condition may be the same or different.

It should be understood that sequence numbers of the steps in the foregoing embodiments do not mean a performing order. A performing order of the processes should be determined based on functions and internal logic of the processes, and should not constitute any limitation on the implementation processes of embodiments of this application.

An embodiment of this application further provides a computer-readable storage medium. The computer-readable storage medium stores a computer program, and when the computer program is executed by a processor, the steps in the foregoing method embodiments may be implemented.

An embodiment of this application further provides a computer program product. When the computer program product runs on a first device, the first device is enabled to implement the steps in the foregoing method embodiments.

When an integrated unit is implemented in a form of a software functional unit and sold or used as an independent product, the integrated unit may be stored in a computer-readable storage medium. Based on such an understanding, in this application, all or some of the processes in the methods in the foregoing embodiments may be implemented by a computer program instructing related hardware. The computer program may be stored in the computer-readable storage medium. When the computer program is executed by a processor, the steps in the foregoing method embodiments may be implemented. The computer program includes computer program code, and the computer program code may be in a source code form, an object code form, an executable file form, some intermediate forms, or the like. The computer-readable medium may include at least any entity or apparatus that can carry the computer program code to the first device, a recording medium, a computer memory, a read-only memory (ROM), a random access memory (RAM), an electrical carrier signal, a telecommunications signal, and a software distribution medium, for example, a USB flash drive, a removable hard disk, a magnetic disk, or an optical disc. In some jurisdictions, the computer-readable medium cannot be an electrical carrier signal or a telecommunications signal according to legislation and patent practice.

An embodiment of this application further provides a chip system. The chip system includes a processor, the processor is coupled to a memory, and the processor executes a computer program stored in the memory, to implement the steps in any method embodiment of this application. The chip system may be a single chip or a chip module including a plurality of chips.

In the foregoing embodiments, the descriptions of embodiments have respective focuses. For a part that is not detailed or described in an embodiment, refer to related descriptions in other embodiments.

Persons of ordinary skill in the art may be aware that, in combination with the examples described in embodiments disclosed in this specification, the units and the method steps can be implemented by electronic hardware or a combination of computer software and electronic hardware. Whether these functions are performed in a hardware or software manner depends on particular applications and design constraints of the technical solutions. Persons skilled in the art may use different methods to implement the described functions for each specific application, but it should not be considered that such an implementation goes beyond the scope of this application.

The foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features. However, these modifications or replacements do not make the essence of the corresponding technical solutions depart from the spirit and scope of the technical solutions in embodiments of this application, and shall fall within the protection scope of this application.

What is claimed is:

1. A method, comprising:
   running a first application and transmitting a first data flow and a second data flow of the first application by a first network interface card, wherein the first network interface card is a wireless local area network interface card of an electronic device, the first network interface card is configured to connect to a wireless router, a signal received by the first network interface card from the wireless router has a first strength, and neither the first data flow nor the second data flow is a peer-to-peer (P2P) flow;

transmitting, when the signal received by the first network interface card from the wireless router has a second strength, the first data flow by a second network interface card of the electronic device, and transmitting the second data flow by the first network interface card, wherein the second strength is less than the first strength, and a network quality of the second network interface card is greater than a network quality of the first network interface card;

running a second application and transmitting a third data flow and a fourth data flow of the second application by the first network interface card, wherein a signal received by the first network interface card from the wireless router has the first strength, the third data flow is not a P2P flow, and the fourth data flow is a P2P flow; and transmitting, when the signal received by the first network interface card from the wireless router has the second strength, the third data flow and the fourth data flow by the second network interface card.

2. The method of claim 1, wherein the first data flow comprises data packets and has a first feature, wherein the second data flow comprises data packets and has a second feature, and wherein the first feature and the second feature differ from each other in at least one of the following parameters: a transmission protocol, a transmission port, and a header feature of the data packets.

3. The method of claim 2, wherein in a process in which the electronic device transmits the first data flow and the second data flow by the first network interface card, the method comprises:

obtaining a first condition corresponding to the first feature and a second condition corresponding to the second feature, wherein the first condition is a condition for transmitting the first data flow on the second network interface card, and the second condition is a condition for transmitting the second data flow on the second network interface card, wherein a flow quality parameter of the first data flow and a flow quality parameter of the second data flow comprises at least one of the following parameters: a latency, a rate, a packet loss rate, a retransmission rate, and whether a packet response times out.

4. The method of claim 3, wherein when the signal received by the first network interface card from the wireless router has the first strength, the flow quality parameter of the first data flow does not meet the first condition, and the flow quality parameter of the second data flow does not meet the second condition, and wherein when the signal received by the first network interface card from the wireless router has the second strength, the flow quality parameter of the first data flow meets the first condition, and the flow quality parameter of the second data flow does not meet the second condition.

5. The method of claim 2, wherein the third data flow is a data flow having a third feature, and the fourth data flow is a data flow having a fourth feature, and wherein the third feature and the fourth feature differ from each other in at least one of the following parameters: a transmission protocol, a transmission port, and a header feature of the data packets.

6. The method of claim 5, wherein in a process in which the electronic device transmits the third data flow and the fourth data flow by the first network interface card, the method comprises:

obtaining a third condition corresponding to the third feature and a fourth condition corresponding to the fourth feature, wherein the third condition is a condition for transmitting the third data flow on the second network interface card or a condition for transmitting the third data flow and the fourth data flow on the second network interface card, and the fourth condition is a condition for transmitting the third data flow and the fourth data flow on the second network interface card, wherein a flow quality parameter of the third data flow and a flow quality parameter of the fourth data flow comprises at least one of the following parameters: a latency, a rate, a packet loss rate, a retransmission rate, and whether a packet response times out.

7. The method of claim 6, wherein when the signal received by the first network interface card from the wireless router has the first strength, the flow quality parameter of the third data flow does not meet the third condition, and the flow quality parameter of the fourth data flow does not meet the fourth condition, wherein either a) if the third condition is the condition for transmitting the third data flow on the second network interface card, when the signal received by the first network interface card from the wireless router has the second strength, the flow quality parameter of the fourth data flow meets the fourth condition, or b) if the third condition is the condition for transmitting the third data flow and the fourth data flow on the second network interface card, when the signal received by the first network interface card from the wireless router has the second strength, the flow quality parameter of the third data flow meets the third condition or the flow quality parameter of the fourth data flow meets the fourth condition.

8. The method of claim 1, wherein when the electronic device stores an alternate network, transmitting the third data flow and the fourth data flow by the second network interface card comprises transmitting the third data flow and the fourth data flow by the alternate network, wherein the alternate network comprises a second network corresponding to the second network interface card.

9. The method of claim 8, wherein when the electronic device does not store the alternate network, the method further comprises obtaining network quality parameters of networks corresponding to third network interface cards of the electronic device, wherein the third network interface cards are network interface cards other than the first network interface card in the electronic device, and the network quality parameter comprises at least one of a bandwidth, a latency, and an air interface rate, and wherein when the second network interface card is a network interface card with optimal network quality in the third network interface cards, the method further comprises storing the second network corresponding to the second network interface card as the alternate network, wherein the network quality is determined based on the network quality parameter.

10. The method of claim 9, wherein before storing the second network corresponding to the second network interface card as the alternate network, the method further comprises waking up the second network corresponding to the second network interface card.

11. The method of claim 9, wherein before storing the second network corresponding to the second network interface card as the alternate network, the method further comprises obtaining a network quality parameter of a first network corresponding to the first network interface card wherein the second network corresponding to the second network interface card is stored as the alternate network when the network quality of the second network corresponding to the second network interface card is greater than the network quality of the first network corresponding to the first network interface card.

12. The method of claim 11, wherein the second application is run in a foreground, and the method further comprises sequentially performing, after detecting that the first application runs in the foreground, primary network determining steps in a priority order of network interface cards of the electronic device, until a primary network of the electronic device is obtained, wherein the primary network determining steps comprise:

obtaining a network state of a network corresponding to a fourth network interface card of the electronic device;

obtaining a network quality parameter of the fourth network interface card when the network state of the network corresponding to the fourth network interface card is available, or terminating the primary network determining steps when the network state of the network corresponding to the fourth network interface card is unavailable; and storing the fourth network interface card as the primary network of the electronic device when the network quality parameter of the fourth network interface card is within a preset range, or terminating the primary network determining steps when the network quality parameter of the fourth network interface card is not within the preset range.

13. The method of claim 12, wherein obtaining the network quality parameter of the first network corresponding to the first network interface card comprises monitoring a network quality parameter of the primary network in a first period after the primary network of the electronic device is obtained.

14. The method of claim 11, wherein obtaining the network quality parameter of the first network corresponding to the first network interface card comprises:

obtaining a network for transmitting the third data flow and the fourth data flow, wherein the network for transmitting the third data flow and the fourth data flow is the first network corresponding to the first network interface card; and monitoring the network quality parameter of the first network in a first period.

15. An electronic device, comprising:

a first network interface card;

a second network interface card;

one or more processors coupled to the first and second network interface cards; and a memory coupled to the one or more processors and configured to store instructions that, when executed by the one or more processors, cause the electronic device to be configured to:

run a first application and transmit a first data flow and a second data flow of the first application by the first network interface card, wherein the first network interface card is a wireless local area network interface card, the first network interface card is configured to connect to a wireless router, a signal received by the first network interface card from the wireless router has a first strength, and neither the first data flow nor the second data flow is a peer-to-peer (P2P) flow;

transmit, when the signal received by the first network interface card from the wireless router has a second strength, the first data flow by the second network interface card, and the second data flow by the first network interface card, wherein the second strength is less than the first strength, and a network quality of the second network interface card is greater than a network quality of the first network interface card;

run a second application and transmit a third data flow and a fourth data flow of the second application by the first network interface card, wherein a signal received by the first network interface card from the wireless router has the first strength, the third data flow is not a P2P flow, and the fourth data flow is a P2P flow; and transmit, when the signal received by the first network interface card from the wireless router has the second strength, the third data flow and the fourth data flow by the second network interface card.

16. The electronic device of claim 15, wherein the first data flow comprises data packets and has a first feature, wherein the second data flow comprises data packets and has a second feature, and wherein the first feature and the second feature differ from each other in at least one of the following parameters: a transmission protocol, a transmission port, and a header feature of the data packets.

17. The electronic device of claim 16, wherein the third data flow is a data flow having a third feature, and the fourth data flow is a data flow having a fourth feature, and wherein the third feature and the fourth feature differ from each other in at least one of the following parameters: a transmission protocol, a transmission port, and a header feature of the data packets.

18. The electronic device of claim 16, wherein in a process in which the electronic device transmits the first data flow and the second data flow by the first network interface card, the instructions, when executed by the one or more processors, further cause the electronic device to be configured to:

obtain a first condition corresponding to the first feature and a second condition corresponding to the second feature, wherein the first condition is a condition for transmitting the first data flow on the second network interface card, and the second condition is a condition for transmitting the second data flow on the second network interface card, wherein a flow quality parameter of the first data flow and a flow quality parameter of the second data flow comprises at least one of the following parameters: a latency, a rate, a packet loss rate, a retransmission rate, and whether a packet response times out.

19. The electronic device of claim 18, wherein when the signal received by the first network interface card from the wireless router has the first strength, the flow quality parameter of the first data flow does not meet the first condition, and the flow quality parameter of the second data flow does not meet the second condition, and wherein when the signal received by the first network interface card from the wireless router has the second strength, the flow quality parameter of the first data flow meets the first condition, and the flow quality parameter of the second data flow does not meet the second condition.

20. A non-transitory computer-readable storage medium storing instructions that, when executed by one or more processors of an electronic device, cause the electronic device to be configured to:

run a first application and transmit a first data flow and a second data flow of the first application by a first network interface card, wherein the first network interface card is a wireless local area network interface card of an electronic device, the first network interface card is configured to connect to a wireless router, a signal received by the first network interface card from the wireless router has a first strength, and neither the first data flow nor the second data flow is a peer-to-peer (P2P) flow;

transmit, when the signal received by the first network interface card from the wireless router has a second strength, the first data flow by a second network interface card of the electronic device, and transmit the second data flow by the first network interface card, wherein the second strength is less than the first strength, and a network quality of the second network interface card is greater than a network quality of the first network interface card;

run a second application and transmit a third data flow and a fourth data flow of the second application by the first network interface card, wherein a signal received by the first network interface card from the wireless router has the first strength, the third data flow is not a P2P flow, and the fourth data flow is a P2P flow; and transmit, when the signal received by the first network interface card from the wireless router has the second strength, the third data flow and the fourth data flow by the second network interface card.

* * * * *